(12) United States Patent
Kuroda

(10) Patent No.: US 10,599,447 B2
(45) Date of Patent: Mar. 24, 2020

(54) SYSTEM CONSTRUCTION ASSISTANCE SYSTEM AND METHOD, AND STORAGE MEDIUM

(71) Applicant: NEC Corporation, Minato-ku, Tokyo (JP)

(72) Inventor: Takayuki Kuroda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 235 days.

(21) Appl. No.: 15/748,236

(22) PCT Filed: Aug. 18, 2016

(86) PCT No.: PCT/JP2016/003775
§ 371 (c)(1),
(2) Date: Jan. 29, 2018

(87) PCT Pub. No.: WO2017/033441
PCT Pub. Date: Mar. 2, 2017

(65) Prior Publication Data
US 2018/0225133 A1    Aug. 9, 2018

(30) Foreign Application Priority Data

Aug. 27, 2015   (JP) .................................. 2015-167797

(51) Int. Cl.
*G06F 9/445* (2018.01)

(52) U.S. Cl.
CPC .......... *G06F 9/44505* (2013.01); *G06F 9/445* (2013.01)

(58) Field of Classification Search
CPC ............................. G06F 9/445; G06F 9/45505
(Continued)

(56) References Cited

U.S. PATENT DOCUMENTS

| | | | |
|---|---|---|---|
| 6,901,588 B1 * | 5/2005 | Krapf .................... | G06F 9/4488 717/164 |
| 7,890,543 B2 * | 2/2011 | Hunt ..................... | G06F 9/4492 707/803 |

(Continued)

FOREIGN PATENT DOCUMENTS

| | | |
|---|---|---|
| WO | 2012/111725 A1 | 8/2012 |
| WO | 2014/115505 A1 | 7/2014 |
| WO | 2015/040788 A1 | 3/2015 |

OTHER PUBLICATIONS

Garlan et al., "Acme: Architectural Description of Component-Based Systems," Cambridge University Press, 2000, 22pg. (Year: 2000).*

He et al., "Component-Based Software Engineering—the Need to Link Methods and their Theories," UNU-IIST, 2005, 39pg. (Year: 2005).*

(Continued)

*Primary Examiner* — Ryan D. Coyer

(57) ABSTRACT

Provided is a system construction assistance system including: a system definition input unit that inputs a system definition including at least a designation of a component using a component definition that is capable of including a field definition and a setting definition about a setting to a constituent element associated with the field, and an assignment definition related to assignment of a constituent element to a field included in the component; and a setting assignment unit that associates a constituent element with a field in a designated component, based on the system definition and the component definition, and assigns a setting to a constituent element constituting a target system, by reflecting a setting content defined with respect to the field in the constituent element associated with the field.

20 Claims, 63 Drawing Sheets

(58) Field of Classification Search
USPC .................................................... 717/120
See application file for complete search history.

(56) References Cited

U.S. PATENT DOCUMENTS

| | | | | |
|---|---|---|---|---|
| 2005/0278694 | A1* | 12/2005 | Butler | G06F 8/61 717/107 |
| 2008/0168423 | A1* | 7/2008 | Daskal | G06Q 10/06 717/120 |
| 2012/0222001 | A1* | 8/2012 | Nakai | G05B 19/0426 717/110 |
| 2013/0332722 | A1 | 12/2013 | Kuroda | |
| 2014/0181792 | A1* | 6/2014 | Fanning | G06F 8/10 717/124 |
| 2015/0135160 | A1* | 5/2015 | Gauvin | H04W 4/21 717/109 |
| 2015/0268948 | A1* | 9/2015 | Plate | G06F 8/71 717/123 |
| 2016/0197779 | A1 | 7/2016 | Soejima | |

OTHER PUBLICATIONS

M. Edwards, "Service Coponent Architecture (SCA)," [online] Mar. 23, 2007, [searched on Aug. 3, 2015] URL: http://www.oasis-opencsa.org/sca, total 10 pages.

T. Binz, G. Breiter, F. Leyman, and T. Spatzier, "Portable Cloud Services Using TOSCA," IEEE Internet Computing, vol. 16, No. 3, May/Jun. 2012, pp. 80 to 85.

Manabu Nakanoya, Kenji Soejima, "An Application-Oriented Network Configuration Management Scheme for Model-Based IT System Provisioning", (DICOMO 2015), Jul. 2015, vol. 2015, No. 1, pp. 1121 to 1128, ISSN 1882-0840.

Hisashi Shimamura, Kazuo Yanoo, Yoshihiro Kajiki, Takayuki Kuroda, and Manabu Nakanoya, "Cloud-based SI for Improving the Efficiency of SI in the Cloud Computing by Means of Model-Based Sizing and Configuration Management," NEC Technical Journal, Mar. 20, 2015, vol. 67, No. 2 (consecutive vol. 462), pp. 79 to 82, ISSN 0285-4139.

International Search Report dated Oct. 11, 2016, in counterpart International Application No. PCT/JP2016/003775.

* cited by examiner

Fig. 3

```
{
    "TYPE": "COMPONENT DEFINITION",
    "id": "Ubuntu_1",
    "FIELD": {
        "file": {
            "INITIAL VALUE": {},
            "SETTING": {
                "ATTRIBUTE": {"mode": "644"},
                "DEPENDENCY": ["$boot"]
            }
        },
        "boot": {
            "INITIAL VALUE": {
                "TYPE": "NEW DEFINITION",
                "VALUE": {"id": "boot1"}
            },
            "SETTING": {}
        }
    }
}
```

Fig. 5

```
{
    "TYPE": "SYSTEM DEFINITION",
    "id": "system1",
    "COMPONENT": {
        "ubuntu1": {
            "TYPE NAME": "Ubuntu_1",
            "SUBSTITUTION": {
                "file": {
                    "TYPE": "NEW DEFINITION",
                    "VALUE": {
                        "id": "file1",
                        "ATTRIBUTE": {"name": "file1.txt"}
                    }
                }
            }
        }
    }
}
```

```
{
    "TYPE": "SYSTEM",
    "id": "system1",
    "CONSTITUENT ELEMENT": [
        "boot1": {},
        "file1": {
            "ATTRIBUTE": {"name": "file1.txt", "mode": "644"},
            "DEPENDENCY": ["boot1"]
        }
    ]
}
```

Fig. 12

```
{
    "TYPE": "SYSTEM DEFINITION2",
    "id": "system1",
    "COMPONENT": {
        "ubuntu1": {
            "file": {
                "VALUE": {
                    "id": "file1",
                    "ATTRIBUTE": {"name": "file1.txt"}
                },
                "SETTING": {
                    "ATTRIBUTE": {"mode": "644"},
                    "DEPENDENCY": ["$boot"]
                }
            },
            "boot": {
                "VALUE": {"id": "boot1"}
            }
        }
    }
}
```

Fig. 14

```
{
    "TYPE": "SYSTEM DEFINITION",
    "id": "system2",
    "COMPONENT": {
        "ubuntu1": {
            "TYPE NAME": "Ubuntu_1",
            "SUBSTITUTION": {
                "file": {
                    "TYPE": "NEW DEFINITION",
                    "VALUE": {
                        "id": "file2",
                        "ATTRIBUTE":
{"name":"file2.py","mode":"755"}
                    }
                }
            }
        }
    }
}
```

Fig. 15

```
{
    "TYPE": "SYSTEM",
    "id": "system2",
    "CONSTITUENT ELEMENT": {
        "boot1": [],
        "file2": {
            "ATTRIBUTE": {"name": "file2.py", "mode": "755"},
            "DEPENDENCY": ["boot1"]
        }
    }
}
```

```
{
    "TYPE": "PORT DEFINITION",
    "id": "OS_2",
    "FIELD": {
        "file": {
            "INITIAL VALUE": []
        },
        "package": {
            "INITIAL VALUE": []
        }
    }
}
```

Fig. 19

```
{
 "TYPE": "SYSTEM DEFINITION",
 "id": "system2",
 "COMPONENT": [
  "tomcat2": [{"TYPE NAME": "Tomcat_2"}],
  "ubuntu2": [{"TYPE NAME": "Ubuntu_2"}]
 ],
 "WIRE": [
  {"CONNECTION SOURCE": "$tomcat2.os", "CONNECTION DESTINATION":
  "$ubuntu2.os"}
 ]
}
```

Fig. 21

```
{
    "TYPE": "COMPONENT DEFINITION",
    "id": " Ubuntu_2",
    "SERVICE PORT": {"os": {"TYPE NAME": "OS_2"}},
    "FIELD": {
        "file": {
            "INITIAL VALUE": {
                "TYPE": "REFERENCE",
                "REFERENCE DESTINATION": "$os.file"
            },
            "SETTING": {"DEPENDENCY": ["$boot"]}
        },
        "package": {
            "INITIAL VALUE": {
                "TYPE": "REFERENCE",
                "REFERENCE DESTINATION": "$os.package"
            },
            "SETTING": {"DEPENDENCY": ["$boot"]}
        },
        "boot": {
            "VALUE": {"id": "boot2"}
        }
    }
}
```

Fig. 23

```
{
    "TYPE": "COMPONENT DEFINITION",
    "id": "Tomcat_2",
    "REFERENCE PORT": {
        "os": {
            "TYPE": "OS_2",
            "SUBSTITUTION": {
                "file": [{"TYPE": "REFERENCE", "REFERENCE DESTINATION": "$configFile"},
                "package": [{"TYPE": "REFERENCE", "REFERENCE DESTINATION": "$package"}]
            }
        }
    },
    "FIELD": {
        "configFile": [
            "INITIAL VALUE": {
                "TYPE": "NEW DEFINITION",
                "VALUE": [{"id": "tomcatConfig2"}]
            },
            "SETTING": ["DEPENDENCY": ["$package"]]
        ],
        "package": [
            "INITIAL VALUE": {
                "TYPE": "NEW DEFINITION",
                "VALUE": [{"id": "tomcatPackage2"}]
            }
        ]
    }
}
```

Fig. 25

```
{
    "TYPE": "COMPONENT DEFINITION",
    "id": "Tomcat_2x",
    "REFERENCE PORT": {
        "os": {
            "TYPE": "OS_2",
            "SUBSTITUTION": {
                "file": {
                    "TYPE": "NEW DEFINITION",
                    "VALUE": {
                        "id": "tomcatConfig2",
                        "SETTING": {"DEPENDENCY": ["$os.package"]}
                    }
                },
                "package": {
                    "TYPE": "NEW DEFINITION",
                    "VALUE": {"id": "tomcatPackage2"}
                }
            }
        }
    }
}
```

```
{
    "CONSTITUENT ELEMENT id": "tomcatConfig2_1",
    "COPY SOURCE CONSTITUENT ELEMENT id": "tomcatConfig2"
}
```

```
{
    "CONSTITUENT ELEMENT id": "tomcatConfig2_2",
    "COPY SOURCE CONSTITUENT ELEMENT id": "tomcatConfig2_1",
    "SETTING": {"DEPENDENCY": ["boot2"]}
}
```

```
{
    "TYPE": "SYSTEM",
    "id": "system2",
    "CONSTITUENT ELEMENT": {
        "boot2": {},
        "tomcatPackage2": {"DEPENDENCY": ["boot2"]},
        "tomcatConfig2": {"DEPENDENCY": ["boot2"]}
    }
}
```

Fig. 39

```
{
    "TYPE": "PORT DEFINITION",
    "id": "OS_3",
    "ACCEPT-FIELD": {
        "file": {
            "INITIAL VALUE": {},
            "SETTING": {"DEPENDENCY": ["$boot"]}
        },
        "package": {
            "INITIAL VALUE": {},
            "SETTING": {"DEPENDENCY": ["$boot"]}
        }
    },
    "PROVIDE-FIELD": {
        "boot": {
            "INITIAL VALUE": {},
            "SETTING": {}
        }
    }
}
```

Fig. 44
OSFile: file 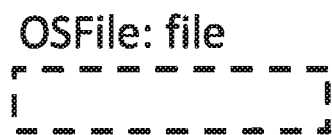 FileUbuntu: file 
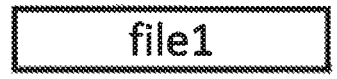 file1     file2

Fig. 47

```
{
    "TYPE": "PORT DEFINITION",
    "id": "OS_4",
    "ACCEPT": {
        "file": {
            "TYPE NAME": "OSFile",
            "INITIAL VALUE": [],
            "SETTING": {"DEPENDENCY": ["$boot"]}
        },
        "package": {
            "TYPE NAME": "OSPackage",
            "INITIAL VALUE": [],
            "SETTING": {"DEPENDENCY": ["$boot"]}
        }
    },
    "PROVIDE": {
        "boot": {
            "TYPE NAME": "OSBoot",
            "INITIAL VALUE": [],
            "SETTING": []
        }
    }
}
```

Fig. 49

```
{
    "TYPE": "PORT DEFINITION",
    "id": "WAS_4",
    "ACCEPT": {
        "war": {
            "TYPE NAME": "War",
            "INITIAL VALUE": [],
            "SETTING": {"DEPENDENCY": ["$package"]}
        }
    },
    "PROVIDE": {
        "package": {
            "TYPE NAME": "OSPackage",
            "INITIAL VALUE": []
        }
    }
}
```

Fig. 51

```
{
  "TYPE": "COMPONENT DEFINITION",
  "id": "Ubuntu 4",
  "SERVICE PORT": {
    "os": {
      "TYPE": "OS_4",
      "SUBSTITUTION": {"boot": [{"TYPE": "REFERENCE", "REFERENCE DESTINATION": "$boot"}]}
    }
  },
  "FIELD": {
    "file": {
      "TYPE NAME": "FileUbuntu",
      "INITIAL VALUE": {
        "TYPE": "CONVERSION CALL",
        "CONVERSION METHOD": "&convertFile",
        "ARGUMENT": {
          "file": [{"TYPE": "REFERENCE", "REFERENCE DESTINATION": "$os.file"}]
        }
      }
    },
    "package": {
      "TYPE NAME": "PackageUbuntu",
      "INITIAL VALUE": {
        "TYPE": "CONVERSION CALL",
        "CONVERSION METHOD": "&convertPackage",
        "ARGUMENT": {
          "package": [{"TYPE": "REFERENCE", "REFERENCE DESTINATION": "$os.package"}]
        }
      }
    },
    "boot": {
      "TYPE NAME": "BootUbuntu",
      "INITIAL VALUE": {"TYPE": "NEW DEFINITION", "VALUE": [{"id": "boot4", "TYPE NAME": "BootUbuntu"}]}
    }
  },
  "CONVERSION": {
    "convertFile": {
      "RETURN VALUE TYPE NAME": "FileUbuntu",
      "ARGUMENT": [{"file": {"TYPE NAME": "OSFile"}}],
      "ATTRIBUTE ASSIGNMENT": {"name": "$file.name"}
    },
    "convertPackage": {
      "RETURN VALUE TYPE NAME": "PackageUbuntu",
      "ARGUMENT": [{"package": {"TYPE NAME": "OSPackage"}}],
      "ATTRIBUTE ASSIGNMENT": {"name": "$package.name"}
    }
  }
}
```

Fig. 53

```
[
  {
    "TYPE": "COMPONENT DEFINITION",
    "id": "Tomcat_4",
    "SERVICE PORT": {
      "was": {
        "TYPE": "WAS_4",
        "SUBSTITUTION": { "package": [{"TYPE": "REFERENCE", "REFERENCE DESTINATION": "$package"}] }
      }
    },
    "REFERENCE PORT": {
      "os": {
        "TYPE": "OS_4",
        "SUBSTITUTION": {
          "file": [
            {
              "TYPE": "CONVERSION CALL",
              "CONVERSION METHOD": "%convertWar",
              "ARGUMENT": [{"war": [{"TYPE": "REFERENCE", "REFERENCE DESTINATION": "$was.war"}]}]
            }
          ],
          "package": [{"TYPE": "REFERENCE", "REFERENCE DESTINATION": "$package"}]
        }
      }
    },
    "FIELD": {
      "package": {
        "TYPE NAME": "OSPackage",
        "INITIAL VALUE": {
          "TYPE": "NEW DEFINITION",
          "VALUE": {"id": "tomcatPackage4", "TYPE NAME": "OSPackage", "ATTRIBUTE": [{"name": "tomcat"}]}
        }
      }
    },
    "CONVERSION": {
      "convertWar": {
        "RETURN VALUE TYPE NAME": "OSFile",
        "ARGUMENT": [{"war": [{"TYPE NAME": "War"}]}],
        "ATTRIBUTE ASSIGNMENT": [{"name": "/usr/local/tomcat/" + "$war.name"}]
      }
    }
  }
]
```

Fig. 55

```
{
    "TYPE": "COMPONENT DEFINITION",
    "id": "WebApp_4",
    "REFERENCE PORT": {
        "was": {
            "TYPE": "WAS_4",
            "SUBSTITUTION": [
                {"war": [{"TYPE": "REFERENCE", "REFERENCE DESTINATION": "$war"}
                ]}
            ]
        }
    },
    "FIELD": {
        "war": [
            "TYPE NAME": "War",
            "INITIAL VALUE": {
                "TYPE": "NEW DEFINITION",
                "VALUE": [{"id": "war4", "TYPE NAME": "War", "ATTRIBUTE": [{"name": "app.war"}]
                }]
            }
        ]
    }
}
```

Fig. 58

```
{
    "CONSTITUENT ELEMENT id": "war4_3",
    "TYPE NAME": "FileUbuntu",
    "ATTRIBUTE": ["name": "/usr/local/tomcat/app.war"],
    "COPY SOURCE CONSTITUENT ELEMENT id": "war4_2"
}
```

```
{
    "TYPE": "SYSTEM DEFINITION",
    "id": "system4"
    "CONSTITUENT ELEMENT": {
        "boot4": {"TYPE NAME": "BootUbuntu"},
        "tomcatPackage4": {
            "TYPE NAME": "PackageUbuntu",
            "ATTRIBUTE": {"name": "tomcat"},
            "DEPENDENCY": ["boot4"]
        },
        "war4": {
            "TYPE NAME": "FileUbuntu",
            "ATTRIBUTE": {"name": "/usr/local/tomcat/app.war"},
            "DEPENDENCY": ["boot4"]
        }
    }
}
```

Fig. 62
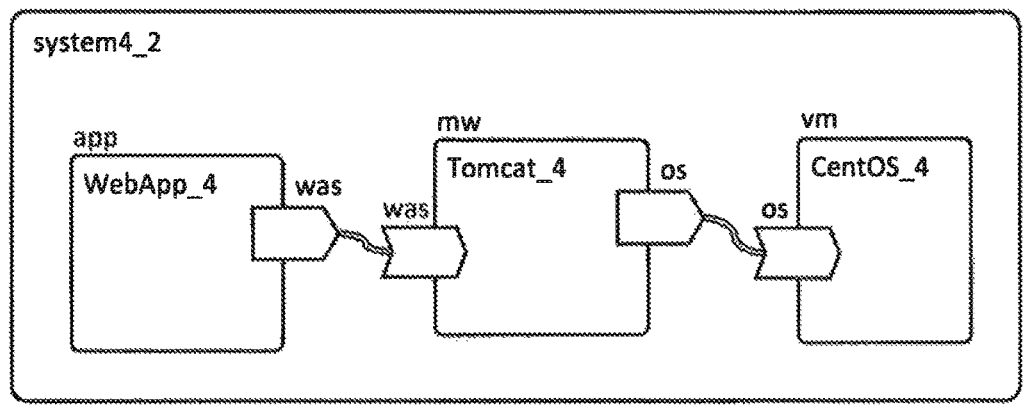
(a)
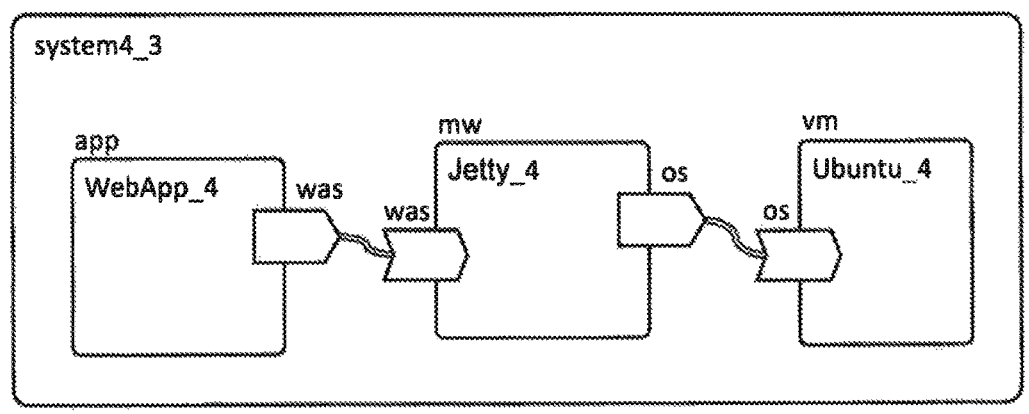
(b)
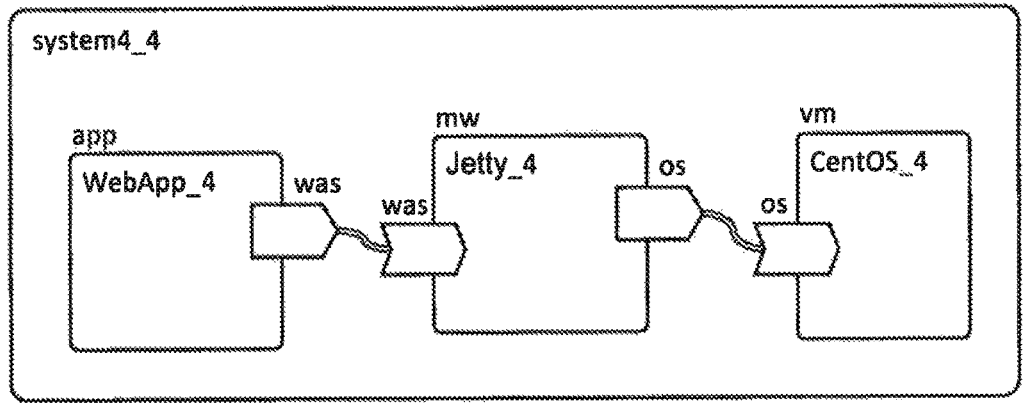
(c)

Fig. 63

```
{
"TYPE": "SYSTEM DEFINITION",
"id": "system4_2",
"COMPONENT": {
    "app": [{"TYPE NAME": "WebApp_4"}],
    "mw": [{"TYPE NAME": "Tomcat_4"}],
    "vm": [{"TYPE NAME": "CentOS_4"}]
},
"WIRE": [
    [{"CONNECTION SOURCE": "$app.was", "CONNECTION DESTINATION": "$mw.was"}],
    [{"CONNECTION SOURCE": "$mw.os", "CONNECTION DESTINATION": "$vm.os"}]
]
}
```

Fig. 65

```
{
  "TYPE": "COMPONENT DEFINITION",
  "id": "Ubuntu 4",
  "SERVICE PORT": {
    "os": [{"TYPE": "OS_4",
      "SUBSTITUTION": {"boot": [{"TYPE": "REFERENCE", "REFERENCE DESTINATION": "$boot"}]}
    }]
  },
  "FIELD": {
    "file": [{"TYPE NAME": "FileCentOS",
      "INITIAL VALUE": [{
        "TYPE": "CONVERSION CALL",
        "CONVERSION METHOD": "&convertFile",
        "ARGUMENT": {
          "file": [{"TYPE": "REFERENCE", "REFERENCE DESTINATION": "$os.file"}]
        }
      }]
    }],
    "package": [{"TYPE NAME": "PackageCentOS",
      "INITIAL VALUE": [{
        "TYPE": "CONVERSION CALL",
        "CONVERSION METHOD": "&convertPackage",
        "ARGUMENT": {
          "package": [{"TYPE": "REFERENCE", "REFERENCE DESTINATION": "$os.package"}]
        }
      }]
    }],
    "boot": [{"TYPE NAME": "BootCentOS",
      "INITIAL VALUE": [{"TYPE": "NEW DEFINITION", "VALUE": [{"id": "bootCentOS4", "TYPE NAME": "BootCentOS"}]}]
    }]
  },
  "CONVERSION": {
    "convertFile": [{
      "RETURN VALUE TYPE NAME": "FileCentOS",
      "ARGUMENT": {"file": [{"TYPE NAME": "OSFile"}]},
      "ATTRIBUTE ASSIGNMENT": {"name": "$file.name"}
    }],
    "convertPackage": [{
      "RETURN VALUE TYPE NAME": "PackageCentOS",
      "ARGUMENT": {"package": [{"TYPE NAME": "OSPackage"}]},
      "ATTRIBUTE ASSIGNMENT": {"name": "$package.name"}
    }]
  }
}
```

Fig. 67

```
{
  "TYPE": "COMPONENT DEFINITION",
  "id": "jetty4",
  "SERVICE PORT": {
    "was": {"TYPE": "WAS_4",
      "SUBSTITUTION": {"package": [{"TYPE": "REFERENCE", "REFERENCE DESTINATION": "$package"}]
      }
    }
  },
  "REFERENCE PORT": {
    "os": {"TYPE": "OS_4",
      "SUBSTITUTION": {
        "file": [{
          "TYPE": "CONVERSION CALL",
          "CONVERSION METHOD": "&convertWar",
          "ARGUMENT": {"war": {"TYPE": "REFERENCE", "REFERENCE DESTINATION": "$was.war"}}
        }]
      }
    }
  },
  "package": [{"TYPE": "REFERENCE", "REFERENCE DESTINATION": "$package"}]
  },
  "FIELD": [{
    "package": {
      "TYPE NAME": "OSPackage",
      "INITIAL VALUE": {
        "TYPE": "NEW DEFINITION",
        "VALUE": {"id": "jettyPackage4", "TYPE NAME": "OSPackage", "ATTRIBUTE": {"name": "jetty"}}
      }
    }
  }],
  "CONVERSION": [{
    "convertWar": {
      "RETURN VALUE TYPE NAME": "OSFile",
      "ARGUMENT": {"war": {"TYPE NAME": "War"}},
      "ATTRIBUTE ASSIGNMENT": {"name": "/usr/local/jetty/" + "$war.name"}
    }
  }]
}
```

Fig. 69

```
{
    "id": "War",
    "STATE": ["f", "t"],
    "STATE TRANSITION": ["f->t", "t->f"]
}
```
(a)

```
{
    "id": "OSPackage",
    "STATE": ["f", "t"],
    "STATE TRANSITION": ["f->t", "t->f"]
}
```
(b)

Fig. 70

```
{
    "CONSTITUENT ELEMENT":{
        "war": {
            "TYPE NAME": "War",
            "ATTRIBUTE": {},
            "DEPENDENCY": {
                "f->t": ["package(t)"],
                "t->f": ["package(t)"]
            }
        },
        "package": {
            "TYPE NAME": "OSPackage",
            "ATTRIBUTE": {},
            "DEPENDENCY": {
                "f->t": ["war(f)"]
            }
        }
    }
}
```

Fig. 71

```
{
"TYPE": "PORT DEFINITION",
"id": "WAS_5",
"ACCEPT": [
    "war": {
        "TYPE NAME": "War",
        "INITIAL VALUE": [],
        "SETTING": {
            "DEPENDENCY": [
                {"DEPENDENCY SOURCE TRANSITION": "f->t", "DEPENDENCY DESTINATION STATE": "$package(t)"},
                {"DEPENDENCY SOURCE TRANSITION": "t->f", "DEPENDENCY DESTINATION STATE": "$package(t)"}
            ]
        }
    }
],
"PROVIDE": {
    "package": {
        "TYPE NAME": "OSPackage",
        "INITIAL VALUE": [],
        "SETTING": {
            "DEPENDENCY": [
                {"DEPENDENCY SOURCE TRANSITION": "t->f", "DEPENDENCY DESTINATION STATE": "$war(f)"}
            ]
        }
    }
}
}
```

SYSTEM CONSTRUCTION ASSISTANCE SYSTEM AND METHOD, AND STORAGE MEDIUM

This application is a National Stage Entry of PCT/JP2016/003775 filed on Aug. 18, 2016, which claims priority from Japanese Patent Application 2015-167797 filed on Aug. 27, 2015, the contents of all of which are incorporated herein by reference, in their entirety.

TECHNICAL FIELD

The present invention relates to a system construction assistance system, a system construction assistance method, and a storage medium or the like recording a system construction assistance program that assist system construction.

BACKGROUND ART

System componentization is a technology of efficiently defining a system as a set of abstract constituent elements with coarser granularity. In general, description of many specific constituent elements with fine granularity is required for configuring a system. However, when overlooking a huge system or a plurality of systems, a plurality of similar constituent elements and groups thereof may come into sight. By defining such a constituent element group as an abstract pattern and reusing the pattern, a group of constituent elements can be concisely described. A pattern of a constituent element group composed of one or more reusably abstracted constituent elements is generally called a component.

By a mechanism of defining a system with a combination of such components, similar but different diverse systems can be quickly and reliably defined merely by changing the combination of the components. For example, a case of defining a system including a virtual machine (hereinafter abbreviated to VM), middleware (hereinafter abbreviated to MW), and an application (hereinafter abbreviated to APP) is considered. At this time, an element required for defining a VM is defined as a VM component, an element required for defining MW is defined as an MW component, and an element required for defining an APP is defined as an APP component, and an entire system is defined by combining the components in such a predefined element group as needed. For example, by replacing only an MW part with a different kind of component, a system differing only in the MW can be redefined with a slight change.

NPL 1 is a standard specification related to a component description for providing such componentization of a system.

In general, there is a limit to possible combinations of components, and a meaningful system definition is not completed unless a proper combination is designated. For example, when the aforementioned APP is operable only on the MW, a meaningful system definition is not completed by directly combining the VM with the APP. By defining a component in conformity with the specification described in NPL 1, a possible combination of components can be suitably described in a unified manner. Further, the combination may be managed and suitability thereof may be verified with a tool conforming to the specification.

Further, NPL 2 is known as a standard specification for defining information required for system deployment by using a combination of components. With respect to a combination of specific components, the specification defines a processing content for substantializing and deploying the combined components and is able to deploy entities of the components by calling the defined processing. The combination of the components may be further combined with another component. At that time, in order to define a processing content for deployment with respect to the new combination, the processing defined for the components being already combined may be reused.

CITATION LIST

Non Patent Literature

NPL 1: M. Edwards, "Service Coponent Architecture (SCA)," [online], 2007, [searched on Aug. 3, 2015], Internet <URL:http://www.oasis-opensca.org/sca>

NPL 2: T. Binz, G. Breiter, F. Leyman, and T. Spatzier, "Portable cloud services using tosca," Internet Computing, IEEE, vol. 16, no. 3, 2012, pp. 80 to 85

SUMMARY OF INVENTION

Technical Problem

However, the method described in NPL 2 has a problem that, every time a combination of components is defined, a processing content based on a relevancy between components determined by the combination needs to be defined. For example, in a processing content required for deployment of a system including the aforementioned APP, MW, and VM, when only the MW is replaced with a different kind of component, the processing content to be implemented may need to be changed.

A simpler example is illustrated in FIG. 74. FIG. 74 is a diagram illustrating an example of a system definition defined by a combination of components. Three rounded-corner rectangles in the diagram represent components. The system in this example includes three components being an APP1 component related to an APP, an MW1 component related to an MW, and a VM1 component related to a VM. Further, a double line represents a connection between components. A rectangle in each component represents deployment processing as a constituent element related to the component. For example, with respect to the APP1 component in the diagram, a constituent element "app" corresponding to deployment processing of the related application is defined. Further, for example, with respect to the MW1 component in the diagram, a constituent element "package" corresponding to deployment processing (e.g. installation processing of a package resource of the middleware provided by a configuration management system) of the middleware package is defined. Further, for example, with respect to the VM1 component in the diagram, a constituent element "vm" corresponding to deployment processing (e.g. startup processing) of the VM is defined.

Each dotted arrow between constituent elements in the diagram represents a dependency between the constituent elements. The dependency is a concept indicating an advance necessity out of bilateral relevancies that a certain type of processing needs to be executed in order to execute another type of processing. In the example in the diagram, the "app" constituent element depends on the "package" constituent element and the "vm" constituent element, and therefore the "package" constituent element and the "vm" constituent element need to be deployed (executed) before the "app" constituent element is deployed. Further, the "package" constituent element depends on the "vm" constituent element, and therefore the "vm" constituent element needs to be deployed before the "package" constituent element is deployed. A proper processing order being startup of the VM, installation of the MV, and startup of the APP is derived by the dependencies. Such a dependency extending over components is an element that can be designated only after a target component is determined, that is, an element requiring a designation only with respect to a combination of specific components, and is defined as an addition to a combination definition of components. Accordingly, in a combination definition of different components, a different dependency needs to be designated.

FIG. 75 is a diagram illustrating another example of a system definition defined by a combination of components. FIG. 75 illustrates an example of defining a system when an MW different from the MW related to the MW1 component in FIG. 74 is used, by using an MW2 component related to the different MW. With the change from the MW1 component to the MW2 component, the dependency destination of the "app" constituent element in the APP1 component is changed from the "package" constituent element in the MW1 component to a "service" constituent element being a constituent element included in the MW2 component and corresponding to deployment processing (e.g. startup of service processing) of the MW. Further, the constituent element having a dependency relation with the "vm" constituent element in the VM1 component is changed from the "package" constituent element in the MW1 component to a "package" constituent element in the MW2 component.

Thus, in a case of a specification forming a dependency relation by stepping into the inside of a component, there is a problem that, when a part of components is changed to another component in a system definition, a setting indicating a similar dependency relation with another component that had a dependency relation with the replaced component needs to be made again, and therefore reusability is low.

Accordingly, an object of the present invention is to improve ease of defining a system by, for example, for each combination of components, eliminating need for addition of a setting related to the combination.

Solution to Problem

A system construction assistance system according to the present invention includes: system definition input means that inputs a system definition including at least a designation of a component using a component definition that is capable of including a field definition being information of a field and a setting definition being information about a setting to a constituent element associated with the field, and an assignment definition related to assignment of a constituent element to a field included in the component, the component definition being information that defines a component including at least one or more fields finally associated with one specific constituent element, the field storing information of a constituent element; and setting assignment means that associates a constituent element with a field in a designated component, based on the system definition and the component definition, and assigns a setting to a constituent element constituting a target system, by reflecting a setting content defined with respect to the field in the constituent element associated with the field.

A system construction assistance method according to the present invention includes: when an information processing device accepts a system definition including at least a designation of a component using a component definition that is capable of including a field definition being information of a field and a setting definition being information about a setting to a constituent element associated with the field, and an assignment definition related to assignment of a constituent element to a field included in the component, the component definition being information that defines a component including at least one or more fields finally associated with one specific constituent element, the field storing information of a constituent element, associating a constituent element with a field in a designated component, based on the system definition and the component definition, and assigning a setting to a constituent element constituting a target system, by reflecting a setting content defined with respect to the field in the constituent element associated with the field.

A storage medium according to the present invention stores, a system construction assistance program causing a computer to perform processing of, when accepting a system definition including at least a designation of a component using a component definition that is capable of including a field definition being information of a field and a setting definition being information about a setting to a constituent element associated with the field, and an assignment definition related to assignment of a constituent element to a field included in the component, the component definition being information that defines a component including at least one or more fields finally associated with one specific constituent element, the field storing information of a constituent element, associating a constituent element with a field in a designated component, based on the system definition and the component definition, and assigning a setting to a constituent element constituting a target system, by reflecting a setting content defined with respect to the field in the constituent element associated with the field.

Advantageous Effects of Invention

The present invention is able to improve ease of defining a system.

BRIEF DESCRIPTION OF DRAWINGS

FIG. 3 is a diagram illustrating a definition example of an Ubuntu component in JSON.

FIG. 5 is a diagram illustrating an example of a system definition in JSON.

FIG. 12 is a diagram illustrating an example of output information after system definition deployment, according to the first example embodiment.

FIG. 14 is a diagram illustrating another example of a system definition.

FIG. 15 is a diagram illustrating another example of system configuration information.

FIG. 19 is a diagram illustrating an example of a system definition in JSON.

FIG. 21 is a diagram illustrating a definition example of an Ubuntu component according to the second example embodiment in JSON.

FIG. 23 is a diagram illustrating a definition example of a Tomcat component according to the second example embodiment in JSON.

FIG. 25 is a diagram illustrating another definition example of a Tomcat component according to the second example embodiment in JSON.

FIG. 39 is a diagram illustrating a definition example of an OS port according to the third example embodiment in JSON.

FIG. 44 is a diagram illustrating a representation example of a field and a constituent element, according to a fourth example embodiment, by a GUI.

FIG. 47 is a diagram illustrating a definition example of an OS port according to the fourth example embodiment in JSON.

FIG. 49 is a diagram illustrating a definition example of a WAS port according to the fourth example embodiment in JSON.

FIG. 51 is a diagram illustrating a definition example of an Ubuntu component according to the fourth example embodiment in JSON.

FIG. 53 is a diagram illustrating a definition example of a Tomcat component according to the fourth example embodiment in JSON.

FIG. 55 is a diagram illustrating a definition example of a WebApp component according to the fourth example embodiment in JSON.

FIG. 58 is a diagram illustrating a data example of a constituent element after reference resolution, according to the fourth example embodiment.

FIG. 62 is a diagram illustrating other examples of a system definition according to the fourth example embodiment.

FIG. 63 is a diagram illustrating another example of a system definition according to the fourth example embodiment.

FIG. 65 is a diagram illustrating a definition example of a CentOS component according to the fourth example embodiment in JSON.

FIG. 67 is a diagram illustrating a definition example of a Jetty component according to the fourth example embodiment in JSON.

FIG. 69 is a diagram illustrating a representation example of a type definition of a constituent element according to the fifth example embodiment in JSON.

FIG. 70 is a diagram illustrating a representation example of a constituent element according to the fifth example embodiment in JSON.

FIG. 71 is a diagram illustrating a definition example of a WAS port according to the fifth example embodiment in JSON.

DESCRIPTION OF EMBODIMENTS

First Example Embodiment

Figure 1:
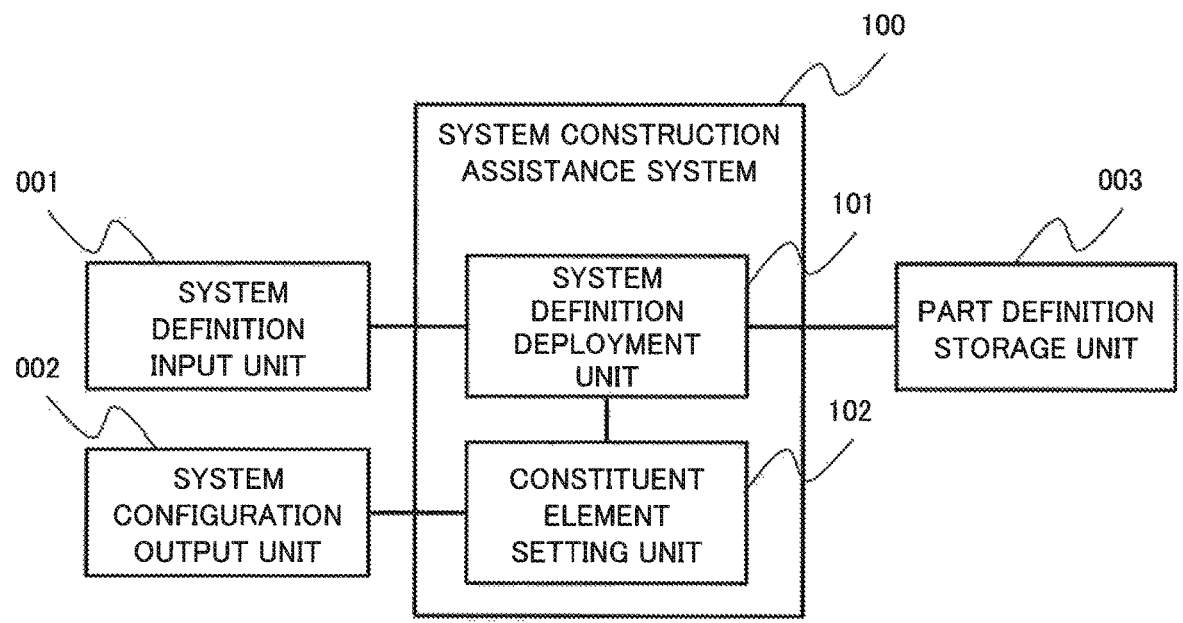
FIG. 1 is a block diagram illustrating a configuration example of a system construction assistance system according to a first example embodiment.

Example embodiments of the present invention will be described below referring to drawings. FIG. 1 is a block diagram illustrating a configuration example of a system construction assistance system according to a first example embodiment. A system construction assistance system 100 according to the first example embodiment is a system providing a configuration definition function of converting a system configuration indicated by using a component into a configuration with a specific constituent element and outputting the converted configuration. As illustrated in FIG. 1, the system construction assistance system 100 includes a system definition deployment unit 101 and a constituent element setting unit 102.

The system definition deployment unit 101 is connected directly or indirectly to a system definition input unit 001 and a part definition storage unit 003 through a network or the like. The constituent element setting unit 102 is connected directly or indirectly to a system configuration output unit 002 through a network or the like. For example, the system definition deployment unit 101 and the constituent element setting unit 102 are provided by a CPU or the like that operates in accordance with a program.

The system definition input unit 001 inputs a system definition representing a configuration of a system being a construction target by using a component defined by a component definition to be described later. For example, the system definition input unit 001 may be various kinds of input devices such as a mouse and a keyboard, or any server device or the like that inputs information through a network.

The system configuration output unit 002 specifies and outputs a configuration of a system indicated by a system definition input by the system definition input unit 001. For example, the system configuration output unit 002 may be various kinds of output devices such as a display device, or any server device or the like that outputs information through a network.

Further, a component according to the present invention includes at least a field storing information about a constituent element. The field is a concept indicating a frame into which information of a constituent element is substituted. By storing information about a constituent element in a field, the present invention finally associates one specific constituent element with the field. Furthermore, it is preferable that an individual field be capable of accommodating a plurality of kinds of constituent elements. A field being capable of accommodating a plurality of kinds of constituent elements means abstraction of constituent elements such as a requirement common to the constituent elements being extracted is performed. Furthermore, a kind of field included in a component is determined by a component definition defining the component. The component definition includes a field definition being information about a field included in a component determined to be a definition target. Additionally, as needed, the component definition may include a setting definition being information about a setting to a constituent element stored in the field.

A system definition input by the system definition input unit 001 according to the present example embodiment is, more specifically, information including at least a designation of a component using a component definition, and an assignment definition related to assignment of a constituent element to a field included in the component. On the other hand, information output by the system configuration output unit 002 is information representing a system configuration with a specific constituent element. Thus, the system construction assistance system 100 according to the present example embodiment has a function of accepting a system definition indicating a configuration of a target system by using a component being a pattern of an abstracted constituent element group, converting the system definition into information represented by a specific constituent element, and outputting the resulting information.

Information output by the system configuration output unit 002 may be hereinafter referred to as system configuration information.

The part definition storage unit 003 stores a part definition being information in which a constituent element constituting a system is abstracted and is defined as a reusable part. The part is a concept including the aforementioned component. Furthermore, a pattern of an abstracted constituent element group (e.g. deployment processing in the aforementioned example) is also described as a component in the present invention. In the present invention, an expression "part" is used as a concept including, for example, a port being a concept not being related to a specific constituent element and abstracting a terminal function for connecting components. For example, the part definition storage unit 003 is provided by a storage device.

The system definition deployment unit 101 receives a system definition from a user through the system definition input unit 001 and converts the system definition into a specific system definition. The specific system definition refers to information in which a constituent element associated with a field included in a component constituting a target system is resolved (specifically designated), and also a relationship between components is resolved (a field related to the field included in the component constituting the target system is specified), with respect to an input system definition.

The constituent element setting unit 102 receives a specific system definition from the system definition deployment unit 101 and assigns settings such as an attribute value and a relevancy with another constituent element to a constituent element constituting a target system.

A system configuration will be described below using a case of defining construction processing of a target system as an example. It is assumed in the present example embodiment that the target system is an IT system. Further, an example of using any program unit included in the construction processing of the IT system as a constituent element, and assisting construction of a system configured with a combination of the constituent elements will be described below. Furthermore, the constituent element is not limited to the construction processing and may be any unit constituting any system.

A component definition according to the present example embodiment includes an identifier (hereinafter referred to as id) of the component definition and a field definition being information about one or more fields included in a component determined as a definition target by the component definition.

Further, a field definition may include a name of the field definition, an initial value of the field (a definition of an instance of a constituent element stored in the field), and a setting definition. The setting definition is information about various kinds of settings to a constituent element stored in the field (e.g. a setting content and a setting method). For example, an attribute value set to the constituent element and a relevancy between the constituent element and another constituent element or the like may be designated as the setting definition. For example, a dependency on another constituent element in particular may be designated as the relevancy. Further, an identifier for identifying an attribute and a value for the attribute may be designated as the attribute value.

Figure 2:
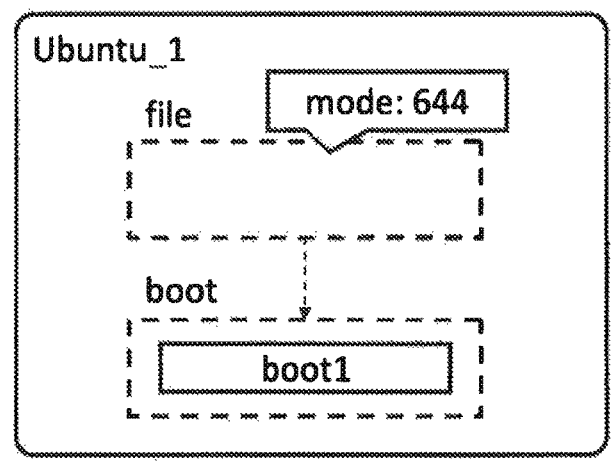
FIG. 2 is a diagram illustrating a definition example of an Ubuntu component by a GUI.

FIG. 2 is a diagram illustrating a definition example of an Ubuntu component by a graphical user interface (GUI). It is assumed that the Ubuntu component is a component compatible with "Ubuntu" being a kind of operating system (OS). FIG. 2 illustrates an example of a component definition assigned with an identifier "Ubuntu_1." The component definition "Ubuntu_1" illustrated in FIG. 2 defines two fields being a "file" field and a "boot" field. Each of "file" and "boot" denotes a name as a field id in a component determined to be a definition target. It is assumed in this example that the "file" field is a field related to a constituent element related to file construction on "Ubuntu" such as generation processing of a file. It is further assumed that the "boot" field is a field related to a constituent element related to startup of "Ubuntu" such as startup processing of the OS. Further, as a setting definition, a value of an attribute "mode" of a constituent element stored in the field being set to "644" and a constituent element stored in the field having a relevancy to a constituent element stored in the "boot" field are designated with respect to the "file" field. Further, a constituent element "boot1" is designated with respect to the "boot" field as an initial value of the field.

A component is hereinafter represented by a rounded-corner rectangle as a representation example of a component definition by a GUI.

Further, a field is represented by a dotted rectangle. Further, a constituent element is represented by a solid rectangle. Further, an attribute value is represented by a balloon attached to a field. Further, a relevancy is represented by a dotted arrow from one field to another field.

Further, a character string added at the upper-right corner inside a rounded-corner rectangle representing a component represents an id of the component definition. Further, a character string added outside the frame of a dotted rectangle representing a field represents an id (name) assigned to the field. In order to allow a user to input any component definition, GUI parts respectively corresponding to designations of such a component, field, constituent element, attribute value, and relevancy may be prepared.

The meaning of a relevancy of the "file" field to the "boot" field being designated from in the "Ubuntu_1" component definition in FIG. 2 will be supplemented. Naturally, file generation processing cannot be executed unless an OS executing the processing is started. Accordingly, the file generation processing shall be executed after OS startup processing in terms of a processing execution order. The relevancy of the "file" field to the "boot" field defines such a constraint on an order relation related to execution of processing as a dependency of the "file" field on the "boot" field.

A component definition may be described in a text format by using a language such as Java Script (registered trademark) Object Notation (JSON), instead of a GUI notation.

FIG. 3 is a diagram illustrating a definition example of an Ubuntu component in JSON. The example illustrated in FIG. 3 is an example of defining the component definition illustrated in FIG. 2 in JSON. FIG. 3 illustrates an example that a system definition in JSON includes three elements being a "type" element, an "id" element, and a "field" element. The "type" element defines information the series of pieces of information is related to and "component definition" indicating a component definition is designated in this example. Further, the "id" element defines an id of the component definition, and "Ubuntu_1" is defined in this example. Further, the "field" element defines a field included in a component defined by the component definition, and two fields being a "file" field and a "boot" field are defined in this example.

Further, in the field definition, two elements being "initial value" and "setting" are further defined. Note that an initial value of the "file" field is null, and a constituent element "boot1" is defined as an "initial value" of the "boot" field. More specifically, based on a "type" element in the initial value definition of the "boot" field, a constituent element with an id being "boot1" is defined as a "value" substituted into the field. A "value" element in an "initial value"

definition of a field is defined based on a "type" element in the initial value definition and a content of the type. In this example, the "type" element is "new definition," and therefore the "value" element is defined in addition. A constituent element is defined as a content of the "value" element. As a definition method of the constituent element, an id of a constituent element may be designated as illustrated in FIG. 3. In this example, "boot1" is defined as such an id.

Further, FIG. 3 illustrates an example of including an "attribute" element and a "dependency" element as a "setting" element in the field definition. For example, a "setting" element in the "file" field includes an "attribute" element and a "dependency" element in the example illustrated in FIG. 3. On the other hand, a "setting" element in the "boot" field defines nothing. The "attribute" element in this example defines an attribute value of a constituent element stored in the field. For example, the "attribute" element may be defined by designating a pair composed of an identifier of the attribute and an attribute value. Further, a "dependency" element defines a dependency included in a constituent element stored in the field on another constituent element. The "dependency" element may be defined by designating a constituent element determined to be a dependency destination in a format indicating a reference to another field in which the constituent element is stored. In this example, a field name added with a dollar mark "$" represents a reference to the field.

A component definition as described above may be previously recorded in a readable manner in the external part definition storage unit 003 or the like. For example, a developer developing a common model, or the like may previously define a model used by a plurality of projects in common in a cross-sectional manner as a pattern of a constituent element group, and store information indicating such a definition in the part definition storage unit 003 as a component definition.

Figure 4:
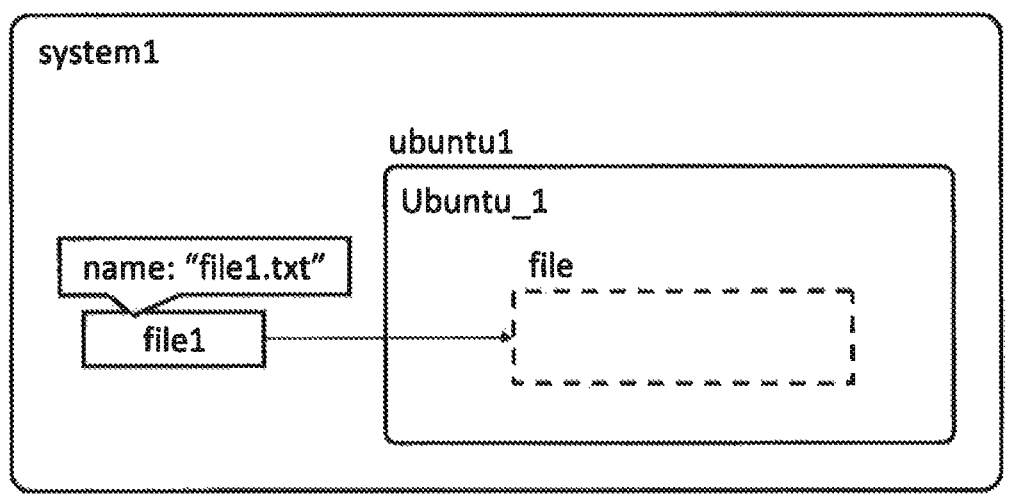
FIG. 4 is a diagram illustrating an example of a system definition input to a system definition input unit 001.

Further, FIG. 4 is a diagram illustrating an example of a system definition input to the system definition input unit 001. FIG. 4 is an example of representing a system definition by a GUI. For example, the system definition may include an identifier (name) of a system indicated by the system definition, information designating one or more components constituting the system, and information about various kinds of settings to the component. The example illustrated in FIG. 4 designates that, as a configuration of a "system1" system, the "system1" includes an "ubuntu1" component being one of instances of a component defined by a component definition "Ubuntu_1." Further, information about substitution of a constituent element into a "file" field included in the "ubuntu1" component is designated. In this example, substitution of a "file1" constituent element into the "file" field of the "ubuntu1" component is designated. Further, inclusion of "file1.txt" in the "file1" constituent element as a value of a "name" attribute is designated.

Similarly to a component definition, a system definition may be defined in JSON.

FIG. 5 is a diagram illustrating an example of a system definition in JSON. The example illustrated in FIG. 5 is an example of defining the system definition illustrated in FIG. 4 in JSON. The system definition illustrated in FIG. 5 includes three elements being a "type" element, an "id" element, and a "component" element. In the case of the system definition, for example, "system definition" indicating that the series of pieces of information is a system definition is designated as the "type" element. Further, an id of a system defined by the system definition is designated as the "id" element. Further, a component included in the system defined by the system definition is designated as the "component" element. In this example, an "ubuntu1" component is solely designated. Furthermore, when two or more components are defined, component names associated with information about the components may be enumerated in the "component" element.

In this example, two elements being "type name" and "substitution" are defined as information of a component. An id indicating an identifier of a component definition defining a component state is designated as the "type name" element. In this example, "Ubuntu_1" is designated. Further, the "substitution" element defines substitution of a constituent element into a field included in the component indicated by the component definition.

Figures 6, 7:
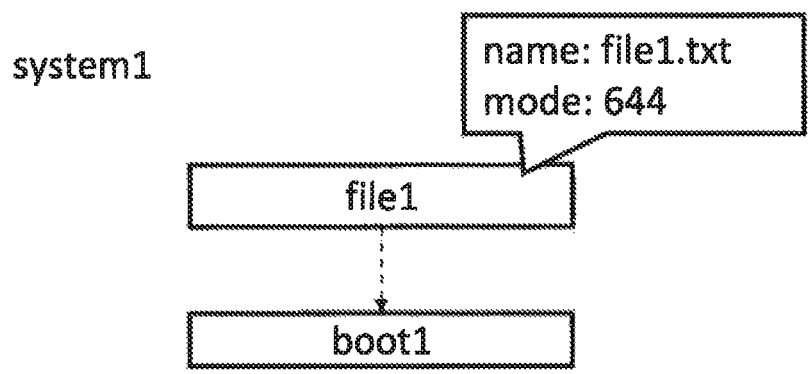
FIG. 6 is a diagram illustrating an example of system configuration information output by a system configuration output unit 002.
FIG. 7 is a diagram illustrating an example of system configuration information in JSON.

Further, FIG. 6 is a diagram illustrating an example of system configuration information output by the system configuration output unit 002. FIG. 6 illustrates a display example of system configuration information by a GUI. Furthermore, FIG. 6 is also an example of a constituent element generation result based on the system definition illustrated in FIG. 5. As illustrated in FIG. 6, with regard to one or more constituent elements constituting a target system, system configuration information may include information specifying the constituent elements and also information assigned with an attribute value and information of a relevancy to another constituent element. The example illustrated in FIG. 6 illustrates that a target system "system1" includes two constituent elements being "file1" and "boot1," and the "file1" constituent element includes a "name" attribute with a value of "file1.txt" and a "mode" attribute with a value of "644" and has a dependency on a "boot1" information element.

Further, FIG. 7 is a diagram illustrating another example of system configuration information output by the system configuration output unit 002. FIG. 7 illustrates an example of system configuration information in JSON. Furthermore, FIG. 7 is also an example of a constituent element generation result based on the system definition illustrated in FIG. 5.

According to the technique described herein, a system definition may define a system configuration other than a construction method of the system, and also a component definition may define a relevancy other than a dependency as a definition of a relevancy.

Figure 8:
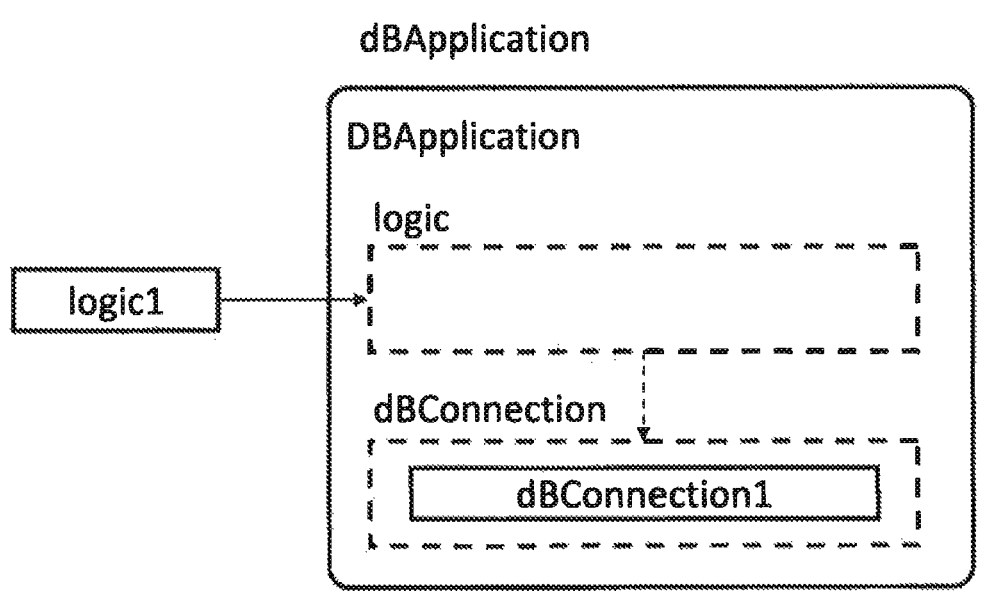
FIG. 8 is a diagram illustrating another example of a system definition.
Figure 9:
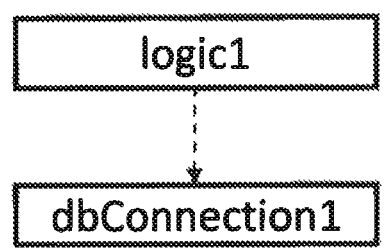
FIG. 9 is a diagram illustrating another example of system configuration information.

FIG. 8 is a diagram illustrating another example of a system definition. Further, FIG. 9 is a diagram illustrating an example of system configuration information based on the system definition illustrated in FIG. 8. Furthermore, both FIGS. 8 and 9 are display examples by a GUI.

The system definition illustrated in FIG. 8 defines that a target system includes a "dBApplication" component being one of instances of a component defined by a component definition "DBApplication," and a constituent element "logic1" is substituted into a "logic" field in the component. Furthermore, the component definition "DBApplication" in the diagram tells that the "dBApplication" component defined by the component definition includes two fields being the "logic" field and a "dBConnection" field, the "dBConnection" field is initialized by "dBConnection1," and also a constituent element stored in the "dBConnection" field has a relevancy to a constituent element stored in the "logic" field. The relevancy of the constituent element stored in the "dBConnection" field to the constituent element stored in the "logic" field indicates that a specific processing function represented as the "logic" field uses a database connection represented as the "dBConnection" field. Consequently, as illustrated in FIG. 9, a use relation between functions or objects is simply derived. Thus, a relevancy between constituent elements may indicate a use relation.

However, unless otherwise specified, a case that a system definition defines construction processing of a target system will be hereinafter used as an example in the description.

Description of Operation

Figure 10:
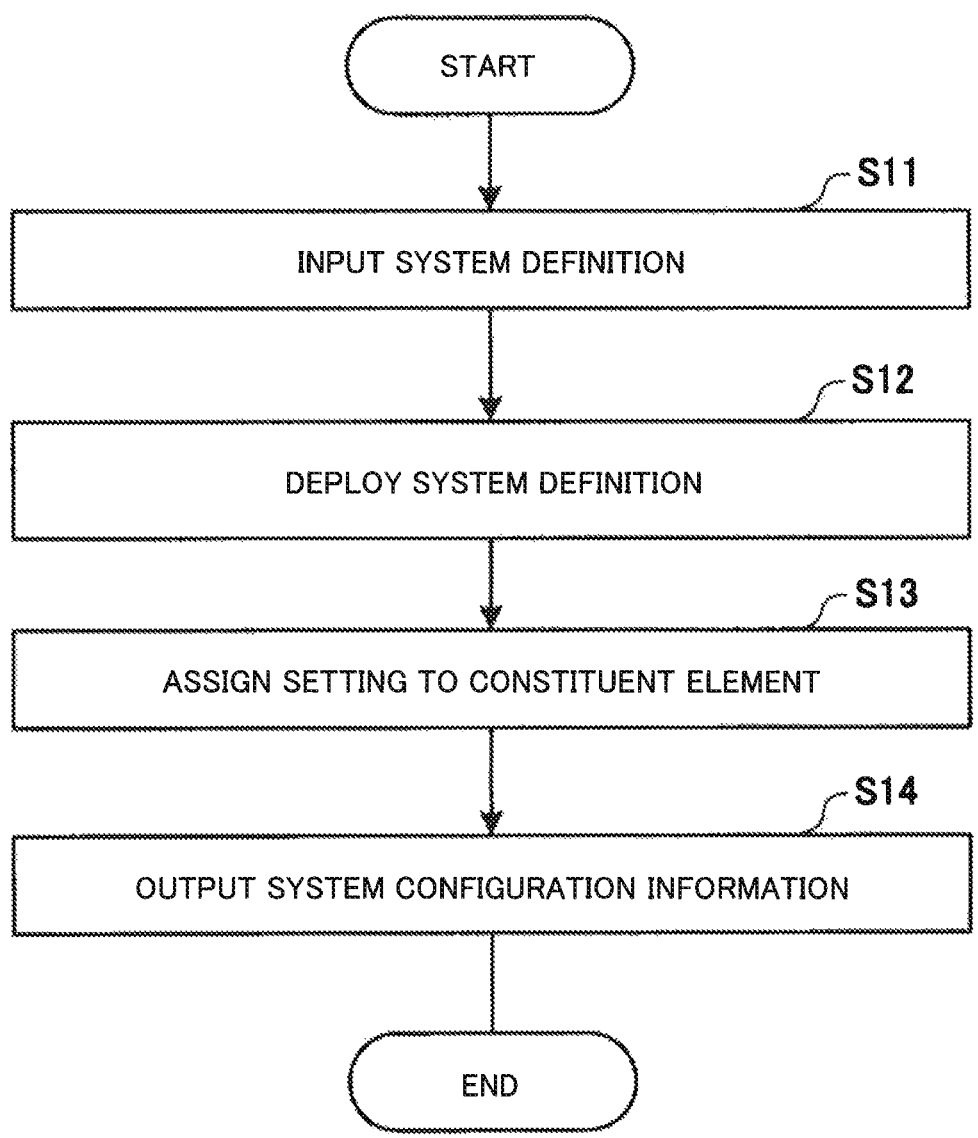
FIG. 10 is a flowchart illustrating an operation example of the first example embodiment.

Next, an operation of the present example embodiment will be described. FIG. 10 is a flowchart illustrating an operation example of the system construction assistance system 100 according to the present example embodiment. In the example illustrated in FIG. 10, first, when receiving a system definition from the system definition input unit 001 (Step S11), the system definition deployment unit 101 reads the system definition. Then, when a component definition referred to by the system definition exists, the system definition deployment unit 101 acquires the component definition from the part definition storage unit 003, resolves a constituent element stored in each field by deploying the system definition, and generates a specific system definition (Step S12). Furthermore, the specific system definition generated in Step S12 is transmitted to the constituent element setting unit 102.

Next, with respect to each constituent element associated with a field included in the specific system definition received from the system definition deployment unit 101, the constituent element setting unit 102 specifies a setting defined with respect to a field storing the constituent element and assigns the setting (Step S13). For example, specifying a setting refers to processing of assigning and setting a dependency and a value of an initial value that are designated with respect to a field to a specific constituent element, based on information of the constituent element stored in another field.

Finally, the constituent element setting unit 102 outputs system configuration information indicating a configuration of a system composed of the constituent element assigned with the setting to the system configuration output unit 002 (Step S14).

Operations of Steps S12 and S13 will be described more in detail below.

Figure 11:
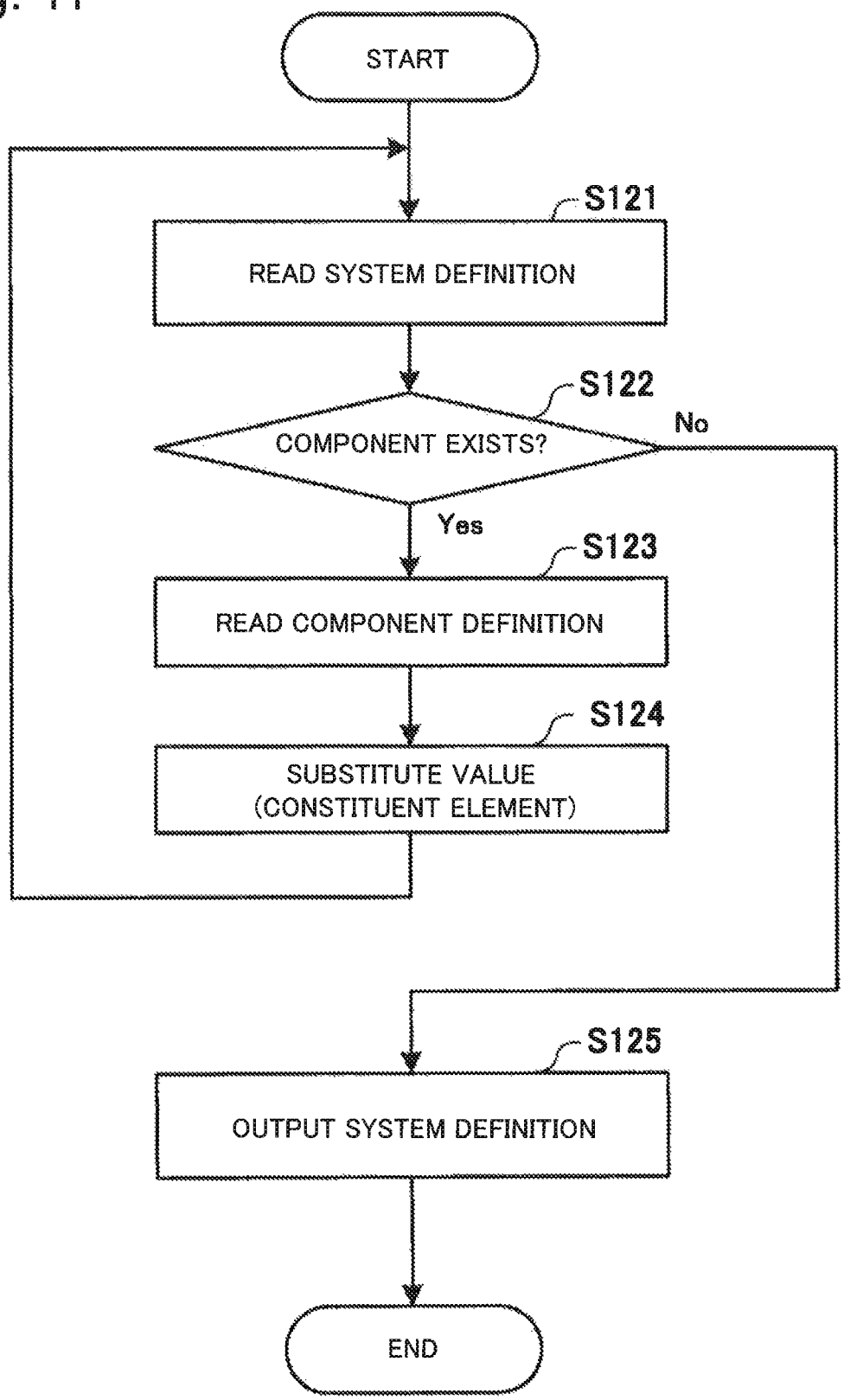
FIG. 11 is a flowchart illustrating a system definition deployment process in a system definition deployment unit according to the first example embodiment.

FIG. 11 is a flowchart illustrating a more detailed operation example of the system definition deployment process (Step S12 in FIG. 10) by the system definition deployment unit 101 according to the present example embodiment. The system definition deployment unit 101 reads the system definition received from the system definition input unit 001 (Step S121) and, when a part designating a component is found in the system definition (Yes in Step S122), acquires a definition thereof from the part definition storage unit 003 or the like (Step S123). Then, based on the obtained component definition, the system definition deployment unit 101 specifies the component by substituting a value (constituent element) into the component (Step S124).

For example, in the case of reading the system definition of "system1" exemplified in FIG. 5, "Ubuntu_1" is designated as a definition of the "ubuntu1" component, and therefore "Ubuntu_1" is acquired from the part definition storage unit 003. For example, for the part definition storage unit 0003, all that is needed is to include a function of accepting an id of a component definition and returning the corresponding component definition. As an example, the part definition storage unit 003 may be provided by an http server, a file server, or a DB server. In this example, the system definition deployment unit 101 transmits a component definition request designating id="Ubuntu_1" to the part definition storage unit 003 and acquires the component definition illustrated in FIG. 3. Then, when substitution of a value (constituent element) into a field included in the component is defined in the system definition or the acquired component definition, the system definition deployment unit 101 substitutes the value. For example, in the case of the "system1" definition exemplified in FIG. 5, substitution of the "file1" constituent element into the "file" field defined by the system definition being a reference source of the component definition and substitution of the "boot1" constituent element into the "boot" field defined by the component definition are performed, and the component obtained as a result is determined as the "ubuntu1" component.

When a reference to every component definition is resolved (No in Step S122), the system definition deployment unit 101 outputs the specified system definition (Step S125) and ends the system definition deployment process.

As a result of the above, for example, a specific system definition as illustrated in FIG. 12 is generated. FIG. 12 is a diagram illustrating an example of a specific system definition in JSON as output information after the system definition deployment. In this example, "system definition 2" is set to a "type" element in order to indicate that the definition is a specific system definition. Furthermore, at this point, settings of an attribute value and a dependency are still set to a field in the component.

Figure 13:
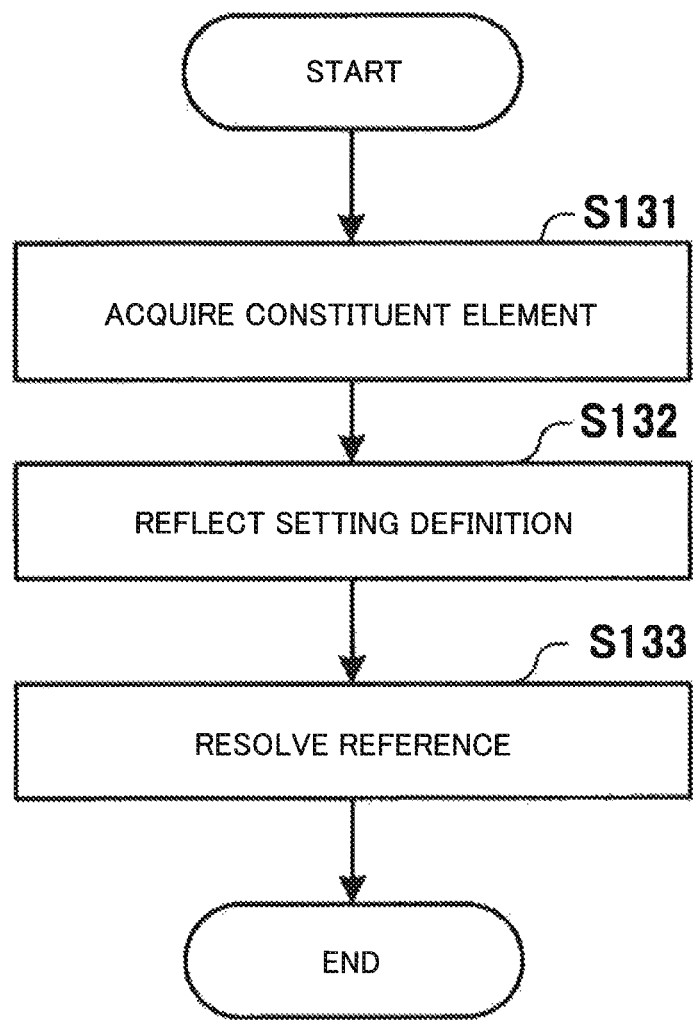
FIG. 13 is a flowchart illustrating a constituent element setting process in a constituent element setting unit according to the first example embodiment.

Further, FIG. 13 is a flowchart illustrating a more detailed operation example of the constituent element setting process (Step S13 in FIG. 10) by the constituent element setting unit 102 according to the present example embodiment. The constituent element setting unit 102 executes the following three steps with every field included in the specific system definition generated by the system definition deployment unit 101 as a target. Specifically, the constituent element setting unit 102 first acquires a constituent element stored in a field determined to be a target (Step S131) and assigns a setting set to the field to the constituent element (Step S132). For example, in Step S132, the constituent element setting unit 102 sets an attribute value and the like to the constituent element. Specifically, the acquisition of the constituent element and the assignment of the setting to the constituent element may include generating or acquiring definition information of the constituent element in a target system and reflecting a setting content set to the field in the definition information (e.g. substitution of a value). At this time, when a reference to another field exists in the setting definition of the field, the constituent element setting unit 102 converts a designation of the reference destination into an id of a constituent element stored in a field at the reference destination and reflects the setting content (Step S133).

For example, when the specific system definition exemplified in FIG. 12 is input, a "file" field and a "boot" field in an "ubuntu1" component are extracted from the system definition. Then, a "file1" constituent element and a "boot1" constituent element are acquired from the fields. Then, a setting content set to the "file" field is assigned to the "file1" constituent element. In this example, "644" is added to the "file1" constituent element as a value of a "mode" attribute, and also a dependency on "boot1" being a specific constituent element related to the "boot" field is assigned to the "file1" constituent element. Consequently, the system configuration information as illustrated in FIGS. 6 and 7 is generated.

Description of Effect

The present example embodiment is able to use a component being a pattern of an abstracted constituent element group and cause definition information of such a component to include, as information about a constituent element related to the component, a setting (an attribute value and a dependency relation with another constituent element) included in the constituent element in common. Thus, out of settings to an individual constituent element, a setting having reusability can be encapsulated as component information. Further, with respect to a field being a frame storing information of an abstracted constituent element, the present example embodiment has a mechanism of defining a setting to a constituent element being a content of the frame and, after a combination of constituent elements is finalized, reflecting the setting set to the frame in the constituent element being the content. Accordingly, the present example embodiment is able to save time and effort for re-setting a similar setting at every change of a component combination. Thus, by using a component setting being already defined, even when a combination of constituent elements is changed, addition of a setting to a related constituent element becomes unnecessary, thus facilitating system definition.

For example, a case that a system with a configuration different from "system1" indicated by the system definition illustrated in FIG. 5 is redefined as "system2" is considered. At this time, for example, it is assumed that a system definition as illustrated in FIG. 14 is input. FIG. 14 is a diagram illustrating another example of a system definition. Similarly to "system1," the example illustrated in FIG. 14 includes an "ubuntu1" component defined by a component definition "Ubuntu_1." However, a constituent element substituted into a "file" field in the "ubuntu1" component is different. Specifically, the example defines that a constituent element with an id being "file2" is substituted, and the constituent element has a value "file2.py" as a "name" attribute and a value "755" as a "mode" attribute.

When such a system definition is input, for example, system configuration information as illustrated in FIG. 15 is output. The system configuration information illustrated in FIG. 15 tells that the system "system2" includes a "boot1" constituent element and a "file2" constituent element, and the "file2" constituent element includes "file2.py" as the "name" attribute and "755" as the "mode" attribute, and also has a dependency on the "boot1" constituent element.

By predefining the component definition "Ubuntu_1," existence of the "boot1" constituent element, existence of the "file1" constituent element, and a value "664" as the "mode" attribute value and dependency information on "boot1" with respect to the "file1" constituent element are automatically added to the system configuration information of the system "system1." Thus, it may be understood that, merely by making a slight description of a designation of a component definition and a unique designation in the system as a system definition, a more amount of information can be incorporated, and an amount of description required for an amount of output can be reduced. Further, even in a case that part of a system configuration is changed, such as changing a type of a file used on "Ubuntu," when the component definition "Ubuntu_1" is already defined, the system configuration can be changed without re-setting a dependency on boot processing, the dependency being included in construction processing of the "file2" file on "Ubuntu," merely by setting substitution of a value into the "file" field. Thus, the present example embodiment is able to provide reusability for a dependency between constituent elements.

Second Example Embodiment

Next, a second example embodiment of the present invention will be described. A configuration of a system construction assistance system 100 according to the second example embodiment is similar to that according to the first example embodiment except that operations of a system definition deployment unit 101 and a constituent element setting unit 102 are different. A same reference sign is hereinafter given to a part similar to that according to the first example embodiment, and description thereof is omitted.

The present example embodiment is different in that a part definition includes, in addition to a component definition, a port definition being information defining a port, a component definition may include a port designation, and a system definition may include a wire designation. The port is a concept indicating a terminal for defining a connection relation between components, and the wire is a concept indicating a connection between ports. The system definition deployment unit 101 and the constituent element setting unit 102, according to the present example embodiment, differ from the first example embodiment in handling information about the port and the wire.

Similarly to a component, a port according to the present invention includes one or more fields. A field included in a port stores information of a constituent element required when a component including the port is connected to another component.

A port definition includes an id of the port definition and a field definition defining one or more fields included in a port defined by the port definition.

Figures 16, 17:
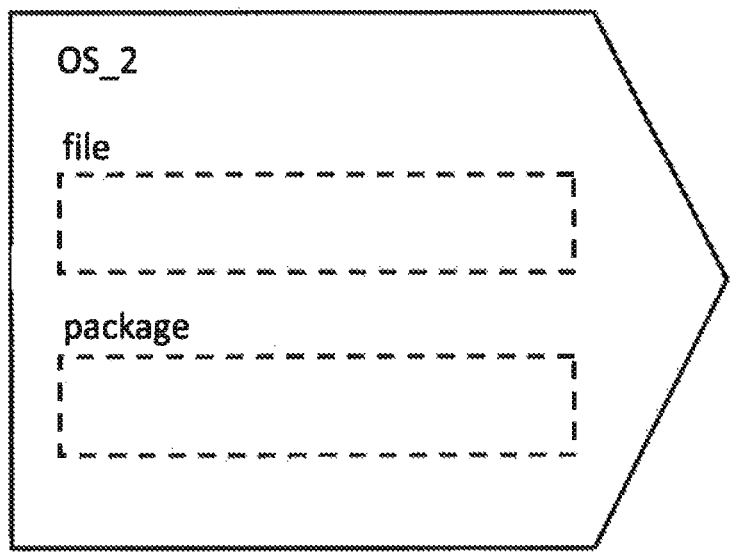
FIG. 16 is a diagram illustrating a definition example of an OS port by a GUI.
FIG. 17 is a diagram illustrating a definition example of an OS port in JSON.

FIG. 16 is a diagram illustrating a definition example of an OS port according to the present example embodiment by a GUI. It is assumed that the OS port is an element abstracting connection processing for a component generally related to an OS, such as an Ubuntu component, to be connected to another component. FIG. 16 illustrates an example of a port definition assigned with an id being "OS_2." The port definition "OS_2" illustrated in FIG. 16 includes two fields being a "file" field and a "package" field. It is assumed that the "file" field is a field related to a constituent element related to file construction such as generation processing of a file required for connection to another component on a common OS. It is further assumed that the "package" field is a field related to a packaged resource or the like provided by a configuration management system in middleware operating under the OS. Furthermore, a setting definition and an initial value are not particularly designated with respect to these two fields in the port definition.

It is assumed below that a port in a port definition is represented by a base shape as a representation example by a GUI.

FIG. 17 is a diagram illustrating a definition example of an OS port according to the present example embodiment in JSON. The example illustrated in FIG. 17 is an example of defining the port definition illustrated in FIG. 16 in JSON. As illustrated in FIG. 17, the port definition of the OS port in JSON is basically similar to the component definition illustrated in FIG. 3 except that "port definition" indicating a port definition is designated as a "type" element. Specifically, the port definition of the OS port may be configured in such a way that the "type" element, an "id" element, and a "field" element are included, an identifier of the port definition is designated as the "id" element, and the "field" element enumerates information of fields included in a port defined by the port definition.

Further, a component definition according to the present example embodiment may include an id of the component definition, a definition of a field included in a component defined by the component definition, and a designation of a port included in the component defined by the component definition. It may be assumed that a wire always connects a pair of ports defined by a same port definition.

Further, the port may be classified into two kinds of ports being a service port and a reference port. The service port is a concept indicating a terminal on the connection-accepting side, and the reference port, on the other hand, is a concept indicating a terminal on the connection-requesting side. In such a case, a wire may connect a pair composed of a service port and a reference port, the ports being defined by a same port definition, and may not connect a pair of service ports or a pair of reference ports.

It is further assumed that a reference to another field may be designated as a type in addition to a new definition in an initial value definition of a field, according to the present example embodiment. The purpose is to cause a necessary setting to be encompassed in a process of connecting components, by propagating a constituent element between fields in different components.

Figure 18:
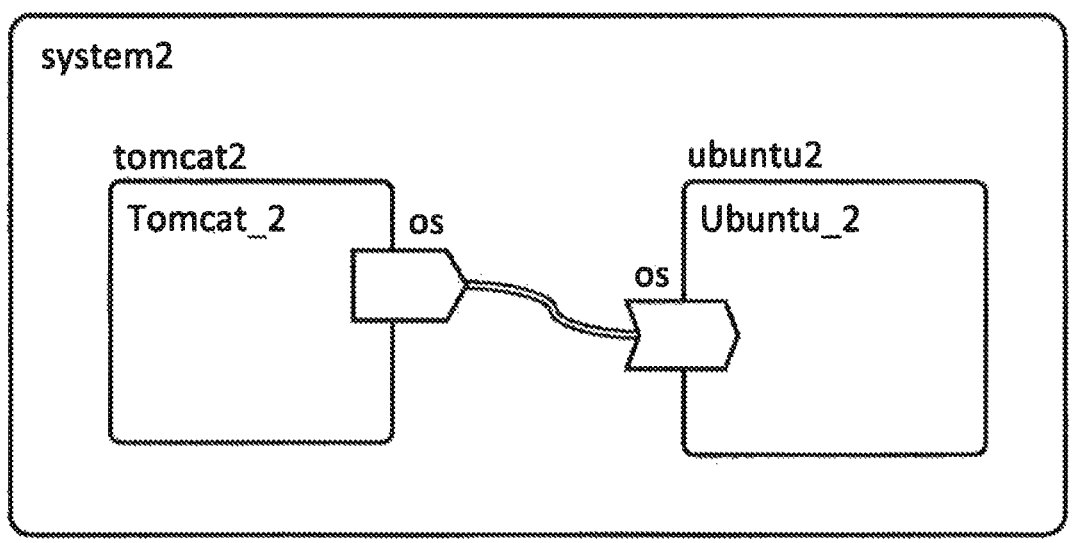
FIG. 18 is a diagram illustrating a definition example of a target system according to a second example embodiment by a GUI.

FIG. 18 is a diagram illustrating an example of a system definition according to the present example embodiment. FIG. 18 illustrates an example of a system definition by a GUI. The system definition illustrated in FIG. 18 tells that a target system "system2" includes a "tomcat2" component being an instance of a component defined by a component definition "Tomcat_2" and an "ubuntu2" component being an instance of a component defined by a component definition "Ubuntu_2." Further, the system definition tells that an "os" reference port included in the "tomcat2" component is connected to an "os" service port included in the "ubuntu2" component by a wire. It is assumed that "tomcat2" being an example of a Tomcat component is a component related to "Tomcat" being a kind of web application. The component definitions "Tomcat_2" and "Ubuntu_2" in this example will be described later.

As representation examples by a GUI, it is assumed below that a service port is represented by a shape with two sides facing one another, one of which being convex-shaped and the other being concave-shaped (hereinafter referred to as a fletching type), a reference port is represented by a home-base shape, and a wire is represented by a double line.

Further, FIG. 19 is a diagram illustrating an example of a system definition according to the present example embodiment in JSON. The example illustrated in FIG. 19 is an example of defining the system definition illustrated in FIG. 18 in JSON. The system definition illustrated in FIG. 19 includes a "wire" element in addition to a "type" element, an "id" element, and a "component" element. The "wire" element includes a "connection source" element designating a connection source port and a "connection destination" element designating a connection destination port. In this example, "$ubuntu2.os" is designated as the "connection source" element and "$tomcat2.os" is designated as the "connection destination" element.

By designating connection of ports included in a component by a wire after thus designating the component by using a component definition being already defined, a user is able to easily define even a system in which a plurality of components operate together.

Figure 20:
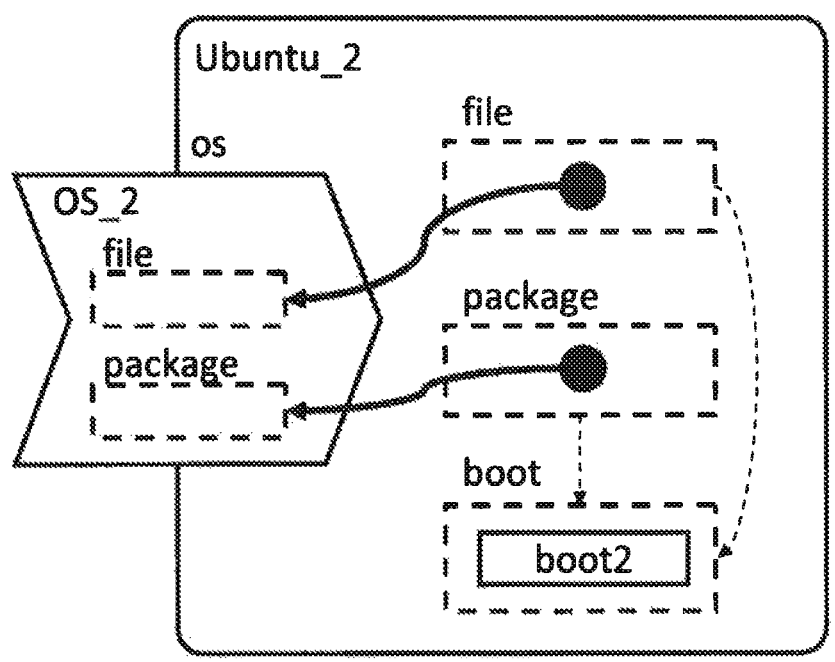
FIG. 20 is a diagram illustrating a definition example of an Ubuntu component according to the second example embodiment by a GUI.

FIG. 20 is a diagram illustrating a definition example of an Ubuntu component according to the present example embodiment by a GUI. FIG. 20 illustrates an example of a component definition assigned with an id being "Ubuntu_2." The component definition "Ubuntu_2" illustrated in FIG. 20 defines that a component defined by the component definition includes three fields being a "file" field, a "package" field, and a "boot" field, and also includes an "os" port defined by a port definition "OS_2" as a service port.

Further, as initial value definitions of the "file" field and the "package" field, references to a "file" field and a "package" field in the "os" port are respectively defined. On the other hand, as an initial value definition of the "boot" field, newly generating a "boot2" constituent element is defined. Further, a dependency on the "boot" field is defined with respect to each of the "file" field and the "package" field.

As a representation example by a GUI, it is assumed below that a definition of a value by a reference to a field is represented by a solid arrow from a black circle assigned to a field on the reference source side to a reference destination field.

Further, FIG. 21 is a definition example of an Ubuntu component according to the present example embodiment in JSON. The example illustrated in FIG. 21 is an example of defining the component definition illustrated in FIG. 20 in JSON. The component definition illustrated in FIG. 21 includes a "service port" element for designating a service port, in addition to a "type" element, an "id" element, and a "field" element. In this example, an "os" port being a port defined by a port definition "OS_2" is designated in the "service port" element. Further, in this example, in initial value settings of a "file" field and a "package" field included in a component defined by "Ubuntu 2," "reference" is designated as a "type" and "$os.file" and "$os.package" are respectively designated as "reference destination." In this example, the designations respectively indicate a "file" field and a "package" field in the "os" service port. Thus, as a method of representing an element contained in an element, a representation method of connecting the element names with a dot "." may be adopted. Furthermore, when indicating an element contained in a higher level component element, such as a case of a field in a port indicating a field in a component in a body, a representation method of representing a higher level element by two dots ".." may be adopted.

Figure 22:
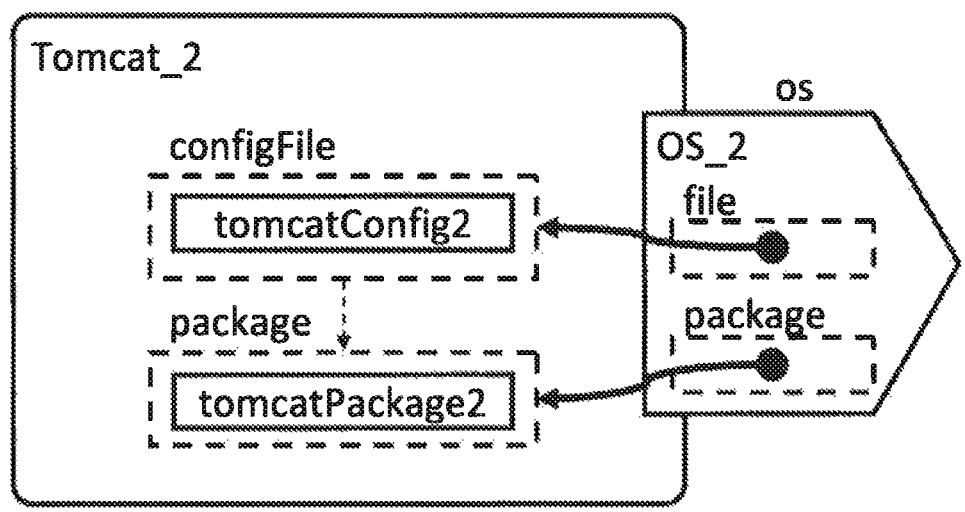
FIG. 22 is a diagram illustrating a definition example of a Tomcat component according to the second example embodiment by a GUI.

Further, FIG. 22 is a definition example of a Tomcat component according to the present example embodiment by a GUI. FIG. 22 illustrates an example of a component definition assigned with an id being "Tomcat_2." The component definition illustrated in FIG. 22 tells that a component defined by the component definition includes two fields being a "configFile" field and a "package" field. The component definition further tells that the component includes an "os" port defined by a port definition "OS_2" as a reference port. Further, in this example, in initial value settings of the "configFile" field and the "package" field that are included in the component defined by "Tomcat_2," a "tomcatConfig2" constituent element and a "tomcatPackage2" constituent element are newly defined, respectively. Additionally, a dependency on the "package" field is defined with respect to the "configFile" field. Further, with respect to a "file" field and a "package" field in the "os" port, substitution of values by references from the "configFile" field and the "package" field in the component including the port are respectively defined.

FIG. 23 is a diagram illustrating a definition example of a Tomcat component according to the present example embodiment in JSON. The example illustrated in FIG. 23 is an example of defining the component definition illustrated in FIG. 22 in JSON. The component definition illustrated in FIG. 23 includes a "reference port" element for designating a reference port, in addition to a "type" element, an "id" element, and a "field" element. In this example, an "os" port defined by a port definition "OS_2" is defined in the "reference port" element. Further, in this example, a "tomcatConfig2" constituent element and a "tomcatPackage2" constituent element are newly defined in initial value settings of a "configFile" field and a "package" field that are included in a component defined by "Tomcat_2," respectively. Additionally, a dependency on the "package" field is defined in the "configFile" field. Further, with respect to a "file" field and a "package" field in the "os" port, the example defines that, as a setting related to substitution of values into the fields, contents of the "configFile" field and the "package" field that are included in the component in a body including the port are referred to.

Figure 24:
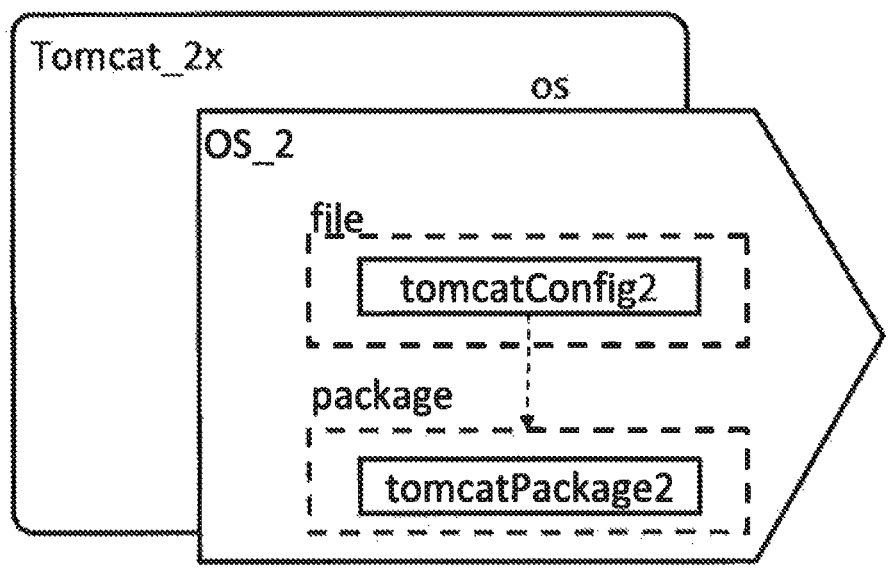
FIG. 24 is a diagram illustrating another definition example of a Tomcat component according to the second example embodiment by a GUI.

FIG. 24 is a diagram illustrating another definition example of a Tomcat component according to the present example embodiment. FIG. 24 illustrates an example of a component definition by a GUI. In a component definition "Tomcat_2x" illustrated in FIG. 24, a component in a body does not directly include a field, and a value is directly substituted into a field included in a reference port included in the component in the body. Note that, in this case, a component may be interpreted to indirectly include a field through a port included in the component. Furthermore, in this example, substitution of a value into a field in the reference port is designated by a new definition of a constituent element instead of a reference to another field. Further, in terms of a dependency, with respect to a "tomcatConfig2" constituent element stored in a "file" field in an "os" port, a dependency on a "package" field in the same port is designated. Thus, a dependency may be set by directly designating a constituent element in a field. Such a dependency vanishes in a case that an original constituent element is overwritten by substitution of another constituent element when the component is reused, or the like.

Furthermore, when retention of a similar dependency is preferred in an overwritten constituent element, a dependency on a constituent element stored in the "package" field in the "os" port by using a reference to the field may be designated with respect to the "file" field in the same port.

Further, FIG. 25 is a diagram illustrating another definition example of a Tomcat component according to the present example embodiment in JSON. The example illustrated in FIG. 25 is an example of defining the component definition illustrated in FIG. 24 in JSON. Furthermore, while FIG. 25 illustrates an example of designating, with respect to a "file" field in an "os" port, a dependency on a constituent element stored in the field by using a reference to a "package" field in the same port, direct designation of a "tomcatpackage2" constituent element is also possible. In this case, for example, the dependency may be designated as "dependency":["tomcatpackage2"] or may be designated as "# tomcatpackage2" by adopting a symbol, such as "#," indicating direct designation of a constituent element.

Description of Operation

Figure 26:
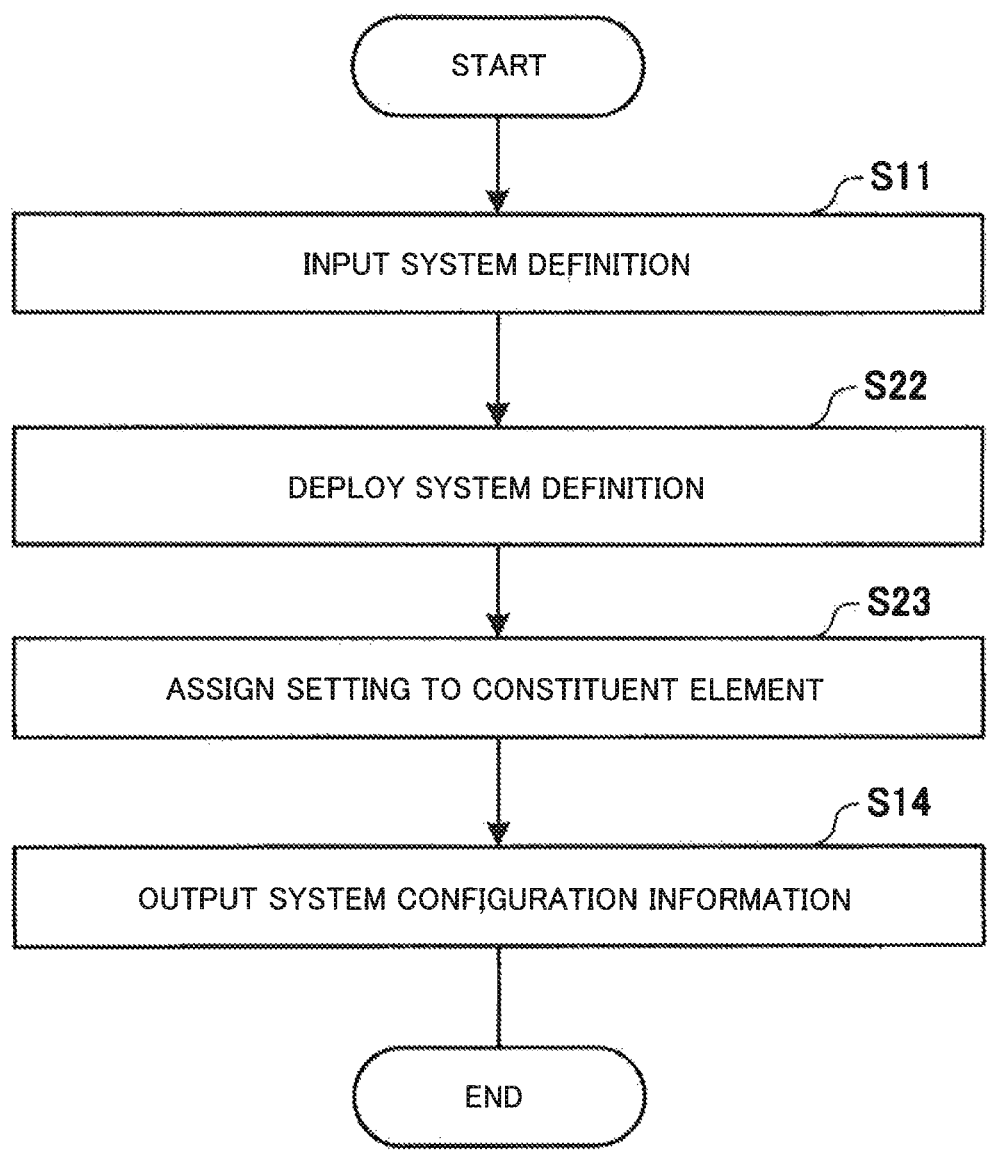
FIG. 26 is a flowchart illustrating an operation example of the second example embodiment.

Next, an operation of the present example embodiment will be described. FIG. 26 is a flowchart illustrating an operation example of the system construction assistance system 100 according to the present example embodiment. A same reference sign is hereinafter given to an operation similar to that of the first example embodiment, and description thereof is omitted.

The operation of the present example embodiment differs from the operation of the first example embodiment in a system definition deployment process (Step S22) generating a specific system definition by the system definition deployment unit 101 and a constituent element setting process (Step S23) by the constituent element setting unit 102.

Figure 27:
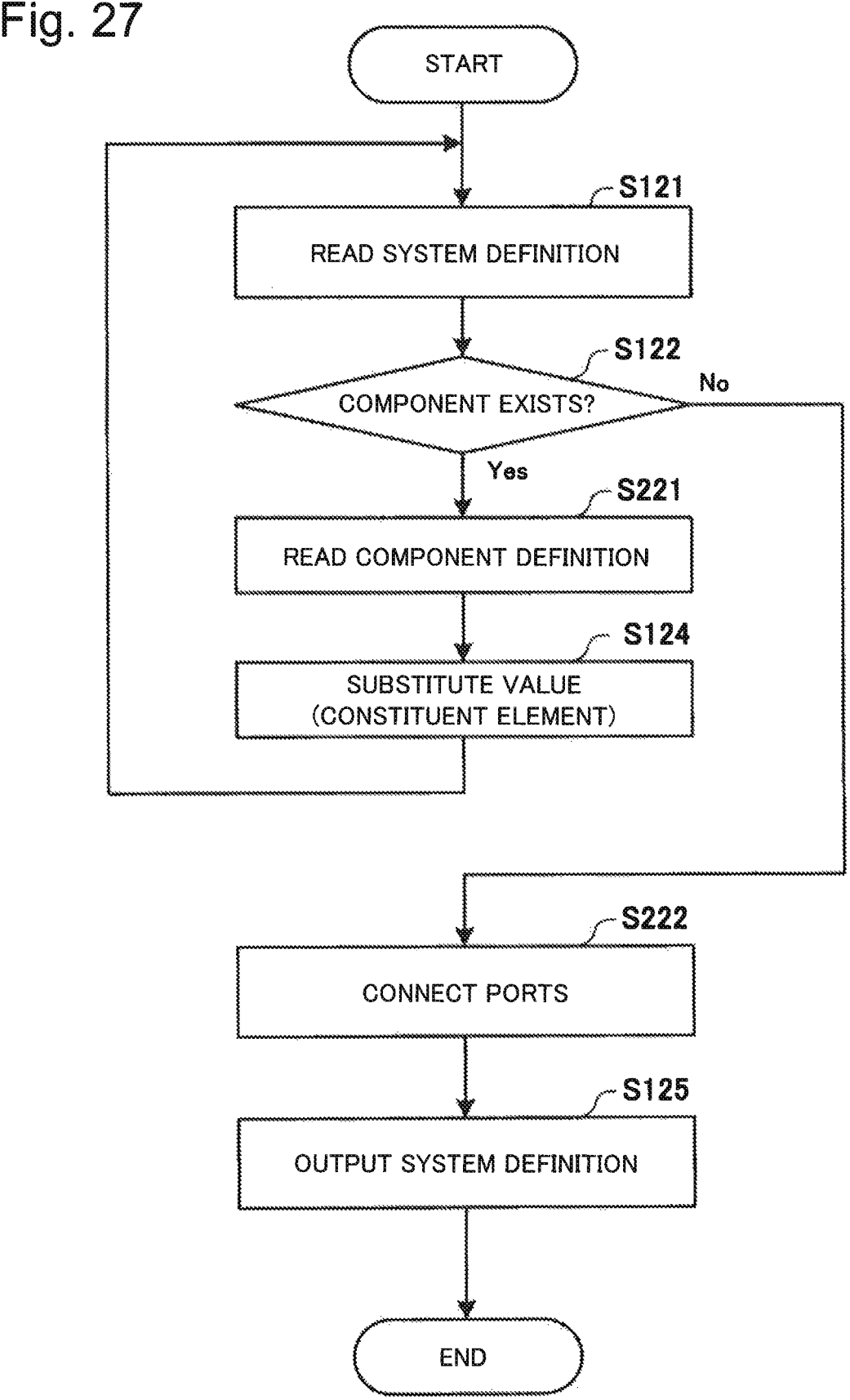
FIG. 27 is a flowchart illustrating a system definition deployment process in a system definition deployment unit according to the second example embodiment.

FIG. 27 is a flowchart illustrating a more detailed operation example of the system definition deployment process by the system definition deployment unit 101 according to the present example embodiment. In the system definition deployment process according to the present example embodiment, the system definition deployment unit 101 differs from that according to the first example embodiment in a content of a component definition reading process (Step S221) and addition of an operation of connecting ports, in accordance with a wire definition, after every component is read (Step S222). The connection of ports represents, in addition to retaining existence of a connection relation between ports determined to be connection targets as configuration information, making a value of a field transferable between ports determined to be connection targets, and more specifically, performing processing of propagating (transferring) information of a constituent element to a target port, in accordance with a system definition, a component definition, and a port definition.

Figure 28:
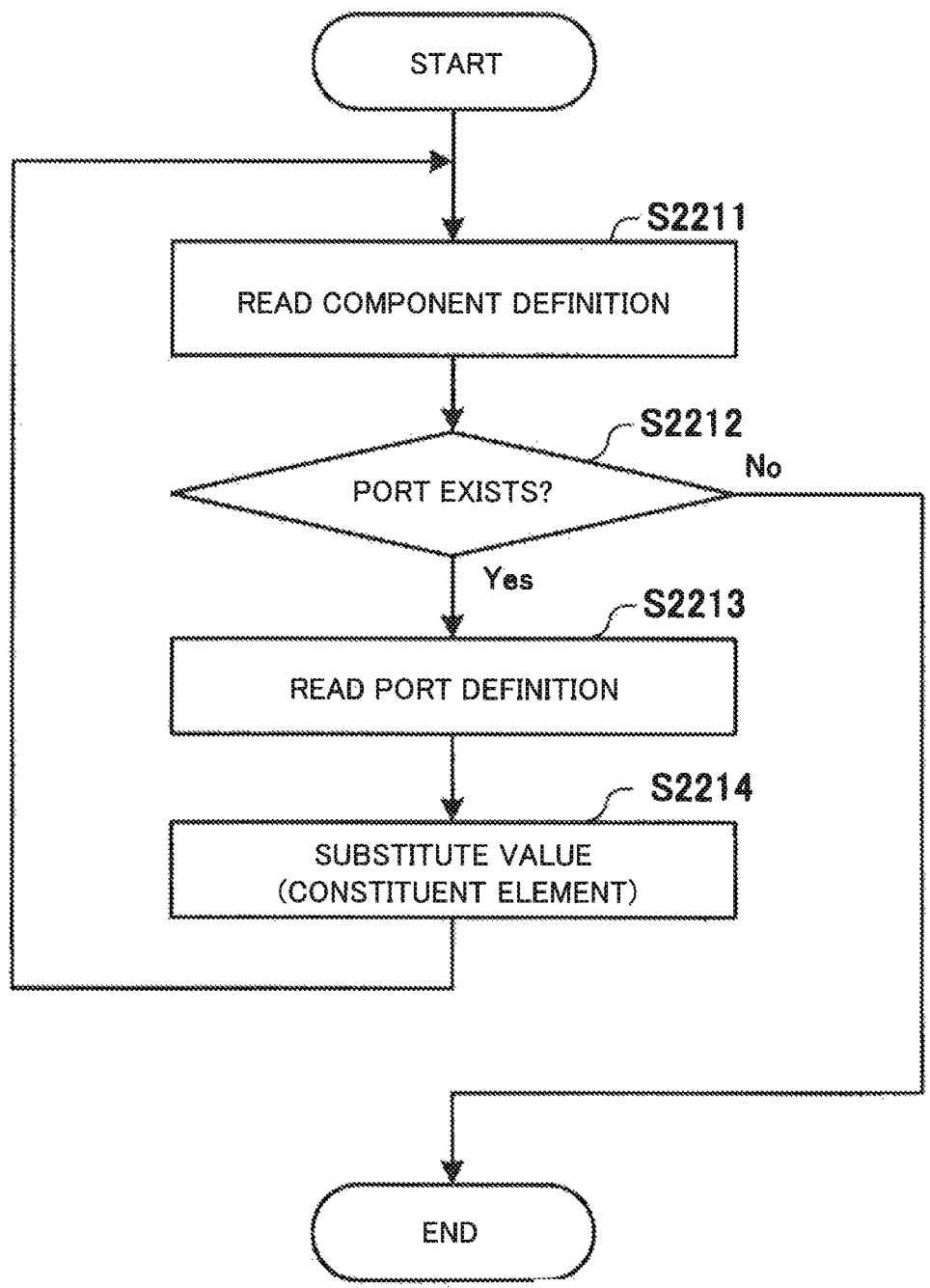
FIG. 28 is a flowchart illustrating a component reading process in the system definition deployment unit according to the second example embodiment.

Further, FIG. 28 is a flowchart illustrating a more detailed operation example of the component definition reading process (Step S221 in FIG. 27) by the system definition deployment unit 101 according to the present example embodiment. In the example illustrated in FIG. 28, when a component definition referred to by a system definition exists, the system definition deployment unit 101 reads the component definition from the part definition storage unit 003 or the like (Step S2211). Then, when a port definition referred to by the component definition exists (Yes in Step S2212), the system definition deployment unit 101 reads the port definition from the part definition storage unit 003 or the like (Step S2213). Then, the system definition deployment unit 101 generates a specific system definition by performing substitution of a value (information element) for each field included in a component indicated by the system definition, in accordance with the component definition and the port definition, and specifying an information element included in the component (Step S2214).

For example, a case that the system definition exemplified in FIG. 18 is input in a state that the aforementioned port definition "OS_2," component definition "Ubuntu_2," and component definition "Tomcat_2" are retained in the part definition storage unit 003 is considered. In this example, the system definition deployment unit 101 acquires "Ubuntu_2" and "Tomcat_2" being definitions of components contained in the "system2" system indicated by the system definition. Further, in response to the "OS_2" port definition being referred to in the component definitions as a port definition of the "os" port, the system definition deployment unit 101 acquires the port definition. The system definition deployment unit 101 further substitutes values (constituent elements) into fields included in the components and the ports, based on the acquired port definition. At this time, when "reference" is set as a substitution definition, a value defined at a reference destination is substituted. In this example, substitution of values (constituent elements) by references to the "configFile" field and the "package" field in the component in the body is defined in the "os" reference port in the "tomcat2" component in "system2." Consequently, the "os" port defined by the port definition "OS_2" is set as an "os" reference port in the "tomcat2" component after a reference to a "tomcat2.configFile" field in the body component is substituted into the "file" field, and also a reference to the "tomcat2.package" field is substituted into the "package" field.

Further, in this example, an initial value setting by a reference from the "file" field in the "os" service port is defined with respect to the "file" field in the "ubuntu2" component in "system2," and also an initial value setting by a reference from the "package" field in the "os" service port is defined with respect to the "package" field in the "ubuntu2" component. Consequently, a reference to the "file" field in the "os" service port included in the "ubuntu2" component being a body is set to the "file" field in the component. Further, a reference to the "package" field in the "os" service port included in the "ubuntu2" component is similarly set to the "package" field in the component.

When every reference in every port definition is resolved (No in Step S2212), the system definition deployment unit 101 ends the component definition reading process.

Furthermore, when every reference in every component definition is resolved (No in Step S122 in FIG. 27), the system definition deployment unit 101 connects ports in accordance with the wire definition included in the system definition (Step S222). As connection processing of ports, the present example embodiment propagates (transfers) a value stored in each field in the reference port to a related field in the service port. Consequently, two ports connected by a wire are integrated into one.

Figure 29:
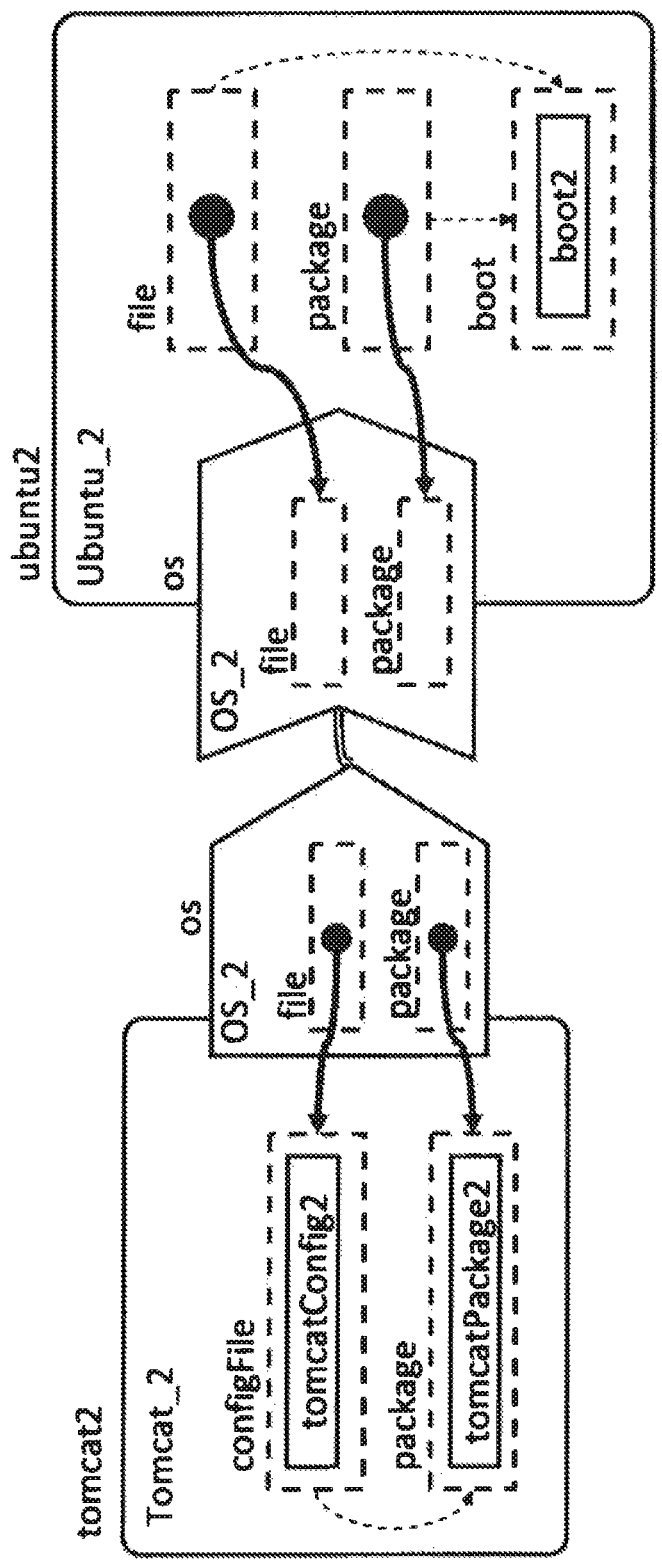
FIG. 29 is a diagram illustrating a data example after component reading, according to the second example embodiment.

For example, it is assumed that, as a result of reading the component definition and the port definition, a specific system definition in which every field is resolved except for a field in the service port is generated as illustrated in FIG. 29. In port connection processing, the system definition deployment unit 101 according to the present example embodiment performs processing of transferring a value of a field in the "os" reference port being a connection source to a value of a related field in the "os" service port being a connection destination, based on a wire setting included in the system definition. Consequently, values stored in the "file" field and the "package" field in the "os" reference port in the "tomcat2" component being a connection request source are transferred to the "file" field and the "package" field in the "os" service port in the "ubuntu2" component being a connection request destination. For example, a reference to the "tomcat2.configFile" field as a value set to a "tomcat2.os.file" field is transferred to an "ubuntu2.os.file" field in this example. The same holds for the "package" field.

Next, when completing the port connection processing on every wire, the system definition deployment unit 101 outputs a specified system definition (Step S125) and ends the system definition deployment process.

Figure 30:
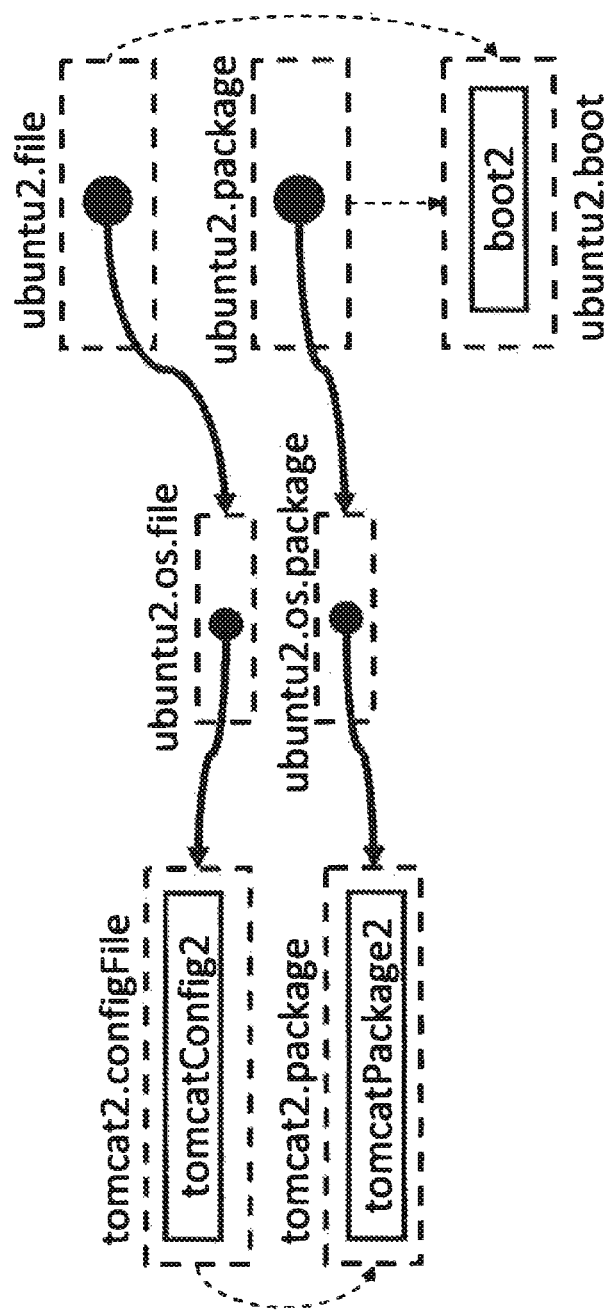
FIG. 30 is a diagram illustrating a data example after system definition deployment, according to the second example embodiment.

FIG. 30 is a diagram illustrating an inter-field relation after port connection. Fields in a specific system definition after port connection are exclusively extracted based on the aforementioned system definition, and FIG. 30 illustrates a relation between the fields. Note that, while the "os" reference port in the "tomcat2" component is not illustrated in the example illustrated in FIG. 30 since a value of a field in the "os" reference port in the "tomcat2" component is considered to be reflected as is in a related field in the "os" service port in the "ubuntu2" component being a connection destination, the "os" reference port in the "tomcat2" component may remain. In that case, for example, a "tomcat2.os.file" field may be provided between the "tomcat2.configFile" field and the "ubuntu2.os.file" field, and a reference destination of the "ubuntu2.os.file" field may be set to the "tomcat2.os.file" field. The same holds for the "package" field. In either description, by a multistage reference setting being resolved in the subsequent constituent element setting process, a constituent element related to a series of fields in the reference relation is specified to a value stored in a field determined to be a final reference destination.

Figure 31:
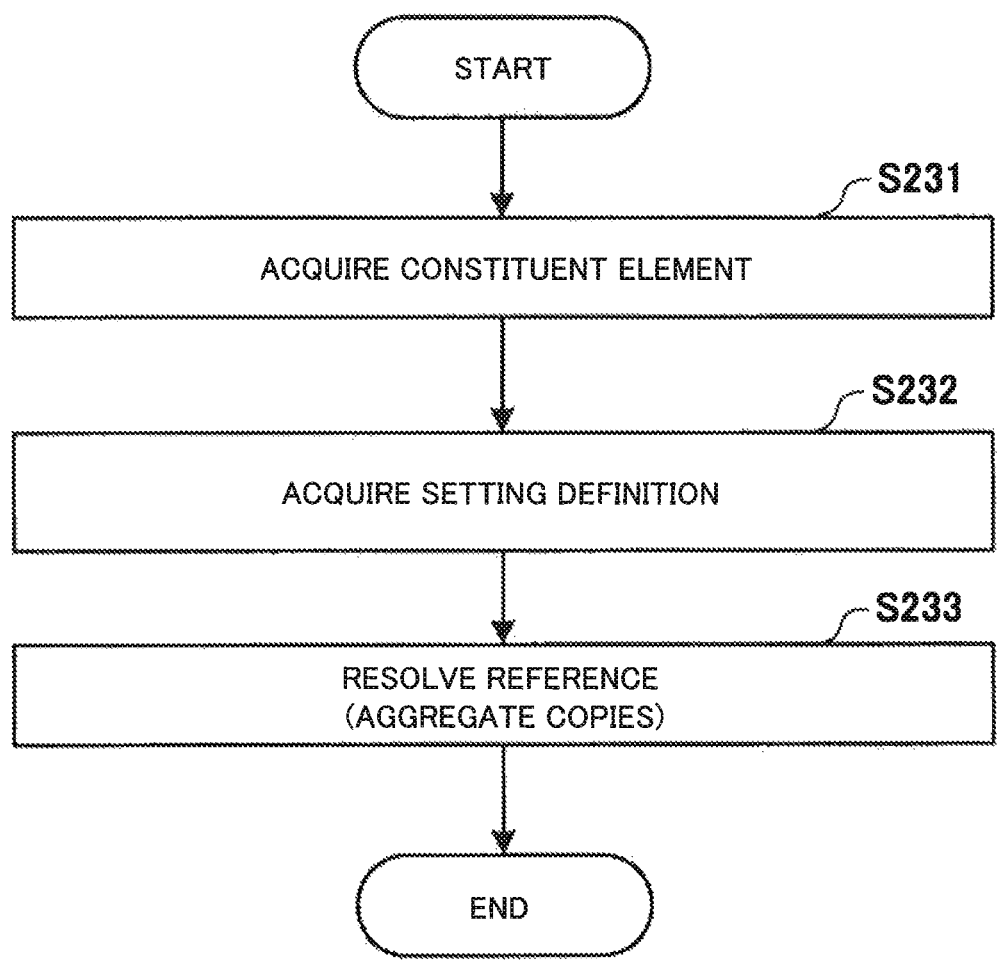
FIG. 31 is a flowchart illustrating a constituent element setting process in a constituent element setting unit according to the second example embodiment.

Further, FIG. 31 is a flowchart illustrating a more detailed operation example of the constituent element setting process (Step S23 in FIG. 26) by the constituent element setting unit 102 according to the present example embodiment. The constituent element setting unit 102 executes processing similar to that according to the first example embodiment on every field in the specific system definition generated by the system definition deployment unit 101. However, the present example embodiment is different in that a constituent element associated with each field may be a copy by a reference. In terms of this point, the constituent element setting unit 102 according to the present example embodiment first checks a value stored in each field and, when the value directly designates a constituent element, simply acquires the constituent element. On the other hand, when the value designates a reference to another field, the constituent element setting unit 102 copies information of a constituent element stored in a field at a reference destination and, after storing the information in a field at a reference source, acquires information finally stored in a target field (Step S231). At this time, when a value stored in the field at the reference destination designates a reference to yet another field, the constituent element setting unit 102 further recursively performs processing of copying information of a constituent element stored in the another field being the reference destination and storing the information in the field at the reference source, and stores information of a constituent element stored in a field determined to be a final reference destination in a field at each reference source. For example, when a two-stage reference is set, a copy of a copy of an original constituent element is generated. For example, as constituent element information, a copy of the constituent element may include an element of an identifier appropriately generated in such a way not to be redundant and an element of an identifier of a constituent element at a copy source.

Figure 32:
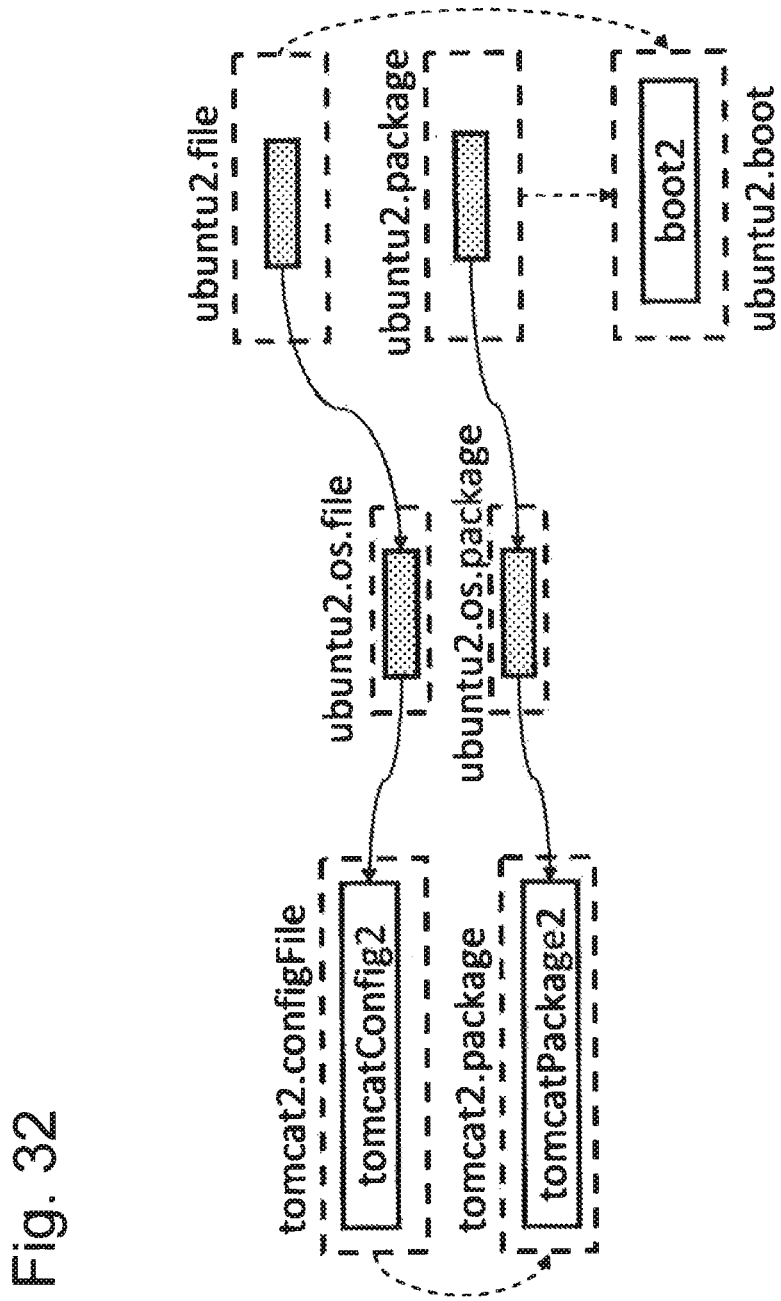
FIG. 32 is a diagram illustrating an inter-field relationship after reference resolution, according to the second example embodiment.

FIG. 32 is a diagram illustrating an inter-field relationship after resolving a constituent element by a reference in the specific system definition illustrated in FIG. 30. In FIG. 32, a constituent element not having an id inside (a shaded rectangle out of solid rectangles in the diagram) represents a copy of a constituent element indicated by an arrow, and a solid arrow drawn from a copy of a constituent element to the constituent element or from a copy to a copy indicates a constituent element at a copy source.

Figures 33, 34:
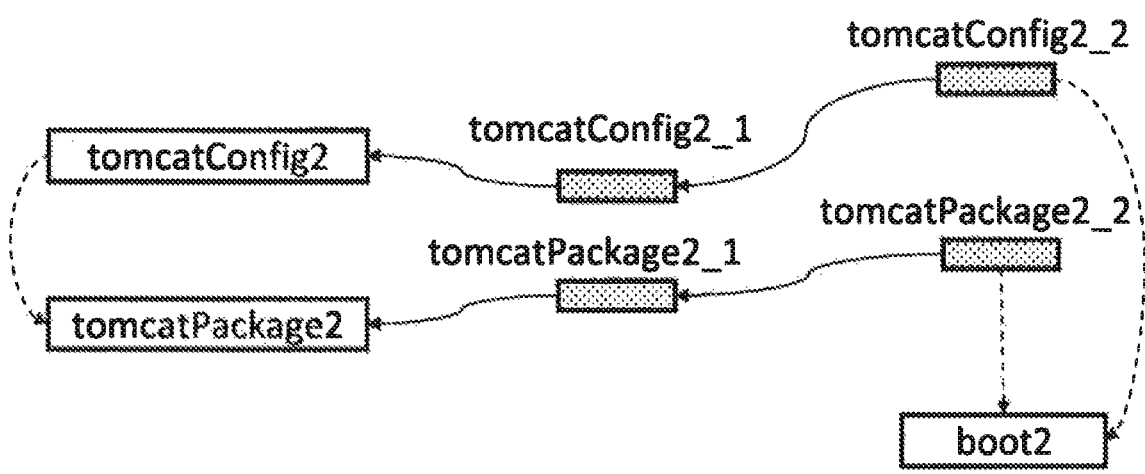
FIG. 33 is a diagram illustrating a data example of a constituent element after reference resolution, according to the second example embodiment.
FIG. 34 is a diagram illustrating a relationship between constituent elements after settings are assigned, according to the second example embodiment.

Further, FIG. 33 is a diagram illustrating a data example of a constituent element after reference resolution. FIG. 33 illustrates an example of information of a constituent element stored in the "file" field in the "os" service port in the "ubuntu2" component illustrated in FIG. 32 (i.e. the "ubuntu2.os.file" field). As a result of undergoing port connection processing based on a wire and reference resolution processing, the "file" field may retain, as information of the constituent element, information including an identifier of a constituent element at a copy source (the "tomcatConfig2" in this example) and a virtual identifier of the copied constituent element stored in the field ("tomcatConfig2_1" in this example), as illustrated in FIG. 33. Furthermore, in this example, a constituent element being a copy is expressed by assigning [original constituent element name+ "_" (underscore)+number] as a virtual identifier of the copied constituent element.

Next, based on information about a setting (setting definition) to a constituent element retained in each field, the constituent element setting unit 102 assigns a setting to a constituent element or a copied constituent element stored in the field (Step S232).

FIG. 34 is a diagram illustrating a relationship between constituent elements after settings are assigned based on the inter-field relationship illustrated in FIG. 32. As illustrated in FIG. 34, a content set to a field is assigned as is to a constituent element stored in the field. Furthermore, in FIG.

Figures 35, 36:
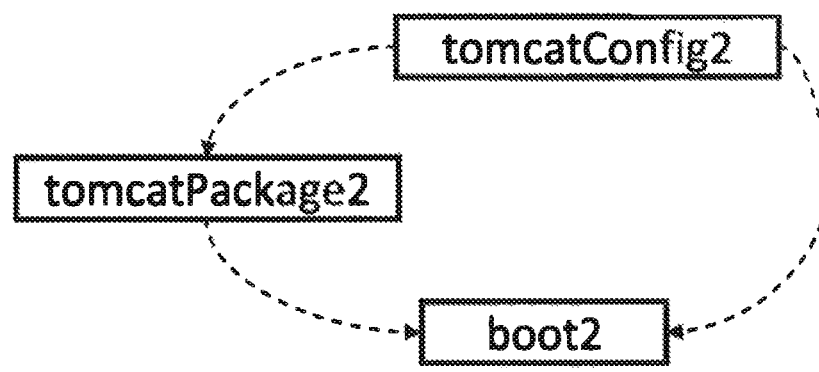
FIG. 35 is a diagram illustrating a data example of a constituent element after settings are assigned, according to the second example embodiment.
FIG. 36 is a diagram illustrating an example of system configuration information according to the second example embodiment by a GUI.

34, a name added above a shaded rectangle representing a copy of a constituent element indicates an id of the copy. Further, FIG. 35 is a diagram illustrating a data example of a constituent element after settings are assigned, according to the present example embodiment. The example illustrated in FIG. 35 is an example of information of a copy of a constituent element stored in the "file" field in the "ubuntu2" component (i.e. "ubuntu2.file" field) in FIG. 34.

A reference definition in a setting to a constituent element in a field is designated in a component definition defining the field, and therefore a reference destination may be searched for with a component in which the reference is defined as a scope. For example, it is assumed that a definition of a reference destination of a dependency defined with respect to the "file" field in the "ubuntu2" component in "system2" is "$boot." In this case, a "boot" field may be searched for in the "ubuntu2" component. Consequently, an "ubuntu2.boot" field is discovered in this example.

When assignment of a setting to a constituent element in each field is completed, the constituent element setting unit 102 resolves a reference in a setting to a constituent element in a field and also aggregates every setting assigned to a copy into a constituent element being a copy source (Step S233).

The constituent element setting unit 102 according to the present example embodiment performs aggregation processing of aggregating settings performed on a copy of a constituent element into a copy source. For example, it is assumed that the relevancy between constituent elements as illustrated in FIG. 34 is constructed as a result of assigning settings, based on the information illustrated in FIG. 32. In this case, a dependency of a copy "tomcatConfig2_2" stored in the "ubuntu2.file" field on a constituent element "boot2" stored in the "ubuntu2.boot" field is aggregated into the "tomcatConfig2" constituent element being an original copy source. Similarly, a dependency of a copy "tomcatPackage2_2" stored in an "ubuntu2.package" field on the constituent element "boot2" stored in the "ubuntu2.boot" field is aggregated into a "tomcatPackage2" constituent element being an original copy source.

Figures 37, 38:
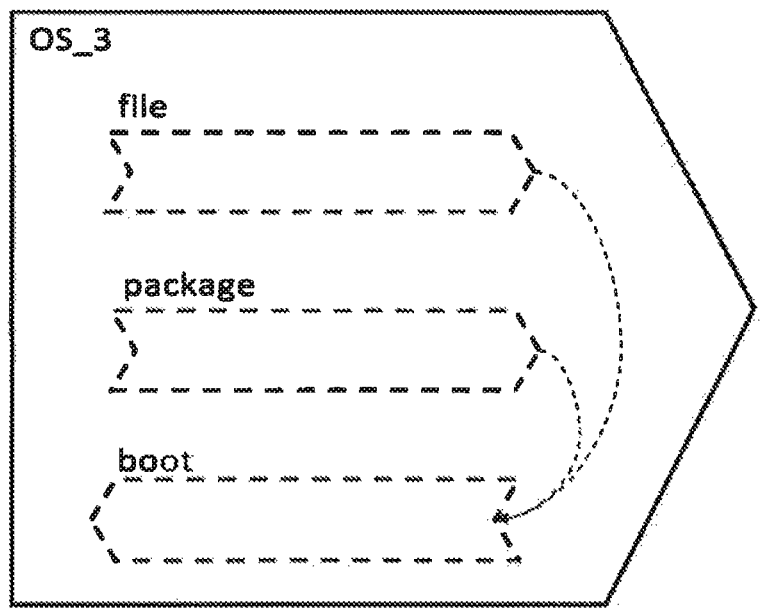
FIG. 37 is a diagram illustrating an example of system configuration information according to the second example embodiment in JSON.
FIG. 38 is a diagram illustrating a definition example of an OS port according to a third example embodiment by a GUI.

Consequently, system configuration information as illustrated in FIGS. 36 and 37 is generated. Note that FIG. 36 is a diagram illustrating an example of system configuration information by a GUI, and FIG. 37 is a diagram illustrating an example of system configuration information in JSON. Both FIGS. 36 and 37 illustrate a same configuration. FIGS. 36 and 37 tell that "system2" includes three constituent elements being "tomcatConfig2," "tomcatPackage2," and "boot2," the "tomcatConfig2" constituent element has a dependency on each of the "tomcatPackage2" constituent element and the "boot2" constituent element, and the "tomcatPackage2" constituent element has a dependency on the "boot2" constituent element.

Description of Effect

The present example embodiment enables all settings defined in a plurality of components to be aggregated into a constituent element and assigned, and also abstracts a definition related to substitution of a constituent element into a field in a reusable manner. Consequently, a user is able to define a system configuration more efficiently, merely by defining a wire. More specifically, by enabling a setting definition related to substitution of a constituent element into a field to designate a reference to another field (adding an abstraction element of substitution), the present example embodiment is able to propagate a setting content such as an attribute value and a dependency that are set to the field, based on a reference relation. Further, while such a reference relation is finalized only after a combination of components is determined, the present example embodiment has a mechanism of performing setting of a reference relation by using a field, and also connecting the settings in a propagation-enabled manner by using abstracted parts being a port and a wire. By thus combining abstraction of substitution with abstraction of a setting target, propagation of a setting is enabled without sacrificing reusability. With such a configuration, the present example embodiment is able to define a system configuration more efficiently.

Furthermore, while the present example embodiment has been described taking a case of the system using "Ubuntu" as an example, "CentOS" may be used in place of "Ubuntu." In that case, a definition almost similar to "Ubuntu2" may be generated as "CentOS_2," and an instance of a component defined by the component definition "CentOS_2" may be designated by a system definition. Furthermore, when information for distinguishing between OSs needs to be included in the "boot" constituent element, a method of providing a setting related to a name attribute in a setting definition of the "boot" field and designating a value such as "ubuntu" or "centOS," in the "Ubuntu2" component definition and the "CentOS_2" component definition, may be cited.

Even in a case that an OS component is changed, when a port is defined by using a common port definition such as an "os" port, a setting required for connection between components after the change can be propagated to a constituent element or a copy thereof stored in each field, merely by changing a wire definition, and therefore a system configuration can be defined more efficiently.

Third Example Embodiment

Next, a third example embodiment of the present invention will be described. A configuration of a system construction assistance system 100 according to the third example embodiment is similar to that according to the second example embodiment except that operations of a system definition deployment unit 101 and a constituent element setting unit 102 are different. A same reference sign is hereinafter given to a part similar to that according to the first and second example embodiments, and description thereof is omitted.

The present example embodiment differs from the second example embodiment in providing types being an accept-field and a provide-field for a field included in a port. The accept-field is a field handling propagation of a constituent element from a reference port to a service port. Accordingly, with respect to the accept-field, substitution of a value is accepted only from a component including the port as a reference port, except for propagation by connection between ports. On the other hand, the provide-field is a field handling propagation of a constituent element from a service port to a reference port. Accordingly, with respect to the provide-field, substitution of a value is accepted only from a component including the port as a service port, except for propagation by connection between ports. The system definition deployment unit 101 and the constituent element setting unit 102, according to the third example embodiment, differ from those according to the second example embodiment in handling definition information related to the types.

FIG. 38 is a diagram illustrating a definition example of an OS port according to the present example embodiment by a GUI. FIG. 38 illustrates an example of a port definition assigned with an identifier being "OS_3." The port definition "OS_3" illustrated in FIG. 38 defines two accept-fields being a "file" field and a "package" field, and one provide-field being a "boot" field as fields included in a port defined by the port definition. Further, in this example, a dependency on the "boot" field is defined with respect to each of the "file" field and the "package" field.

As illustrated in FIG. 38, as a representation example of a field by a GUI, an accept-field is represented herein by a fletching type the right side of which being convex, and a provide-field is represented by a fletching type the left side of which being convex.

Further, FIG. 39 is a diagram illustrating a definition example of an OS port according to the present example embodiment in JSON. The example illustrated in FIG. 39 is an example of defining the port definition illustrated in FIG. 38 in JSON. As illustrated in FIG. 39, a port definition of an OS port in JSON may be basically similar to a component definition except that a "type" element is "port definition" and a "field element" is separated into an "accept-field" element and a "provide-field" element. A content in the port definition in this example is similar to that in FIG. 38. Specifically, the port definition illustrated in FIG. 39 defines a port definition as the "type" element, defines "OS_3" as an "id" element, and defines that the "file" field and the "package" field are included as "accept-field" elements, and the "boot" field is included as "provide-field."

It is assumed that values are substituted into the "file" field and the "package" field that are accept-fields from related fields in a component including the port as a reference port. On the other hand, it is assumed that a value is supplied to the "boot" field being a provide-field from a related field in a component including the port as a service port. This indicates that it is assumed that a component including a port defined by the port definition as a service port is related as a host to a component including a port defined by the port definition as a reference port. By providing a distinction of fields included in a port being an accept-field and a provide-field, an inter-field relationship in a port, the relationship being defined in a component, according to the second example embodiment, can be defined in the port, and therefore a definition related to a dependency as well as the port can be reused.

Figure 40:
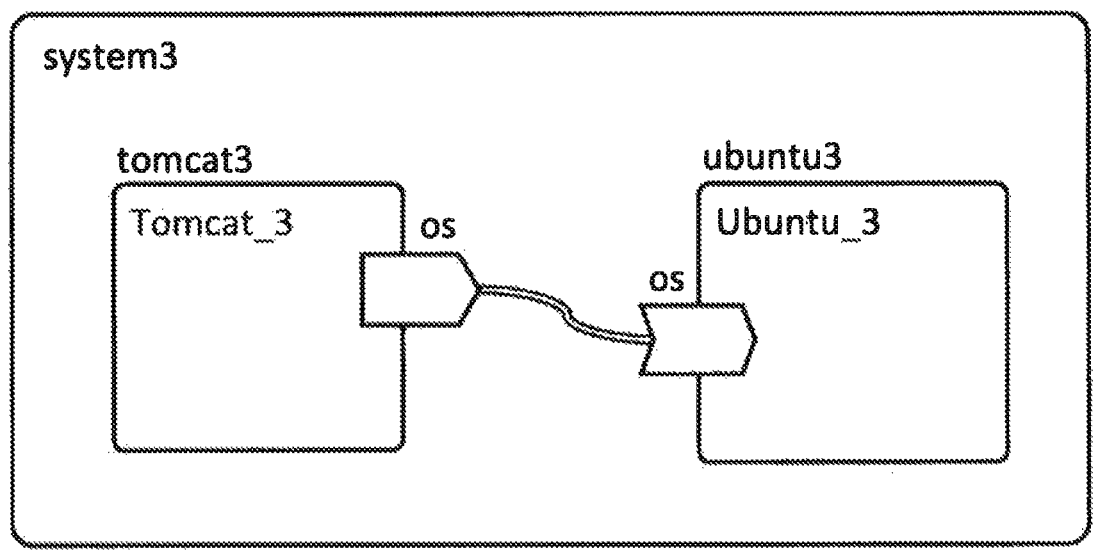
FIG. 40 is a diagram illustrating an example of a system definition according to the third example embodiment.

A use example of an OS port according to the present example embodiment will be described below. FIG. 40 is a diagram illustrating an example of a system definition according to the present example embodiment by a GUI. The system definition illustrated in FIG. 40 tells that a target system "system3" includes a "tomcat3" component being an instance of a component defined by a component definition "Tomcat_3" and an "ubuntu3" component being an instance of a component defined by a component definition "Ubuntu_3," and also an "os" reference port included in the "tomcat3" component and an "os" service port included in the "ubuntu3" component are connected by a wire. The component definition "Tomcat_3" and "Ubuntu_3" will be described later.

Figure 41:
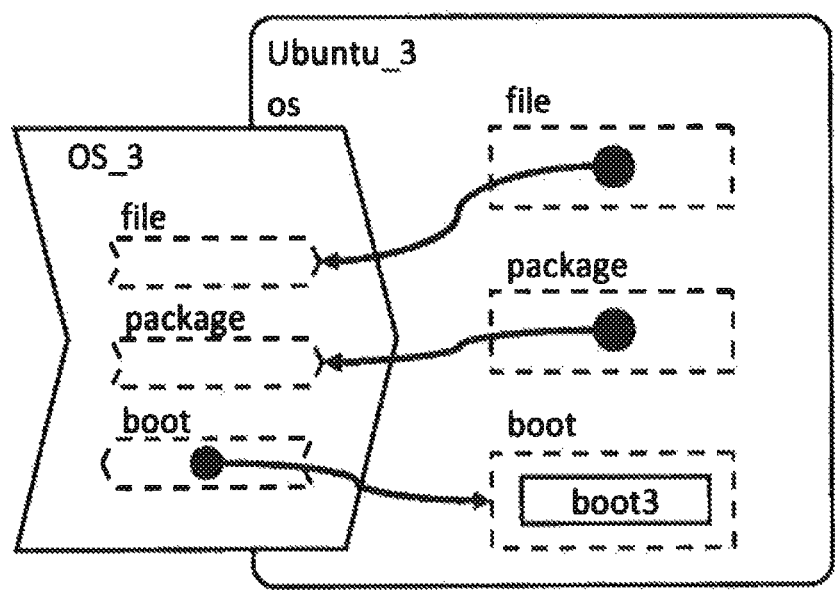
FIG. 41 is a diagram illustrating a definition example of an Ubuntu component according to the third example embodiment by a GUI.

FIG. 41 is a diagram illustrating a definition example of an Ubuntu component according to the present example embodiment by a GUI. FIG. 41 illustrates an example of a component definition assigned with an identifier being "Ubuntu_3." The component definition illustrated in FIG. 41 tells that a component defined by the component definition includes three fields being a "file" field, a "package" field, and a "boot" field, and also a port defined by a port definition "OS_3" includes an "os" port as a service port. Further, as initial value definitions of the "file" field and the "package" field, references to a "file" field and a "package" field in the "os" port are respectively defined. On the other hand, as an initial value definition of the "boot" field, a "boot3" constituent element being newly generated is defined, and also a reference to the "boot" field in the component being a body component is defined with respect to a "boot" field in the "os" port.

Figure 42:
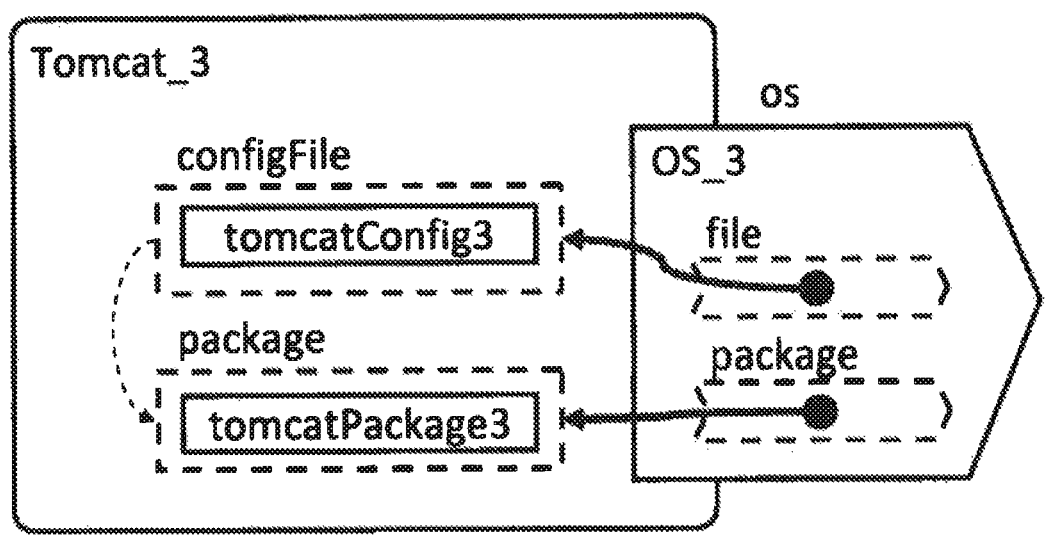
FIG. 42 is a diagram illustrating a definition example of a Tomcat component according to the third example embodiment by a GUI.

Further, FIG. 42 is a definition example of a Tomcat component according to the present example embodiment by a GUI. FIG. 42 illustrates an example of a component definition assigned with an identifier being "Tomcat_3." The component definition illustrated in FIG. 42 tells that a component defined by the component definition includes a "configFile" field and a "package" field, and also includes an "os" port defined by a port definition "OS_3" as a reference port. Further, in initial value settings of the "configFile" field and the "package" field in this example, a "tomcatConfig3" constituent element and a "tomcatPackage3" constituent element are newly defined, respectively. Additionally, a dependency on the "package" field is defined with respect to the "configFile" field. Note that a "boot" field being a provide-field in the "os" port in this example is considered to be an unused field, and therefore description thereof is omitted because the port is contained as a reference port in a component defined by the component definition "Tomcat_3," and therefore does not accept substitution of a value from the body component, and also because a value is not substituted by port connection processing by a wire (the port is a reference port and is in a position to transfer a value to another service port).

The examples illustrated in FIGS. 40 to 42 are examples of definitions that provide the same configuration after deployment as that provided by the definitions according to the second example embodiment except for ids. However, the component definition "Ubuntu_3" illustrated in FIG. 41 differs from the component definition "Ubuntu_2" according to the second example embodiment in defining a reference to the "boot" field in the body component with respect to the "boot" field in the OS port as a setting related to substitution of a value into the field, and omitting a dependency between fields in the component.

Figure 43:
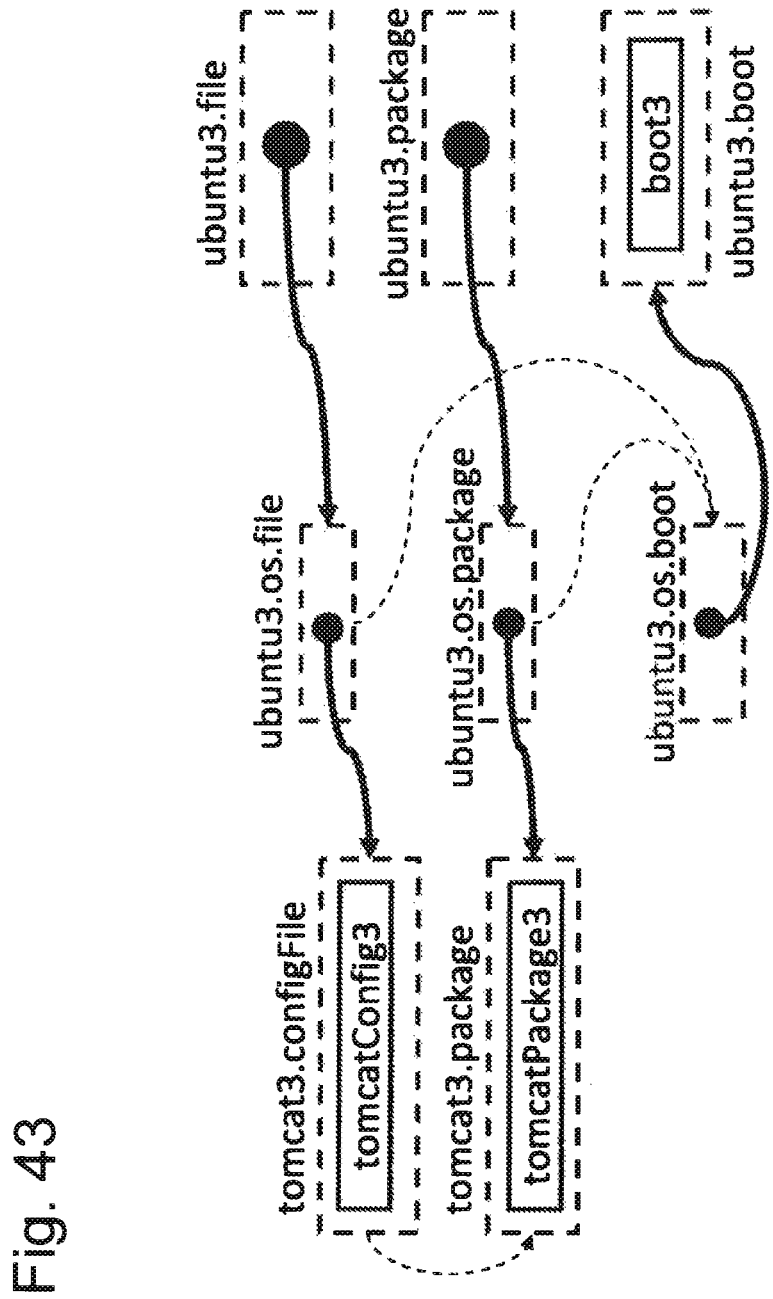
FIG. 43 is a diagram illustrating a data example after system definition deployment, according to the third example embodiment.

Further, FIG. 43 is a diagram illustrating an inter-field relation after port connection. FIG. 43 illustrates a relation between fields in a specified system definition after port connection, the fields being extracted based on the system definition illustrated in FIG. 40. Further, while a dependency on the "ubuntu2.boot" field is set from each of the "ubuntu2.file" field and the "ubuntu2.package" field in the example according to the second example embodiment (referring to FIG. 30), this example greatly differs in that a dependency on an "os.boot" field is set from each of an "os.file" field and an "os.package" field. Note that the final system configuration information according to the third example embodiment is similar to the system configuration information according to the second example embodiment illustrated in FIG. 36.

Description of Operation

Next, an operation of the present example embodiment will be described. The operation of the present example embodiment is similar to that of the second example embodiment except that the system definition deployment unit 101 and the constituent element setting unit 102 handle an accept-field and a provide-field in a port.

Specifically, when a specified system definition is generated by substituting a value into each field included in a component indicated by the system definition, based on a component definition and a port definition referred to by the system definition, depending on whether a target port is a reference port or a service port, substitution of a value into a field included in the port is restricted. For example, in the "file" field and the "package" field in the "os" reference port in the "tomcat3" component "in "system3," references to the "configFile" field and the "package" field in the body component are defined, respectively. Since the "file" field and the "package" field in the "os" port are accept-fields, the system definition deployment unit 101 in this example permits substitution of values from the body component including the "os" port as a reference port. Consequently, an "os" port being an instance of a port by the port definition "OS_3," in which a reference to a "tomcat3.configFile" field in the body component is substituted into the "file" field and a reference to a "tomcat3.package" field is substituted into the "package" field, is set as the "os" reference port in the "tomcat3" component.

Further, in this example, an initial value setting by a reference from an "ubuntu3.os.file" field is defined with respect to an "ubuntu3.file" field in "system3," and also an initial value setting by a reference from an "ubuntu3.os.package" field is defined with respect to an "ubuntu3.package" field. Consequently, a value stored in a "file" field in the "os" service port included in the body component is substituted into the "file" field in the "ubuntu3" component being a component in the body. Further, a value stored in a "package" field in the "os" service port included in the body component is similarly substituted into the "package" field in the "ubuntu2" component. However, values are not substituted into the "file" field and the "package" field in the "os" service port being a reference destination at this point, and therefore references to the fields are substituted. Further, in this example, a substitution setting by a reference from the "ubuntu3.file" field is defined with respect to an "ubuntu3.os.boot" field. Since the "boot" field in the "os" port is a provide-field, the system definition deployment unit 101 permits substitution of a value from the body component including the "os" port as a service port. Consequently, an "os" port being an instance of a port by the port definition "OS_3" is set as the "os" service port in the "ubuntu3" component, the "os" port including the "file" field and the "package" field, each having a dependency on the "boot" field, and the "boot" field into which a reference to the "ubuntu3.boot" field is substituted. The subsequent port connection processing is similar to that according to the second example embodiment.

Description of Effect

The present example embodiment is able to define a setting related to a relevancy between a constituent element included in a component including a port as a reference port and a constituent element included in a component including the port as a service port (e.g. a setting of a dependency on the "boot" field to the "file" field and the "package" field in the "os" port) in the port. The present example embodiment is able to describe a system definition more efficiently by being capable of reusing the setting along with the port. In other words, reusability can be improved by completing a setting being an abstracted dependency within a port.

Fourth Example Embodiment

Next, a fourth example embodiment of the present invention will be described. A configuration of a system construction assistance system 100 according to the fourth example embodiment is similar to that according to the third example embodiment except that operations of a system definition deployment unit 101 and a constituent element setting unit 102 are different. A same reference sign is hereinafter given to a part similar to that according to the first to third example embodiments, and description thereof is omitted.

The present example embodiment differs from the first to third example embodiments in handling a constituent element type. Two kinds of constituent element types being a concrete constituent element being a specific constituent element including every information element required for a purpose of the constituent element, and an abstraction constituent element being an abstract configuration including only part of the information elements will be handled below. In order to handle the constituent element types, a field and a constituent element, according to the present example embodiment, include "type name" information. Then, the system definition deployment unit 101 and the constituent element setting unit 102 perform processing based on the "type names."

FIG. 44 is a diagram illustrating representation examples of a field and a constituent element, according to the present example embodiment, by a GUI. FIG. 44 illustrates an example that two kinds of types being an "OSFile" type and a "FileUbuntu" type are set to "file" fields. Out of the two types, the "OSFile" type "file" field is an example of an abstraction constituent element type intended to be a "file" constituent element for various kinds of OSs, and the "FileUbuntu" type "file" field is an example of a concrete constituent element type intended to handle a "file" constituent element for a specific OS being "Ubuntu." Further, a "file 1" constituent element represents an abstraction constituent element and a "file2" constituent element represents a concrete constituent element.

As a representation example by a GUI, a type name of a field is written along with a name of the field by separating the two by a colon ":" below. Furthermore, when a constituent element type name is same as a type of a field storing the constituent element, the constituent element type name is not particularly described. Further, an abstraction constituent element type field is represented by a dotted rectangle with a white-filled background. Further, a concrete constituent element type field is represented by a dotted rectangle with a shaded background. Further, an abstraction constituent element type constituent element is represented by a solid rectangle with a white-filled background. Further, a concrete constituent element type constituent element is represented by a rectangle with a black-filled background.

Figure 45:
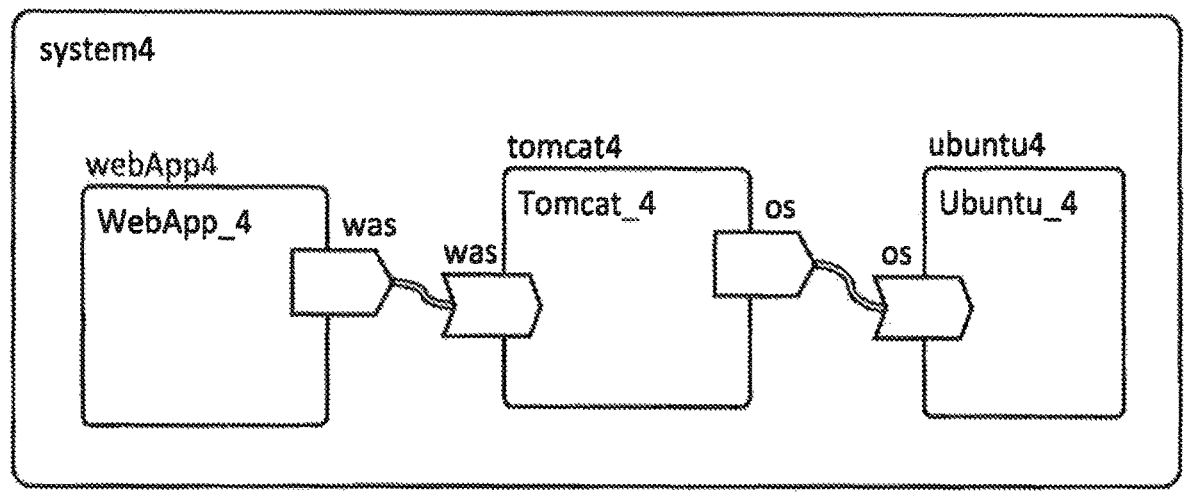
FIG. 45 is a diagram illustrating an example of a system definition according to the fourth example embodiment by a GUI.

A usage direction of a constituent element type will be described below using specific examples. FIG. 45 is a diagram illustrating an example of a system definition according to the present example embodiment by a GUI. The system definition illustrated in FIG. 45 defines that a target system "system4" includes a "webApp4" component being an instance of a component defined by a component definition "WebApp_4," a "tomcat4" component being an instance of a component defined by a component definition "Tomcat_4," and an "ubuntu4" component being an instance of a component defined by a component definition "Ubuntu_4." The system definition further defines that a "was" port in the "webApp4" component and a "was" port in the "tomcat4" component are connected, and also an "os" port in the "tomcat4" component and an "os" port in the "ubuntu4" component are connected. It is assumed that "webApp4" being an example of a WebApp component is a component compatible with a function of a web application server (hereinafter referred to as a WebApp). It is further assumed that the "was" port being an example of a WAS port is a port related to the function of the WebApp.

Figure 46:
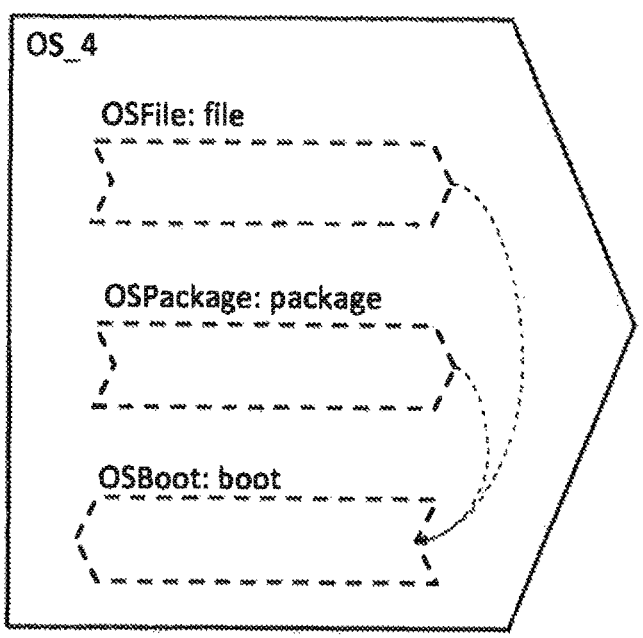
FIG. 46 is a diagram illustrating a definition example of an OS port according to the fourth example embodiment by a GUI.

Further, FIG. 46 is a diagram illustrating a definition example of an OS port according to the present example embodiment by a GUI. Further, FIG. 47 is a diagram illustrating a definition example of the port definition illustrated in FIG. 46 in JSON. Each of the port definitions illustrated in FIGS. 46 and 47 indicates a same configuration. Further, the configuration of the port defined by the port definition illustrated in FIGS. 46 and 47 is similar to the configuration of the port defined by the port definition "OS_3" illustrated in FIGS. 38 and 39 except that each field includes type name information. According to a port definition "OS_4" illustrated in FIGS. 46 and 47, a port defined by the port definition includes an abstraction constituent element type "file" field with a type name being "OSFile" as an accept-field. The port further includes an abstraction constituent element type "file" field with a type name being "OSPackage" as an accept-field. The port further includes an abstraction constituent element type "boot" field with a type name being "OSBoot" as a provide-field. Then, a dependency on a "boot" field is defined with respect to each of the "file" field and the "package" field. Furthermore, while the example in JSON does not indicate whether a type name is an abstraction constituent element type or a concrete constituent element type, it is assumed that information about whether the type is an abstraction constituent element type or a concrete constituent element type is separately retained in association with a type name of each field.

Figure 48:
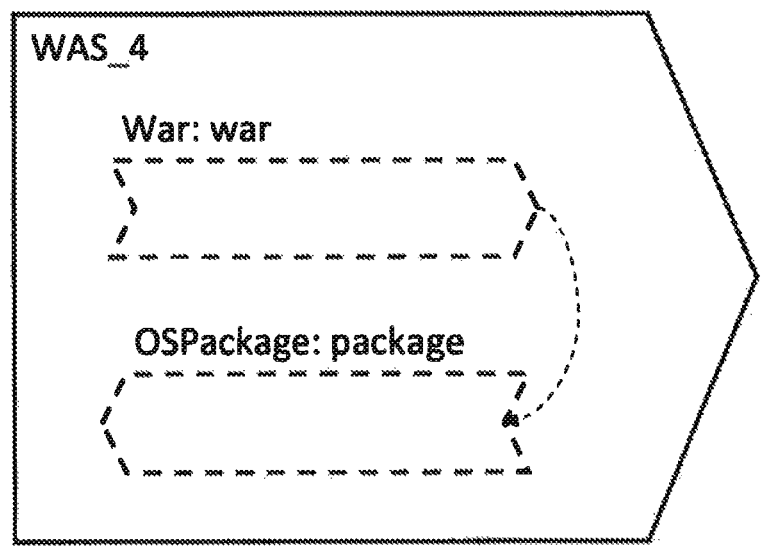
FIG. 48 is a diagram illustrating a definition example of a WAS port according to the fourth example embodiment by a GUI.

Further, FIG. 48 is a diagram illustrating a definition example of a WAS port according to the present example embodiment by a GUI. Further, FIG. 49 is a diagram illustrating a definition example of the port definition illustrated in FIG. 48 in JSON. According to a port definition "WAS_4" illustrated in FIGS. 48 and 49, a port defined by the port definition includes an abstraction constituent element type "war" field with a type name being "War" as an accept-field and includes an abstraction constituent element type "package" field with a type name being "OSPacage" as a provide-field. Further, a dependency on the "package" field is defined with respect to the "war" field. It is assumed that the "War" type "war" accept-field stores a constituent element of a WAR file archiving a program in the WebApp, and the like. It is further assumed that the "OSPackage" type "package" provide-field stores, as a constituent element, installation processing of the WebApp with a constituent element stored in the "war" field as a host.

Figure 50:
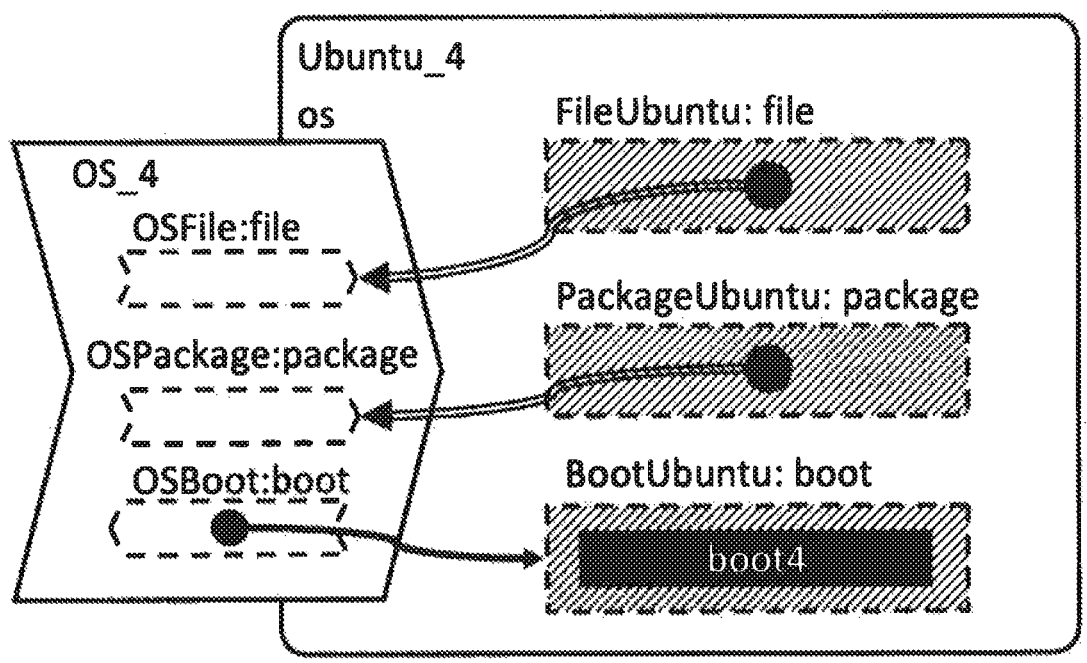
FIG. 50 is a diagram illustrating a definition example of an Ubuntu component according to the fourth example embodiment by a GUI.

Further, FIG. 50 is a diagram illustrating a definition example of an Ubuntu component according to the present example embodiment by a GUI. FIG. 50 illustrates an example of a component definition assigned with an id being "Ubuntu_4." The component definition illustrated in FIG. 50 differs from the Ubuntu component definition according to the third example embodiment illustrated in FIG. 41 in that an id and each field include type information, and conversion processing is defined when a component in a body refers to a value from an OS port. In the component definition in this example, when copying values (constituent elements) in a "file" field and a "package" field in the body component by referring to values in a "file" field and a "package" field in an "OS_4" type "os" service port included in the component, a designation for converting the constituent element into a suitable concrete constituent element type constituent element and storing the converted constituent element is added, instead of simply copying the constituent element. Furthermore, it is assumed that, with regard to a reference setting to an "ubuntu4.boot" field with respect to an "ubuntu4.os.boot" field, a "BootUbuntu" type of the "ubuntu4.boot" field being a reference destination is a derivative type of an "OSBoot" type of the "ubuntu4.os.boot" field being a substitution destination, and therefore is propagated by a normal reference setting.

A reference accompanied by such a conversion into a concrete constituent element is hereinafter referred to as a conversion call. Further, such a conversion call is hereinafter represented by a double-lined arrow connected from a black circle to a field at a reference destination (conversion source), as illustrated in FIG. 50. Furthermore, while FIG. 50 does not exemplify a designation method of a conversion method, it is assumed that, when a conversion call is designated by a GUI, detailed information of the conversion call may be input by a user, by a separate screen defining details of the conversion call being displayed or the like.

Further, FIG. 51 is a diagram illustrating a definition example of an Ubuntu component according to the present example embodiment in JSON. The example illustrated in FIG. 51 is an example of defining a content almost similar to the component definition illustrated in FIG. 50 in JSON. In a component definition "Ubuntu_4" illustrated in FIG. 51, a definition of a type name of a storable constituent element is added to a "field" element, and also a "conversion call" is added to a type of an "initial value" setting, compared with the component definition "Ubuntu_3" according to the third example embodiment. Additionally, when a type of an initialization setting is "conversion call," the component definition "Ubuntu_4" includes a "conversion method" element and an "argument" element in the "initial value" setting. Further, the component definition includes a "conversion" element in addition to an "id" element, a "port" element (a "service port" element or a "reference port" element), and a "field" element. Further, a conversion definition being each element in a "conversion" element includes three elements being "return value type name," "argument," and "attribute assignment" in association with a conversion element name. In this example, a type name of a constituent element received as a result of the conversion is designated as "return value type name." In association with a name of a field storing a constituent element being a conversion target, a type name of the constituent element is designated as "argument." When an attribute value newly assigned to a constituent element after a conversion exists, a definition method thereof is designated as "attribute assignment." As an example of a designation method of "attribute assignment," a constituent element of a conversion source designated by aforementioned "argument" may be referred to, and an attribute value of the constituent element may be used. For example, a conversion definition "convertFile" included in the "conversion" element is a definition for converting an "OSFile" type "file" constituent element stored in a "file" field into a "FileUbuntu" type constituent element. As "attribute assignment" at the time, a value of the "name" attribute of the "OSFile" type "file" constituent element before the conversion being assigned as is as a "name" attribute value of a constituent element after the conversion stored in the "file" field is defined. Further, a conversion method definition of one of "conversion" elements as a "conversion method" setting is designated in an "initial value" setting of the "file" field set with the conversion call along with "type" being "conversion call." Further, a "file" field in an "os" port is designated as an "argument" setting. This means that a "file" constituent element stored in an "os.file" field is used as an argument passed to "convertFile" being a conversion method, that is, a constituent element of a conversion source.

Thus, when a value of a constituent element is "conversion call," a conversion call may be designated as "type," a name of a conversion definition in the component definition may be designated as "conversion method," and a constituent element being a conversion target may be designated as "argument."

Furthermore, as illustrated in FIG. 51, for example, a designation of a conversion method in a conversion call may be represented by a conversion name added with an ampersand "&" at the beginning.

Figure 52:
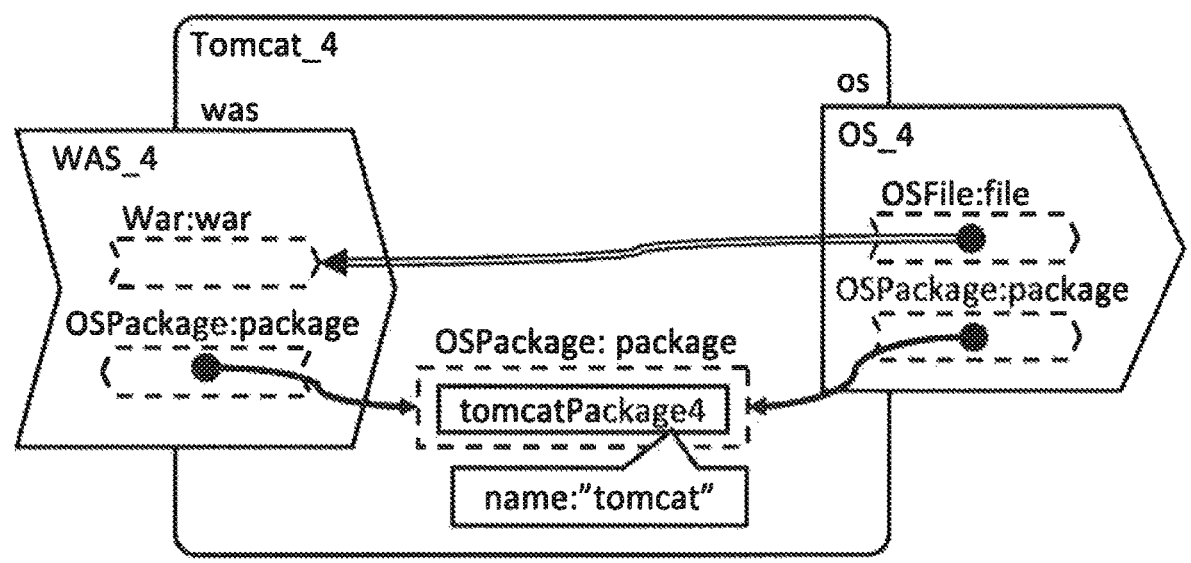
FIG. 52 is a diagram illustrating a definition example of a Tomcat component according to the fourth example embodiment by a GUI.

Further, FIG. 52 is a diagram illustrating a definition example of a Tomcat component according to the present example embodiment by a GUI. FIG. 52 illustrates an example of a component definition assigned with an id being "Tomcat_4." The component definition illustrated in FIG. 52 defines that a component defined by the component definition includes an "OSPackage" type "package" field, an "os" reference port defined by a port definition "OS_4," and a "was" service port defined by a port definition "WAS_4." Further, in the component, a reference to a "package" field in a component in a body is set to both of a "package" field in the "os" reference port and a "package" field in the "was" service port. Further, in the component, substitution by a conversion call with respect to a "war" field in the "was" service port is set to a file field in the "os" reference port. Further, "tomcat" is set to a value of a "name" attribute of a constituent element "tomcatPackage4" defined as an initial value of the "package" field. This indicates that the constituent element is a constituent element including installation processing of tomcat, and the like.

Further, FIG. 53 is a diagram illustrating a definition example of a Tomcat component according to the present example embodiment in JSON. The example illustrated in FIG. 53 is an example of defining the component definition illustrated in FIG. 52 in JSON. In this example, "&convertWar" is set as a conversion method of a conversion call from the "file" field in the "os" reference port to the "war" field in the "was" service port. Then, "convertWar" is defined in the "conversion" element in the component definition. In this "convertWar," a "War" type constituent element is received from the "war" field and is returned after being converted into an "OSFile" type constituent element. Setting, as an attribute assignment, a character string connecting "/usr/local/tomcat" indicated as an example of a file path unique to "Tomcat" with a value of a "name" attribute value of a "War" type constituent element being a conversion target to a "name" attribute value of an "OSFile" type constituent element after conversion, at that time, is designated.

Figure 54:
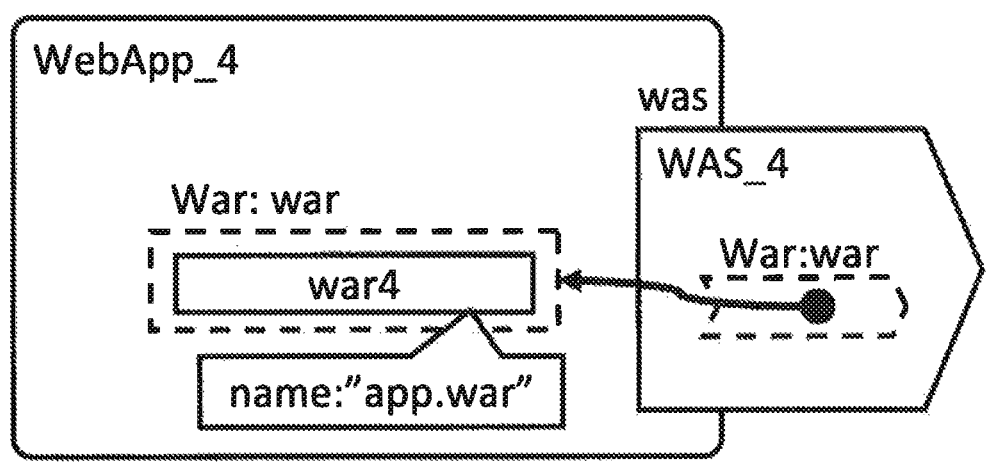
FIG. 54 is a diagram illustrating a definition example of a WebApp component according to the fourth example embodiment by a GUI.

Further, FIGS. 54 and 55 are diagrams illustrating definition examples of a WebApp component according to the present example embodiment. FIG. 54 illustrates a definition example by a GUI, and FIG. 55 illustrates a definition example in JSON. Either diagram illustrates an example of a component definition assigned with an identifier being "WebApp_4." The component definition illustrated in FIGS. 54 and 55 defines that a component defined by the component definition includes a "War" type "war" field storing a "war4" constituent element as an initial value and a "was" reference port defined by a port definition "WAS_4." Further, in the component, a "war" field in the "war" reference port is set to refer to the "war" field in the component in a body. Further, "app.war" being a file name of the "war" file is designated as a "name" attribute value of a "war4" constituent element being a value of the "war" field.

Figure 56:
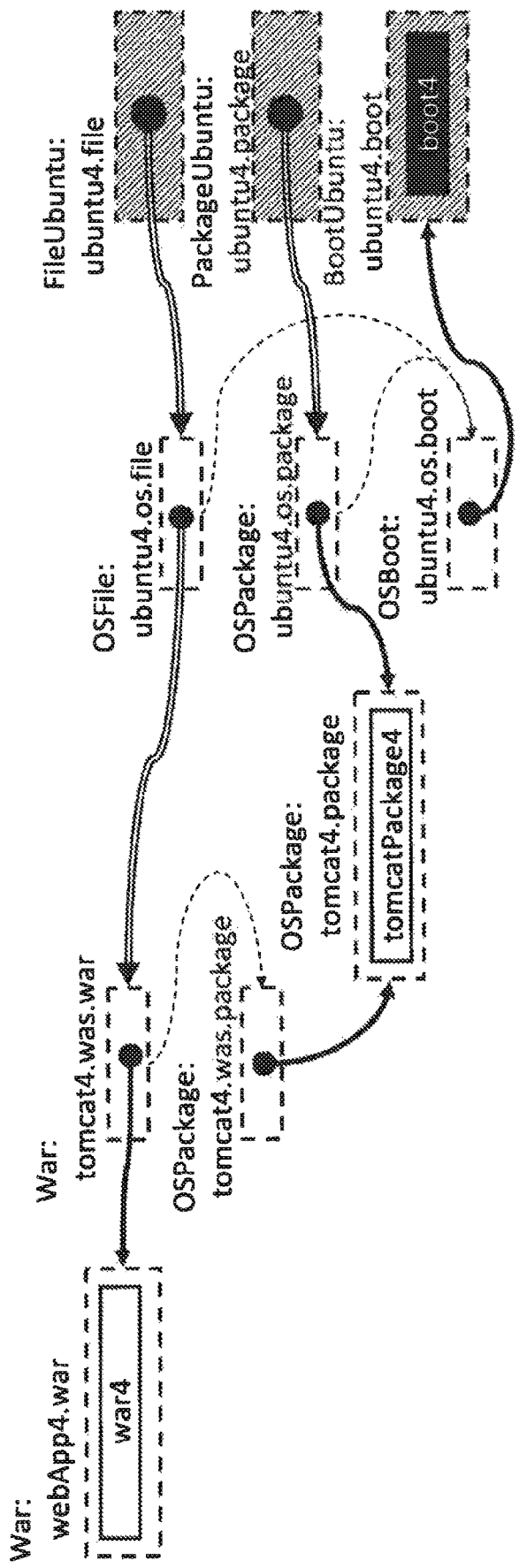
FIG. 56 is a diagram illustrating an inter-field relationship after reference resolution, according to the fourth example embodiment.

Further, FIG. 56 is a diagram illustrating an inter-field relation after port connection. FIG. 56 illustrates an inter-field relation in a specific system definition after port connection deployed based on the system definition illustrated in FIG. 45. As illustrated in FIG. 56, it can be understood that a constituent element is propagated not only by a reference but also by a conversion call. For example, a "war4" constituent element being a "war" type abstraction constituent element stored in a "webApp4.war" field is propagated to an "ubuntu4.os.file" field through a "tomcat4.was.war" field. At that time, the constituent element is converted from a "war" type to an abstraction constituent element type "OSFile" type. Additionally, the "war4" constituent element after being converted into the "OSFile" type is propagated to an "ubuntu4.file" field. At that time, the constituent element is converted from the "OSFile" type to a concrete constituent element type "fileubuntu" type.

Description of Operation

An operation of the present example embodiment is similar to the operation of the third example embodiment except that the system definition deployment unit 101 and the constituent element setting unit 102 handle a constituent element type defined with respect to a field and a constituent element, and handle a "conversion call" as a field value.

Specifically, in a process of acquiring a constituent element stored in a field (S231 in FIG. 31), the constituent element setting unit 102 first checks a value stored in a target field and, when the value is a conversion call, acquires a constituent element designated as a conversion source and then converts the constituent element, based on a conversion method definition designated by a conversion method. The constituent element setting unit 102 copies the resulting constituent element, stores the constituent element in the target field being a field at a conversion call source, and then acquires the constituent element.

Figure 57:
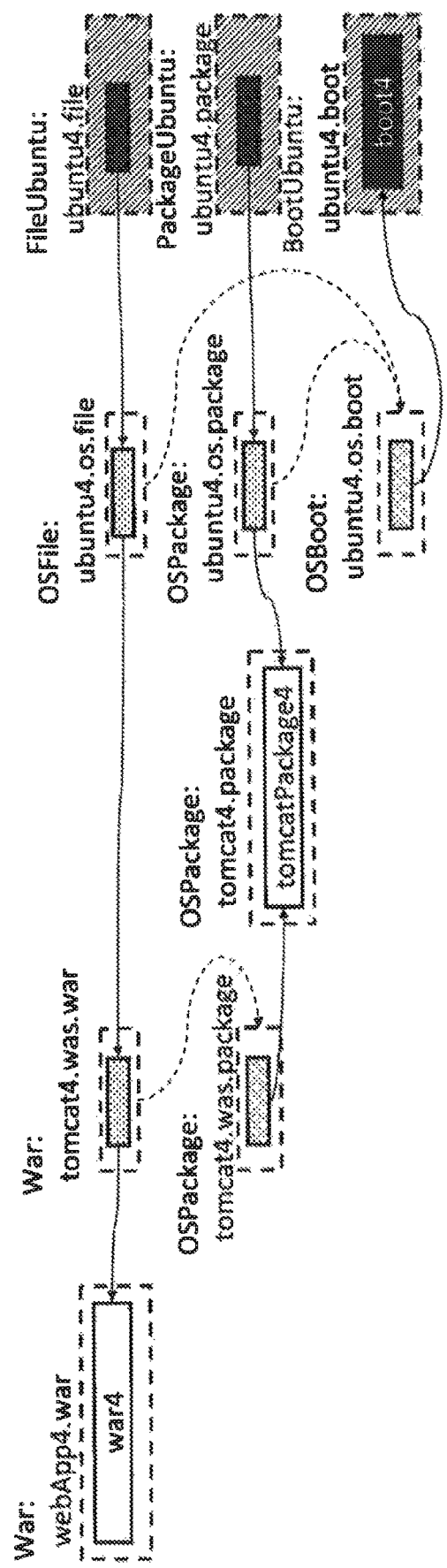
FIG. 57 is a diagram illustrating a relationship between constituent elements after reference resolution, according to the fourth example embodiment.

Further, FIG. 57 is a diagram illustrating a relationship between constituent elements after resolving the constituent elements by a reference including a conversion call, and the like, from the inter-field relationship illustrated in FIG. 56. Since propagation of a constituent element by a conversion call exists in this example, complete copying of a constituent element may not be performed, and a constituent element type and an attribute value may be different between a propagation source and a propagation destination.

Further, FIG. 58 is a data example of a constituent element after resolving a reference setting to a field value, according to the present example embodiment. FIG. 58 illustrates an example of constituent element information stored in the "file" field in the "ubuntu4" component (i.e. the "ubuntu4.file" field). As a result of undergoing port connection processing based on a wire and reference resolution processing, as constituent element information stored in the "file" field, an identifier of a constituent element at a copy source ("war4_2" in this example), an identifier of a constituent element stored in the field ("war4_3" in this example), a type name after conversion, and information of an attribute value assigned after the conversion may be retained as illustrated in FIG. 58. Furthermore, an original constituent element of the constituent element is the "War" type "war4" constituent element stored in the "war" field in the "webApp4" component. The constituent element is converted into an "OSFile" type in the "tomcat4" component, and also a value of the "name" attribute value is changed. Additionally, the constituent element is converted into a "FileUbuntu" type in the "ubuntu4" component. Consequently, a "FileUbuntu" type is designated as "type name," and, in terms of an "attribute value," "/usr/local/tomcat/app.war" is designated as a name attribute value.

Furthermore, strictly speaking, aggregation processing of a constituent element by the constituent element setting unit 102 according to the present example embodiment is different from the aggregation processing according to the respective aforementioned example embodiments. In the aggregation processing of constituent elements according to the present example embodiment, that is, processing of integrating a newly defined constituent element and a series of constituent element groups composed of copied constituent elements including converted constituent elements into a single constituent element being output information, the processing is performed as follows. Specifically, the processing causes a single constituent element being output information to include an identifier of a newly defined constituent element in a series of constituent element groups, a type and an attribute value of a concrete constituent element positioned at a tail end of propagation by copying, as a type and an attribute value, and a set of relevancies assigned to all copies as relevancy information of the constituent element.

In order to perform the processing, for example, the constituent element setting unit 102 traces an "id" of a copy source constituent element of a constituent element stored in each field and specifies a set of constituent elements constituting each constituent element group, a newly defined constituent element being a tail end of a copy source, and a concrete constituent element type constituent element. Then, by collecting an "id" from the newly defined constituent element, a type and an attribute value from the concrete constituent element type constituent element, and a dependency from every constituent element, output constituent element information is synthesized. At this time, the constituent element setting unit 102 may have a function of verifying that a part where a specific constituent element is designated is a single part throughout fields in reference relations. For example, when a constituent element group stored in a series of fields in reference relations includes a plurality of concrete constituent element types, the constituent element setting unit 102 may detect an error.

Thus, by a part where a specific constituent element is designated is limited to a single part throughout fields in reference relations, proper deployment processing of the constituent element is provided. A situation that a single constituent element is provided in a plurality of parts may be viewed as an unintended situation for a purpose of defining construction processing of a target system as is the case with this example. Accordingly, in such a case, it is preferable that a situation that a single constituent element is provided in a plurality of parts be detected, and an alarm be issued.

Figure 59:
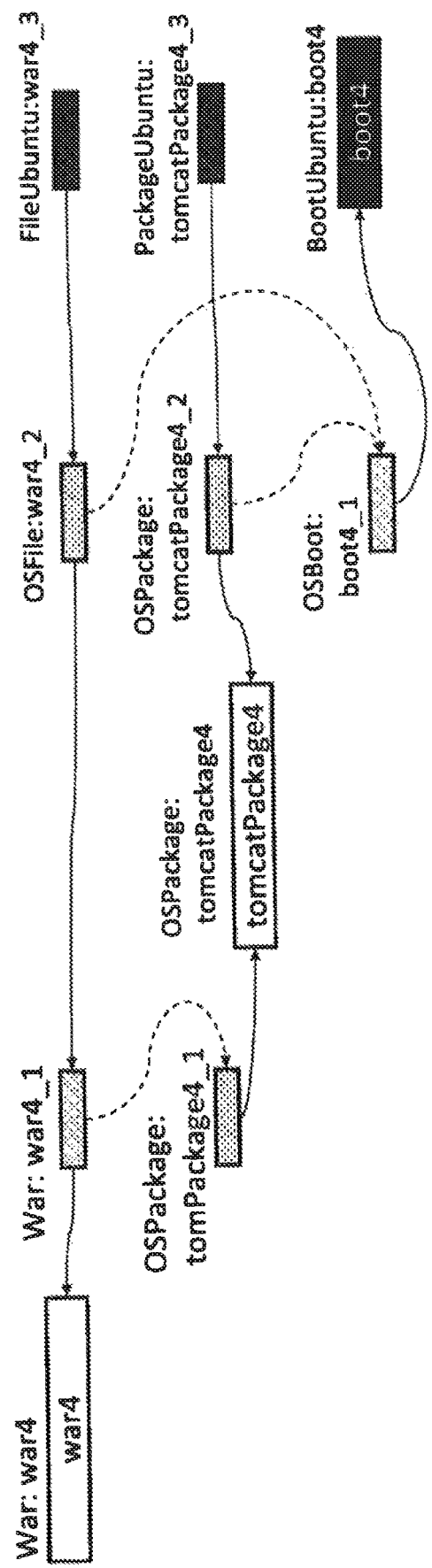
FIG. 59 is a diagram illustrating a relationship between constituent elements after settings are assigned, according to the fourth example embodiment.

FIG. 59 is a diagram illustrating a relationship between constituent elements after performing setting assignment. Furthermore, in FIG. 59, a name added above a shaded rectangle representing a copy of a constituent element indicates a type name and an id of the copy.

Figures 60, 61:
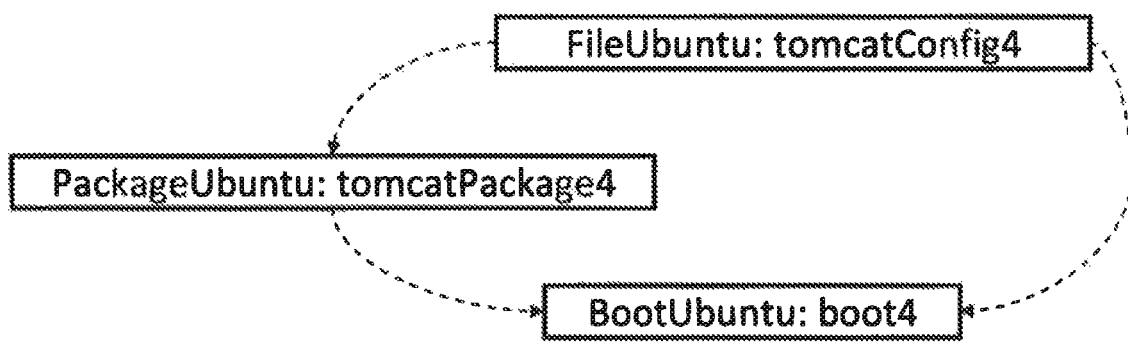
FIG. 60 is a diagram illustrating an example of system configuration information according to the fourth example embodiment by a GUI.
FIG. 61 is a diagram illustrating a description example of a constituent element generation result according to the fourth example embodiment in JSON.

Further, FIGS. 60 and 61 are diagrams illustrating examples of system configuration information according to the present example embodiment. FIG. 60 is a diagram illustrating a display example of system configuration information, by a GUI, generated as a result of generating a constituent element, based on the aforementioned definition. Further, FIG. 61 is a diagram illustrating an output example of the system configuration information in JSON. Each of FIGS. 60 and 61 illustrates a same configuration.

Description of Effect

The present example embodiment is able to define a system definition more efficiently by suitably adjusting information such as an attribute value and a type of a constituent element depending on a combination of components. For example, the present example embodiment is able to suitably convert a constituent element type depending on a host, and is able to finally generate a specific constituent element depending on the host. Further, a setting therefor can be encapsulated on the host side at a connection destination, and therefore a user is able to flexibly determine a host destination.

Changing the aforementioned system definition, reusability of a component will be described below using specific examples. FIG. 62 is a diagram illustrating other examples of a system definition by a GUI. FIG. 62 (*a*) illustrates "system4_2" as an example of a system using CentOS in place of Ubuntu, FIG. 62 (*b*) illustrates "system4-3" as an example of a system using Jetty in place of Tomcat, and FIG. 62 (*c*) illustrates "system4-4" as an example of a system using CentOS in place of Ubuntu and Jetty in place of Tomcat. Further, FIG. 63 is a diagram illustrating a definition example of the system definition illustrated in FIG. 62 (*a*) in JSON. It is assumed that an "mw" component illustrated as an example of a Jetty component in FIGS. 62 (*b*) and 62 (*c*) is a component compatible with jetty being a kind of web application.

Figure 64:
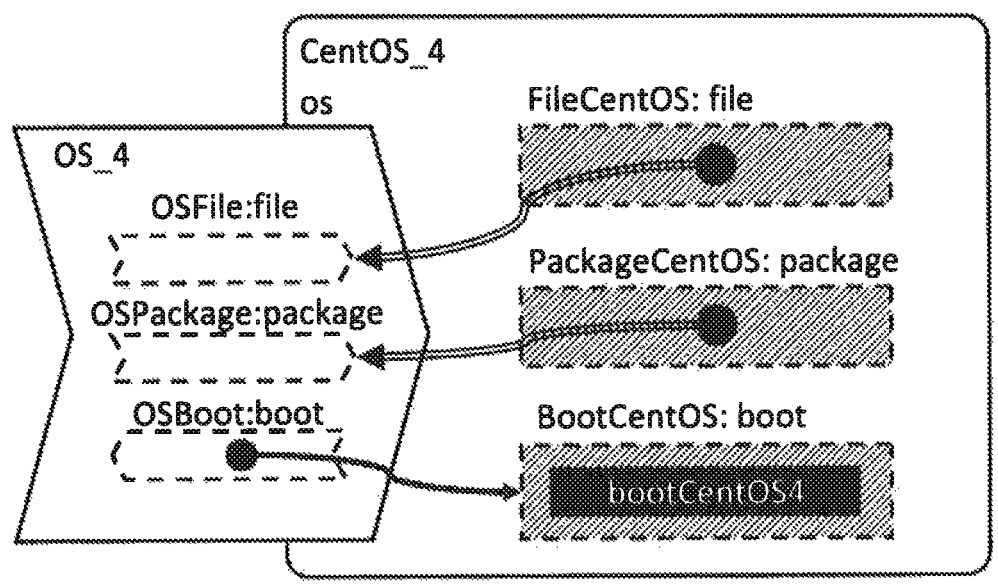
FIG. 64 is a diagram illustrating a definition example of a CentOS component according to the fourth example embodiment by a GUI.

Further, FIGS. 64 and 65 are diagrams illustrating definition examples of a CentOS component according to the present example embodiment. According to a component definition "CentOS_4" illustrated in FIGS. 64 and 65, a component defined by the component definition includes an "os" service port defined by "OS_4," similarly to the case with the aforementioned component definition "Ubuntu_4." On the other hand, types of a "file" field, a "package" field, and a "boot" field are types dedicated to "CentOS" such as a "FileCentOS" type, a "PackageCentOS" type, and a "BootCentOS" type, respectively. Further, in conversion calls from an "os.file" field and an "os.package" field to related fields in a component in a body for reassigning constituent elements, return values have a "FileCentOS" type and a "PackageCentOS" type, respectively. However, reassignment of a value from a "boot" field in the component in the body to an "os.boot" field employs a normal reference setting, similarly to "Ubuntu_4." The reason is that a "BootCentOS" type is a derivative type of an "OSboot" type.

Figure 66:
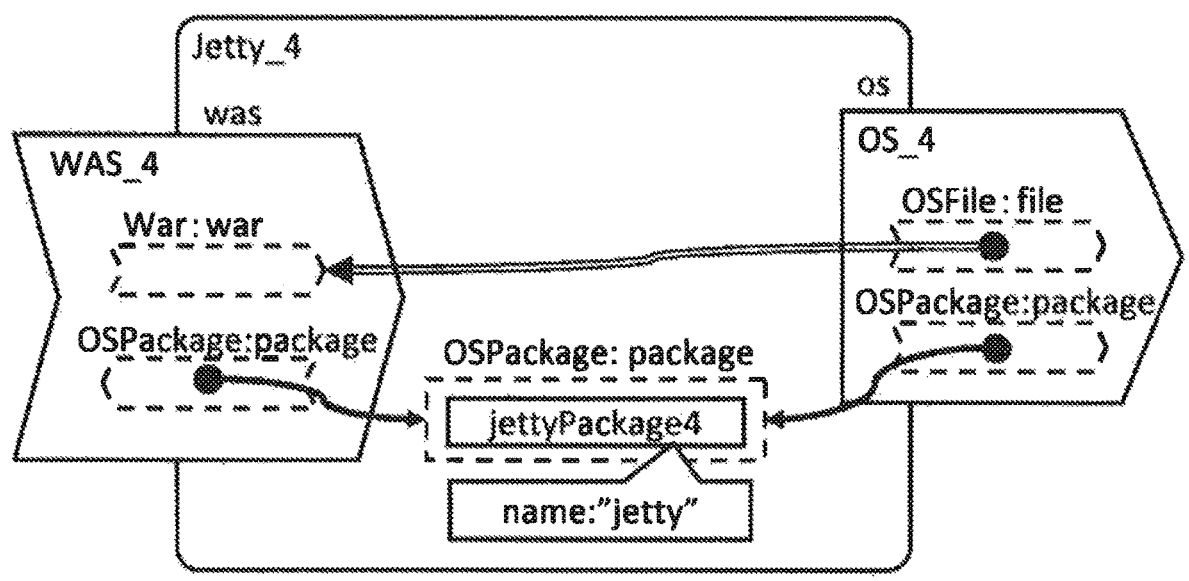
FIG. 66 is a diagram illustrating a definition example of a Jetty component according to the fourth example embodiment by a GUI.

Further, FIGS. 66 and 67 are diagrams illustrating definition examples of a Jetty component according to the present example embodiment. According to a component definition "Jetty_4" illustrated in FIGS. 66 and 67, a component defined by the component definition includes a "was" reference port defined by "WAS_4" and also an "OSPackage" type "package" field, similarly to the case with the aforementioned component definition "Tomcat_4." However, a "name" attribute of a constituent element "jettyPackage4" defined as an initial value of the "package" field is "jetty." This indicates that the constituent element is a constituent element including installation processing of Jetty, and the like. Further, attribute assignment in a conversion method "convertWar" is a rule based on a directory structure in Jetty.

Thus, the component definition "CentOS_4" defines a component including a port configuration similar to that defined by the component definition "Ubuntu_4," and the component definition "Jetty_4" defines a component including a port configuration similar to that defined by the component definition "Tomcat_4." This means that exchangeability is included. For example, the examples illustrated in FIGS. 62 (*a*) to (*c*) define systems having different combinations of types of the "mw" component and a "vm" component while deploying a component "app" defined by "WebApp_4." Additionally, by increasing component definitions, a selectable number of patterns increases exponentially. Thus, component reusability enables efficient description of diverse systems by a small number of definitions.

Fifth Example Embodiment

Next, a fifth example embodiment of the present invention will be described. A configuration of a system construction assistance system 100 according to the fifth example embodiment is similar to that according to the fourth example embodiment except that operations of a system definition deployment unit 101 and a constituent element setting unit 102 are different. A same reference sign is hereinafter given to a part similar to that according to the first to fourth example embodiments, and description thereof is omitted.

Main features of the present example embodiment include that each field includes, as constituent element information, not only a content of the constituent element such as construction processing but also a state the constituent element may possibly take and information about a possible state transition, and information indicating an inter-field relevancy is designated from a state of a constituent element stored in the field with respect to a state of another constituent element. Such a relevancy means a constraint that, in order for the former constituent element to perform the state transition, the latter constituent element needs to be in the state.

Figure 68:
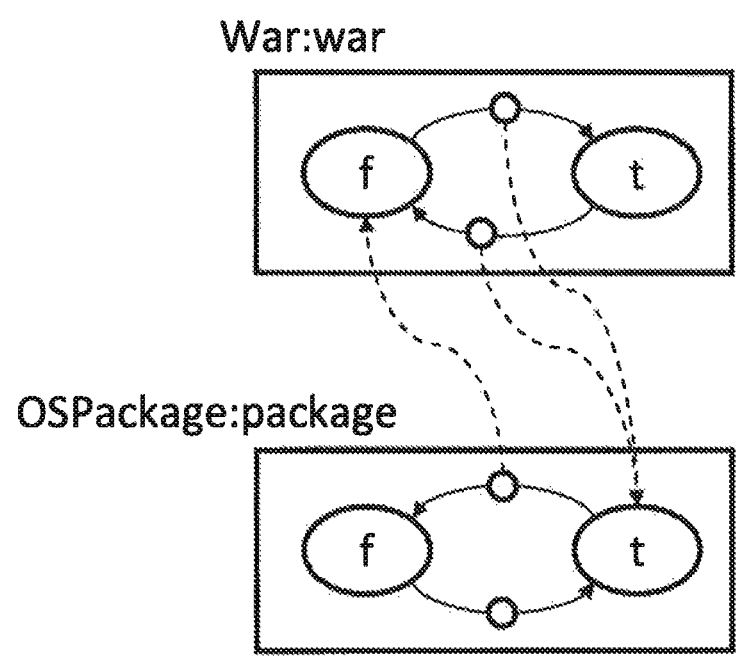
FIG. 68 is a diagram illustrating a representation example of a constituent element and a relevancy between constituent elements, according to a fifth example embodiment, by a GUI.

FIG. 68 is a diagram illustrating a representation example of a constituent element and a relevancy between constituent elements, according to the present example embodiment, by a GUI. FIG. 68 illustrates an example of two constituent elements being a "War" type "war" constituent element and an "OSPackage" type "package" constituent element. The "war" constituent element includes two states being "f" and "t," and a state transition mutually connecting the states. Similarly, the "package" constituent element also includes two states being "f" and "t," and a state transition mutually connecting the states. Further, in the state transition from the "f" state to the "t" state and the state transition from the "t" state to the "f" state, the "war" constituent element has a dependency on the "t" state of the "package" constituent element. Further, in the state transition from the "t" state to the "f" state, the "package" constituent element has a dependency on the "f" state of the "war" constituent element. This indicates that, when the "war" constituent element transitions from the "f" state to the "t" state or transitions from the "t" state to the "f" state, a state of the "package" constituent element shall be the "t" state. The above further indicates that, when the "package" constituent element transitions from the "t" state to the "f" state, a state of the "war" constituent element shall be the "f" state.

Further, FIG. 69 is a diagram illustrating a definition example of a constituent element type in JSON. Further, FIG. 70 is a diagram illustrating a definition example of a constituent element in JSON. Each constituent element in FIG. 70 may be interpreted to include a state and a state transition retained by a constituent element type designated as a type name. Further, in FIG. 70, a description "f→t" denotes a state transition from the "f" state to the "t" state, and a description "package(t)" denotes the "t" state of the "package" constituent element. Furthermore, while FIG. 70 illustrates an example of setting a dependency included in the constituent element on another constituent element as a definition of a constituent element, a similar definition may be set to a field. In that case, it may be interpreted that a constituent element stored in a set field includes a state and a state transition retained by a constituent element type designated as a type name, and, when a constituent element stored in a set field performs a state transition or the like, the constituent element has a dependency on a state and the like of a constituent element stored in another designated field. Further, while the aforementioned example is described taking a case that a constituent element and a field include type information as an example, type information of a constituent element and a field is not essential, according to the present example embodiment.

When information as described above is used, by further designating a current state and a requested state with respect to each constituent element depending on a situation, a procedure for changing each constituent element from the designated current state to the designated requested state can be derived as an enumeration of state transitions.

For example, when a current state of each of the "war" constituent element and the "package" constituent element is designated to be the "f" state, and a requested state of each of the "war" constituent element and the "package" constituent element is designated to be the "t" state, in order to cause the "war" constituent element to transition from the "f" state to the "t" state, the "package" constituent element shall be in the "t" state, and therefore a procedure of first causing the "package" constituent element to transition from the "f" state to the "t" state, and subsequently causing the "war" constituent element to transition from the "f" state to the "t" state can be derived.

Such a procedure may be derived by a technique generally called "automated planning." The technique is a technique of, from respective pieces of information being an initial state, a requested state, a state conversion method, and a constraint on state conversions, obtaining an order of state conversions that brings the initial state to the requested state while satisfying the constraint.

The system construction assistance system 100 according to the present invention can be used in a constituent element including such a state transition.

Further, FIG. 71 is a diagram illustrating a definition example of a WAS port according to the present example embodiment in JSON. As can be seen, a dependency definition method according to the present example embodiment is different from that according to the respective aforementioned example embodiments. Specifically, a state transition included in a constituent element stored in a constituent element or a field may be designated as a "dependency source transition," and a state included in a constituent element stored in another constituent element or field may be designated as a "dependency destination state."

Description of Operation

An operation of the present example embodiment is similar to that of the fourth example embodiment except that the system definition deployment unit 101 and the constituent element setting unit 102 handle a constituent element including a state, a state transition, and a dependency of the state transition of the constituent element on a state of another constituent element, or a field storing such a constituent element.

Description of Effect

The present example embodiment is able to easily define a system that includes a constituent element including a state, a state transition, and a dependency of the state transition of the constituent element on a state of another constituent element, by using a component including such a constituent element or a field storing such a constituent element.

Furthermore, without being limited to the present example embodiment, the aforementioned first to fourth example embodiments may be able to generate a system construction procedure. For example, the information illustrated in FIGS. 6 and 7 indicates that the respective constituent elements retaining construction processing are connected by a dependency. As long as the dependency does not include circulation, an order for implementing every set of construction processing while satisfying the dependency can be determined based on such information.

For example, when a dependency does not include circulation, at least one constituent element that does not have a dependency on another constituent element at all always exists. Construction processing of such a constituent element may be executed first. Consequently, a constituent element every dependency retained by which is resolved is found, and then construction processing of such a constituent element may be executed after the aforementioned construction processing. By successively executing thereafter a constituent element a dependency retained by which is resolved by execution of preceding construction processing, construction processing of every construction element is always executed. A determination algorithm of such an order is generally known as "topological sorting."

Figure 72:
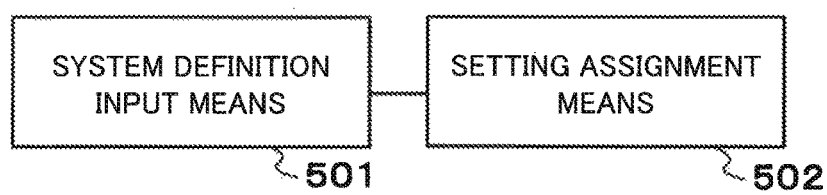
FIG. 72 is a block diagram illustrating an overview of the present invention.

Next, an overview of the present invention will be described. FIG. 72 is a block diagram illustrating an overview of the present invention. A system construction assistance system illustrated in FIG. 72 includes a system definition input means 501 and a setting assignment means 502.

The system definition input means 501 (e.g. the system definition input unit 001) inputs a system definition including at least: a designation of a component using a component definition that may include a field definition being information of a field included in a component determined to be a definition target and a setting definition (e.g. a "substitution" definition) being information about a setting to a constituent element associated with a field; and an assignment definition related to assignment of a constituent element to a field included in a component, the component definition being information that defines a component including at least one or more fields finally associated with one specific constituent element, the field storing information of a constituent element.

The setting assignment means 502 (e.g. the system definition deployment unit 101 and the constituent element setting unit 102) associates a field in a designated component with a constituent element, based on the system definition and the component definition, and also assigns a setting to a constituent element constituting a target system, by reflecting a setting content defined with respect to a field in a constituent element associated with the field.

By including such a configuration, information about a setting to a constituent element can be encapsulated as abstracted component information, and reusability can be provided for information about such a setting. Accordingly, ease of system definition can be improved.

Figure 73:
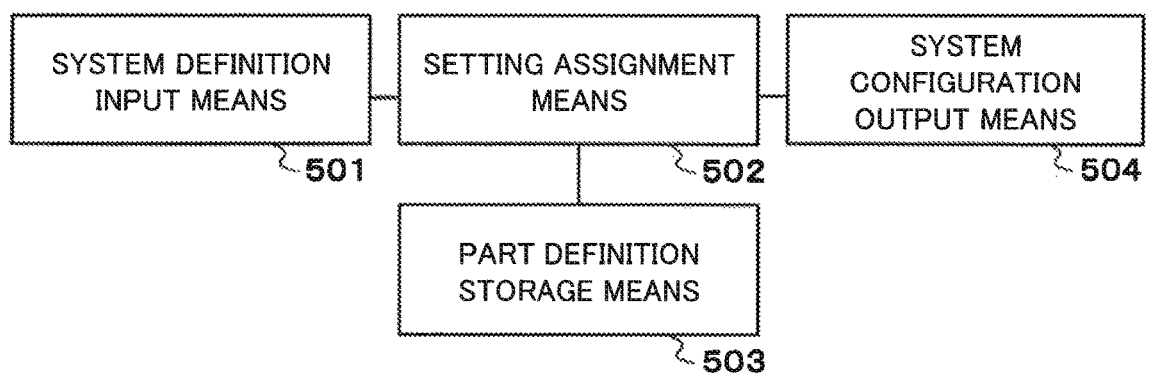
FIG. 73 is a block diagram illustrating another configuration example of the system construction assistance system according to the present invention.
Figure 74:
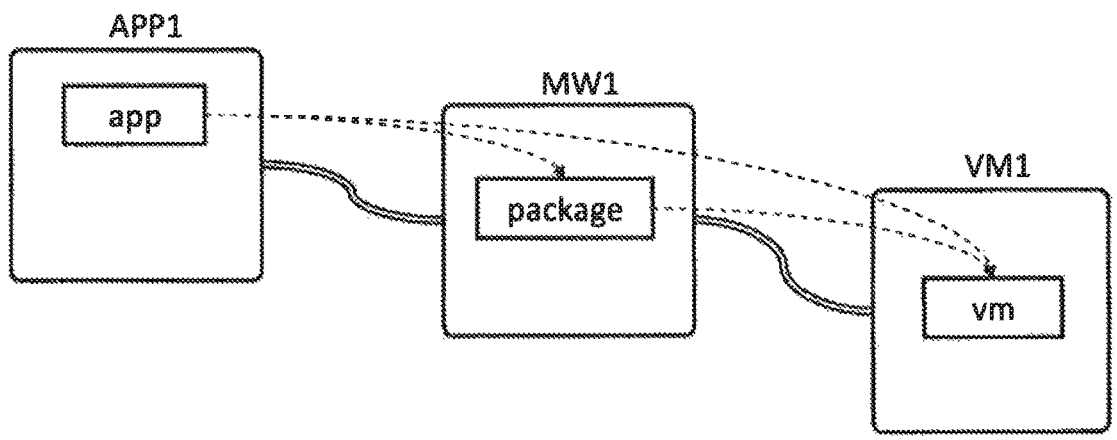
FIG. 74 is a diagram illustrating an example of a system definition defined by a combination of components.
Figure 75:
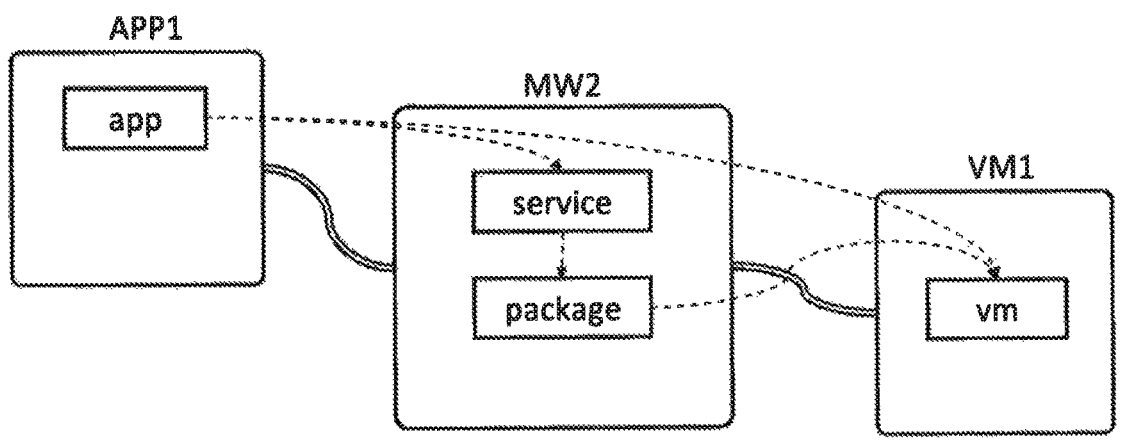
FIG. 75 is a diagram illustrating another example of a system definition defined by a combination of components.

Further, FIG. 73 is a block diagram illustrating another configuration example of the system construction assistance system according to the present invention. As illustrated in FIG. 73, the system construction assistance system may include a part definition storage means 503 (e.g. the part definition storage unit 003) that stores at least two or more component definitions, and a system configuration output means 504 (e.g. the system configuration output unit 002) that outputs system configuration information being information of a specific constituent element constituting a target system and also being information including a content of a setting assigned to the constituent element.

Furthermore, a setting definition included in a component definition may include at least information indicating an attribute value of a constituent element associated with a field determined to be a target, or a relevancy to another constituent element included in the constituent element.

Further, designation of another constituent element in information indicating a relevancy may be performed by designation of any field associated with the other constituent element.

Further, a component definition may include an assignment definition (e.g. an "initial value" definition) being information about assignment of a constituent element associated with a field determined to be a target, and, when an assignment definition is included in a component definition of a component designated by a system definition, the setting assignment means may associate a constituent element with a field designated by the assignment definition, based on the assignment definition.

Further, an assignment definition may include information designating whether a constituent element being an assignment target is a new definition or a reference from another field, and, when the assignment definition included in a component definition of a component designated by a system definition designates a new definition, the setting assignment means may generate the designated constituent element and then associate the constituent element with a field designated by the assignment definition, or, when the assignment definition designates a reference from another field, the setting assignment means may associate a constituent element associated with the other field with a field designated by the assignment definition.

A component definition may include a designation of a port including at least one or more fields finally associated with one specific constituent element, the port being a concept abstracting a terminal function for connecting a component determined to be a definition target to another component, the field being defined by a port definition and storing information of a constituent element required for connection processing, a port definition may include a field definition being information of a field included in a port determined to be a definition target, a system definition may include information designating a connection between ports, and the setting assignment means may propagate information of an associated constituent element and a setting assigned to the constituent element, between related fields in ports in a connection relation.

Further, a port definition may include a setting definition (e.g. a "setting" definition) being information about a setting to a constituent element associated with a field included in a port determined to be a definition target, and, in a case that the port definition includes a setting definition, after reflecting a setting content defined with respect to a field in a constituent element associated with the field, the setting assignment means may propagate the setting between related fields in ports in a connection relation.

When a component determined to be a definition target includes a port, a component definition may include an assignment definition being information about assignment of a constituent element associated with a field included in the port, and the assignment definition may include a designation that a constituent element being an assignment target is a reference from a field included in the component.

Further, when a component determined to be a definition target includes a port, a component definition may include an assignment definition being information about assignment of a constituent element associated with a field included in the component, and the assignment definition may include a designation that a constituent element being an assignment target is a reference from a field included in the port.

Further, a port definition may include an assignment definition (e.g. an "initial value" definition) being information about assignment of a constituent element associated with a field included in a port determined to be a definition target, and the assignment definition may include a designation that a constituent element being an assignment target is a reference from a field included in any component associated with the port.

Further, a component definition or a system definition may designate whether a port included in a component is a reference port indicating use of a connection function provided by another port or a service port indicating provision of the connection function to another port, a port definition may designate whether a field included in a port determined to be a definition target is an accept-field handling propagation of a constituent element from a reference port to a service port or a provide-field handling propagation of a constituent element from a service port to a reference port, and, based on a component definition or a system definition, and a port definition, the setting assignment means may restrict assignment of a constituent element by a reference from a field in a component including a service port, with respect to an accept-field in the service port, and restrict assignment of a constituent element by a reference from a field in a component including a reference port, with respect to a provide-field in the reference port.

Further, an assignment definition may include a conversion definition being information about a conversion method of a constituent element, and, when associating a constituent element with a field, the setting assignment means may establish the association after converting the designated constituent element, based on the conversion definition.

Further, a component definition may include information about a type being information about a kind of constituent element storable in a field, an assignment definition may include information about a type of a constituent element determined to be an assignment target, a type may include another type, and the setting assignment means may limit association of a constituent element with a field to a case that a type set to the field matches or is in an inclusion relation with a type of a constituent element being an assignment target.

Further, the system construction assistance system may include a concrete constituent element including all essential information and an abstraction constituent element including only part of the essential information as constituent element types, an assignment definition may include a conversion definition being information about a conversion method of a constituent element, the conversion definition may include information designating constituent element types of a conversion source and a conversion destination, and the designation of a type in the conversion definition may be either of the conversion source being an abstraction constituent element type and the conversion destination being an abstraction constituent element type, or the conversion source being an abstraction constituent element type and the conversion destination being a concrete constituent element type.

Further, in an assignment definition with respect to a field included in a component designated by a system definition, when a reference from another field is included in a designation of a constituent element being an assignment target, the setting assignment means may verify that a part where a specific constituent element is designated is a single part throughout a field in a reference relation.

Further, a constituent element may include information about a state and a state transition, and, in that case, information indicating a relevancy between constituent elements may be information indicating a dependency of a state transition in one constituent element on a state in the other constituent element.

The present invention has been described above as examples applied to the aforementioned exemplary example embodiments. However, the technical scope of the present invention is not limited to the respective aforementioned example embodiments. It is obvious to a person skilled in the art that various changes or modifications can be made to such example embodiments. In such a case, a new example embodiment with such a change or modification may be included in the technical scope of the present invention. Furthermore, an example embodiment combining the respective aforementioned example embodiments or new example embodiments with such changes or modifications may be included in the technical scope of the present invention. This is obvious from matters described in CLAIMS.

This application claims priority based on Japanese Patent Application No. 2015-167797 filed on Aug. 27, 2015, the disclosure of which is hereby incorporated by reference thereto in its entirety.

INDUSTRIAL APPLICABILITY

The present invention is suitably applicable to design assistance in construction of a system including a plurality of parts, without being limited to an IT system.

REFERENCE SIGNS LIST

100 System construction assistance system
001 System definition input unit
002 System configuration output unit
003 Part definition storage unit
101 System definition deployment unit
102 Constituent element setting unit
501 System definition input means
502 Setting assignment means
503 Part definition storage means
504 System configuration output means

What is claimed is:

1. A system construction assistance system comprising:
a processing circuitry and a storage device storing data used by the processing circuitry, the processing circuitry being configured to form:
a system definition input unit that inputs a system definition including at least
a designation of a component using a component definition that is capable of including a field definition being information of a field and a setting definition being information about a setting to a constituent element associated with the field, and
an assignment definition related to assignment of a constituent element to a field included in the component,
the component definition being information that defines a component including at least one or more fields finally associated with one specific constituent element, the field storing information of a constituent element; and a setting assignment unit that
associates a constituent element with a field in a designated component, based on the system definition and the component definition, and
assigns a setting to a constituent element constituting a target system, by reflecting a setting content defined with respect to the field in the constituent element associated with the field.

2. The system construction assistance system according to claim 1, wherein
the setting definition included in the component definition includes at least an attribute value of a constituent element associated with a field determined to be a target, or information indicating a relevancy to another constituent element, the relevancy being included in the constituent element.

3. The system construction assistance system according to claim 2, wherein
designation of another constituent element in information indicating a relevancy is performed by designation of one of fields associated with the another constituent element.

4. The system construction assistance system according to claim 1, wherein
the component definition is capable of including an assignment definition being information about assignment of a constituent element associated with a field determined to be a target, and,
when the assignment definition is included in a component definition of a component designated by a system definition, the setting assignment unit associates a constituent element with a field designated by the assignment definition, based on the assignment definition.

5. The system construction assistance system according to claim 4, wherein
the assignment definition includes information designating whether a constituent element being an assignment target is a new definition or a reference from another field, and,
when the assignment definition included in a component definition of a component designated by a system definition designates a new definition, the setting assignment unit generates a designated constituent element and then associates the constituent element with a field designated by the assignment definition, and, when the assignment definition designates a reference from another field, the setting assignment unit associates the constituent element associated with the another field with the field designated by the assignment definition.

6. The system construction assistance system according to claim 1, wherein
the component definition includes a designation of a port including at least one or more fields finally associated with one specific constituent element, the port being a concept abstracting a terminal function for connecting a component determined to be a definition target to another component, the field being defined by a port definition and storing information of a constituent element required for connection processing,
the port definition includes a field definition being information of a field included in a port determined to be a definition target,
the system definition includes information designating a connection between ports, and
the setting assignment unit propagates information of associated constituent elements and a setting assigned to the constituent elements, between related fields in ports in a connection relation.

7. The system construction assistance system according to claim 6, wherein
the port definition is capable of including a setting definition being information about a setting to a constituent element associated with a field included in a port determined to be a definition target, and,
when the setting definition is included in the port definition, setting assignment unit reflects a setting content defined with respect to the field in a constituent element associated with the field and then propagates the setting between the related fields in ports in a connection relation.

8. The system construction assistance system according to claim 6, wherein,
when a component determined to be a definition target includes a port, the component definition is capable of including an assignment definition being information about assignment of a constituent element associated with a field included in the port, and
the assignment definition is capable of including a designation that a constituent element being an assignment target is a reference from a field included in the component.

9. The system construction assistance system according to claim 6, wherein,
when a component determined to be a definition target includes a port, the component definition is capable of including an assignment definition being information about assignment of a constituent element associated with a field included in the component, and
the assignment definition is capable of including a designation that a constituent element being an assignment target is a reference from a field included in the port.

10. The system construction assistance system according to claim 6, wherein
the port definition is capable of including the assignment definition being information about assignment of a constituent element associated with a field included in a port determined to be a definition target, and
the assignment definition is capable of including a designation that a constituent element being an assignment target is a reference from a field included in an arbitrary component associated with the port.

11. The system construction assistance system according to claim 6, wherein
the component definition or the system definition is capable of designating whether a port included in a component is a reference port indicating use of a connection function provided by another port or a service port indicating provision of a connection function to another port,
the port definition is capable of designating whether a field included in a port determined to be a definition target is an accept-field handling propagation of a constituent element from a reference port to a service port or a provide-field handling propagation of a constituent element from a service port to a reference port, and,
based on the component definition or the system definition, and the port definition, the setting assignment unit restricts assignment of a constituent element by a reference from a field in a component including a service port, with respect to an accept-field in the service port, and restricts assignment of a constituent element by a reference from a field in a component including a reference port, with respect to a provide-field in the reference port.

12. The system construction assistance system according to claim 1, wherein
the assignment definition is capable of including a conversion definition being information about a conversion method of a constituent element, and,
when associating a constituent element with a field, the setting assignment unit converts a designated constituent element, based on the conversion definition, and then establishes the association.

13. The system construction assistance system according to claim 1, wherein
the component definition includes information about a type being information about a kind of constituent element storable in a field,
the assignment definition includes information about a type of a constituent element determined to be an assignment target,
the type is capable of including another type, and
the setting assignment unit limits association of a constituent element with a field to a case that a type set to the field matches or is in an inclusion relation with a type of a constituent element being an assignment target.

14. The system construction assistance system according to claim 13, wherein
a concrete constituent element including all essential information and an abstraction constituent element including only part of essential information are included as kinds of constituent element types,
the assignment definition is capable of including a conversion definition being information about a conversion method of a constituent element,
the conversion definition includes information designating constituent element types of a conversion source and a conversion destination, and
a designation of the type in the conversion definition is either of a conversion source being an abstraction constituent element type and a conversion destination being an abstraction constituent element type, or a conversion source being an abstraction constituent element type and a conversion designation being a concrete constituent element type.

15. The system construction assistance system according to claim 1, wherein,
in an assignment definition with respect to a field included in a component designated by a system definition, when a reference from another field is included in a designation of a constituent element being an assignment target, the setting assignment unit verifies that a part where a specific constituent element is designated is a single part throughout a field in a reference relation.

16. The system construction assistance system according to claim 1, wherein
the constituent element includes information about a state and a state transition, and
information indicating a relevancy between constituent elements is information indicating a dependency of a state transition in one constituent element on a state in another constituent element.

17. The system construction assistance system according to claim 1,
wherein the processing circuitry is further configured to form, by use of the storage device, a part definition storage unit that stores at least two or more component definitions.

18. The system construction assistance system according to claim 1,
wherein the processing circuitry is further configured to form a system configuration output unit that outputs system configuration information being information of a specific constituent element constituting a target system and being information including a content of a setting assigned to the constituent element.

19. A system construction assistance method comprising, when an information processing device accepts a system definition including at least
a designation of a component using a component definition that is capable of including a field definition being information of a field and a setting definition being information about a setting to a constituent element associated with the field, and
an assignment definition related to assignment of a constituent element to a field included in the component,
the component definition being information that defines a component including at least one or more fields finally associated with one specific constituent element, the field storing information of a constituent element,
associating a constituent element with a field in a designated component, based on the system definition and the component definition, and
assigning a setting to a constituent element constituting a target system, by reflecting a setting content defined with respect to the field in the constituent element associated with the field.

20. A non-transitory computer-readable storage medium storing a system construction assistance program causing a computer to perform processing of,
when accepting a system definition including at least
a designation of a component using a component definition that is capable of including a field definition being information of a field and a setting definition being information about a setting to a constituent element associated with the field, and
an assignment definition related to assignment of a constituent element to a field included in the component,
the component definition being information that defines a component including at least one or more fields finally associated with one specific constituent element, the field storing information of a constituent element,
associating a constituent element with a field in a designated component, based on the system definition and the component definition, and
assigning a setting to a constituent element constituting a target system, by reflecting a setting content defined with respect to the field in the constituent element associated with the field.

* * * * *